US011209688B2

(12) United States Patent
Katoh et al.

(10) Patent No.: US 11,209,688 B2
(45) Date of Patent: Dec. 28, 2021

(54) REFLECTIVE LAYER OBTAINED BY IMMOBILIZING CHOLESTERIC LIQUID CRYSTALLINE PHASE

(71) Applicant: FUJIFILM Corporation, Tokyo (JP)

(72) Inventors: Shunya Katoh, Kanagawa (JP); Rie Takasago, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 648 days.

(21) Appl. No.: 16/141,992

(22) Filed: Sep. 26, 2018

(65) Prior Publication Data

US 2019/0033634 A1 Jan. 31, 2019

Related U.S. Application Data

(63) Continuation of application No. PCT/JP2017/010004, filed on Mar. 13, 2017.

(30) Foreign Application Priority Data

Mar. 28, 2016 (JP) ................................ JP2016-063809
Mar. 2, 2017 (JP) ................................ JP2017-039430

(51) Int. Cl.
*G02B 5/08* (2006.01)
*G02B 5/30* (2006.01)
*G02F 1/1335* (2006.01)
*G02F 1/1337* (2006.01)
(Continued)

(52) U.S. Cl.
CPC .......... *G02F 1/1335* (2013.01); *C01B 32/158* (2017.08); *C09K 19/04* (2013.01);
(Continued)

(58) Field of Classification Search
CPC .......... G02B 5/08; G02B 5/0841; G02B 5/30; G02B 5/3016; G02F 1/1335;
(Continued)

(56) References Cited

U.S. PATENT DOCUMENTS 6,537,624 B1 3/2003 Suzuki et al.
7,327,433 B2 2/2008 Miyachi et al.
(Continued)

FOREIGN PATENT DOCUMENTS

CN 1283276 2/2001
CN 1641425 7/2005
(Continued)

OTHER PUBLICATIONS

"International Preliminary Report on Patentability (Form PCT/IPEA/409) of PCT/JP2017/010004," completed on Apr. 17, 2018, with English translation thereof, pp. 1-9.

(Continued)

*Primary Examiner* — Ryan S Dunning
(74) *Attorney, Agent, or Firm* — JCIPRNET

(57) ABSTRACT

Provided are a method for producing a reflective layer having excellent diffuse reflectivity and a reflective layer having excellent diffuse reflectivity. The method for producing a reflective layer of the present invention includes Step 1 of applying a composition containing a liquid crystal compound and a chiral agent onto a substrate and heating the applied composition to align the liquid crystal compound into a cholesteric liquid crystalline phase state, and Step 2 of forming a reflective layer by cooling or heating the composition so that the helical twisting power of the chiral agent contained in the composition in the cholesteric liquid crystalline phase state increases by 5% or more.

4 Claims, 4 Drawing Sheets

(51) Int. Cl.

| | |
|---|---|
| ***G02F 1/139*** | (2006.01) |
| ***C01B 32/158*** | (2017.01) |
| ***H01L 51/50*** | (2006.01) |
| ***C09K 19/58*** | (2006.01) |
| ***C09K 19/04*** | (2006.01) |
| ***H05B 33/04*** | (2006.01) |
| *H01L 33/04* | (2010.01) |

(52) U.S. Cl.
CPC .............. *C09K 19/586* (2013.01); *G02B 5/08* (2013.01); *G02B 5/0841* (2013.01); *G02B 5/30* (2013.01); *G02B 5/3016* (2013.01); *G02F 1/139* (2013.01); *G02F 1/1337* (2013.01); *H01L 51/50* (2013.01); *H05B 33/04* (2013.01); *C09K 2019/0448* (2013.01); *G02F 2201/343* (2013.01)

(58) Field of Classification Search
CPC .. G02F 1/1337; G02F 1/139; G02F 2201/343; C01B 32/158; C09K 19/04; C09K 2019/0448; C09K 19/586; H01L 33/04; H01L 51/50
See application file for complete search history.

(56) References Cited

U.S. PATENT DOCUMENTS

| | | | | |
|---|---|---|---|---|
| 8,361,567 | B2 | 1/2013 | Takaku | |
| 2006/0152656 | A1 | 7/2006 | Kashima et al. | |
| 2009/0279042 | A1* | 11/2009 | Akao | G02F 1/13363 349/167 |
| 2010/0103337 | A1 | 4/2010 | Takaku | |
| 2010/0182545 | A1 | 7/2010 | Kashima et al. | |
| 2017/0108726 | A1 | 4/2017 | Yanai et al. | |

FOREIGN PATENT DOCUMENTS

| | | |
|---|---|---|
| CN | 1823284 | 8/2006 |
| JP | 2005049866 | 2/2005 |
| JP | 2006323312 | 11/2006 |
| JP | 2007206112 | 8/2007 |
| JP | 2008197223 | 8/2008 |
| JP | 5750222 | 7/2015 |
| JP | 2016012047 | 1/2016 |
| TW | 201606392 | 2/2016 |

OTHER PUBLICATIONS

"International Search Report (Form PCT/ISA/210) of PCT/JP2017/010004," dated Jun. 6, 2017, with English translation thereof, pp. 1-5.
"Office Action of China Counterpart Application", dated Jun. 2, 2020, with English translation, p. 1-p. 14.
"Office Action of Korea Counterpart Application," with English translation thereof, dated Jul. 8, 2019, p. 1-p. 10.
"Office Action of China Counterpart Application", dated Jan. 5, 2021, with English translation thereof, p. 1-p. 12.

* cited by examiner

REFLECTIVE LAYER OBTAINED BY IMMOBILIZING CHOLESTERIC LIQUID CRYSTALLINE PHASE

CROSS-REFERENCE TO RELATED APPLICATIONS

This application is a Continuation of PCT International Application No. PCT/JP2017/010004 filed on Mar. 13, 2017, which claims priority under 35 U.S.C. § 119(a) to Japanese Patent Application No. 2016-063809 filed on Mar. 28, 2016 and Japanese Patent Application No. 2017-039430 filed on Mar. 2, 2017. Each of the above applications is hereby expressly incorporated by reference, in its entirety, into the present application.

BACKGROUND OF THE INVENTION

1. Field of the Invention

The present invention relates to a method for producing a reflective layer and a reflective layer.

2. Description of the Related Art

A layer obtained by fixing a cholesteric liquid crystalline phase is known as a layer having a property of selectively reflecting either dextrorotatory circularly polarized light or levorotatory circularly polarized light in a specific wavelength range. For this reason, it has been developed for various purposes; for example, it is used as a phase difference layer (JP2005-49866A). In JP2005-49866A, the direction of an alignment regulating force of an alignment film is set in a random state, and therefore the direction of a director of a liquid crystal compound in contact with the alignment film is made random.

SUMMARY OF THE INVENTION

On the other hand, expansion of the viewing angle is required from the viewpoint of applying a layer obtained by fixing a cholesteric liquid crystalline phase to a projected image display member such as a projection screen.

More specifically, in the case where light is incident from the normal direction of the surface of the layer obtained by fixing a cholesteric liquid crystalline phase, either dextrorotatory circularly polarized light or levorotatory circularly polarized light is selectively reflected. At that time, in the case where the reflection is made not only in the normal direction but also in the oblique direction, it leads to an improvement in visibility from the oblique direction. In other words, the reflective layer is required to have excellent characteristics in which incident light is reflected in various directions (so-called diffuse reflectivity).

The present inventors have prepared a reflective layer using the alignment film described in JP2005-49866A without subjecting the reflective layer to a rubbing treatment and studied diffuse reflectivity of the thus-prepared reflective layer. As a result, the diffuse reflectivity did not satisfy the recently required level and therefore a further improvement was necessary.

In view of the above circumstances, an object of the present invention is to provide a method for producing a reflective layer having excellent diffuse reflectivity and a reflective layer having excellent diffuse reflectivity.

As a result of extensive studies to achieve the foregoing object, the present inventors have found that a reflective layer having desired characteristics can be produced by carrying out a treatment for increasing the helical twisting power (HTP) of a chiral agent by a predetermined amount.

That is, the present inventors have found that the foregoing object can be achieved by the following configuration.

[1] A method for producing a reflective layer, comprising: Step 1 of applying a composition containing a liquid crystal compound and a chiral agent onto a substrate and heating the applied composition to align the liquid crystal compound into a cholesteric liquid crystalline phase state, and Step 2 of forming a reflective layer by cooling or heating the composition so that the helical twisting power of the chiral agent contained in the composition in the cholesteric liquid crystalline phase state increases by 5% or more.

[2] The method for producing a reflective layer according to [1], in which the composition is cooled or heated in Step 2 so that the helical twisting power of the chiral agent increases by 10% or more.

[3] The method for producing a reflective layer according to [1] or [2], in which the composition is cooled or heated in Step 2 so that, in a cross section of a coating layer formed in Step 1, a bright portion and a dark portion derived from the cholesteric liquid crystalline phase are changed into a state not parallel to the substrate.

[4] The method for producing a reflective layer according to [3], in which the composition is cooled or heated in Step 2 so that, in the cross section of the coating layer formed in Step 1, the bright portion and the dark portion derived from the cholesteric liquid crystalline phase are wave-like.

[5] The method for producing a reflective layer according to any one of [1] to [4], in which the liquid crystal compound is a liquid crystal compound having a polymerizable group, the composition is subjected to a curing treatment to form a reflective layer obtained by immobilizing a cholesteric liquid crystalline phase in Step 2, and the method further comprises Step 3 of subjecting the composition to a curing treatment to form a reflective layer obtained by immobilizing a cholesteric liquid crystalline phase, after Step 2.

[6] The method for producing a reflective layer according to [5], in which the immobilization of the cholesteric liquid crystalline phase in Step 2 or the immobilization of the cholesteric liquid crystalline phase in Step 3 is to immobilize the structure after cooling or heating the composition.

[7] The method for producing a reflective layer according to [5] or [6], in which the immobilization of the cholesteric liquid crystalline phase in Step 2 or the immobilization of the cholesteric liquid crystalline phase in Step 3 is carried out by a polymerization reaction with light irradiation.

[8] The method for producing a reflective layer according to [7], in which the polymerization reaction with light irradiation is a radical polymerization reaction.

[9] The method for producing a reflective layer according to any one of [1] to [8], in which the composition is cooled or heated in Step 2 so that the helical twisting power of the chiral agent increases by 12% or more.

[10] The method for producing a reflective layer according to any one of [1] to [9], in which the composition is cooled in Step 2 so that the temperature of the composition decreases by 30° C. or higher.

[11] The method for producing a reflective layer according to any one of [1] to [10], in which the composition applied onto the substrate has a film thickness of 0.1 to 20 μm.

[12] The method for producing a reflective layer according to any one of [1] to [11], in which the composition is cooled or heated in Step 2 so that the helical twisting power of the chiral agent is 20 or more.

[13] The method for producing a reflective layer according to any one of [1] to [12], in which one or more of the compounds constituting the composition have a plurality of polymerizable groups and the total content of the compound having the plurality of polymerizable groups in the composition is 80% by mass or more based on the total solid content in the composition.

[14] The method for producing a reflective layer according to any one of [1] to [13], in which the composition containing a liquid crystal compound and a chiral agent further contains an alignment control agent.

[15] The method for producing a reflective layer according to any one of [1] to [14], in which the composition is cooled in Step 2 at a cooling rate at which a maximum value is 1° C. or higher per second.

[16] A reflective layer obtained by immobilizing a cholesteric liquid crystalline phase, in which, in a cross section of the reflective layer, a bright portion and a dark portion derived from the cholesteric liquid crystalline phase are wave-like, and a surface of the reflective layer has periodic roughness which is different in phase from the wave of the bright portion and the dark portion of the cross section of the reflective layer.

[17] The reflective layer according to [16], in which the roughness on the surface is formed by changing the alignment of the cholesteric liquid crystalline phase.

[18] The reflective layer according to [16] or [17], in which a pitch of the roughness on the surface is 0.5 to 10 μm.

[19] The reflective layer according to any one of [16] to [18], in which a height of the roughness on the surface is 1 to 500 nm.

According to the present invention, it is possible to provide a method for producing a reflective layer having excellent diffuse reflectivity and a reflective layer having excellent diffuse reflectivity.

DESCRIPTION OF THE PREFERRED EMBODIMENTS

Hereinafter, the present invention will be described in detail. In the present specification, the numerical range expressed by using "to" means a range including numerical values described before and after "to" as a lower limit value and an upper limit value, respectively.

Further, in the present specification, the term "(meth) acrylate" is a notation expressing both acrylate and methacrylate, the term "(meth)acryloyl group" is a notation expressing both acryloyl group and methacryloyl group, and the term "(meth)acrylic" is a notation expressing both acrylic and methacrylic.

In the production method of a reflective layer of the present invention, a reflective layer having excellent diffuse reflectivity can be formed by subjecting the composition in the cholesteric liquid crystalline phase state to a cooling treatment or heat treatment so that the helical twisting power of the chiral agent increases by 5% or more.

Although the reason that such a reflective layer having excellent diffuse reflectivity is obtained is not clear in detail, the present inventors speculate as follows.

Figure 1:
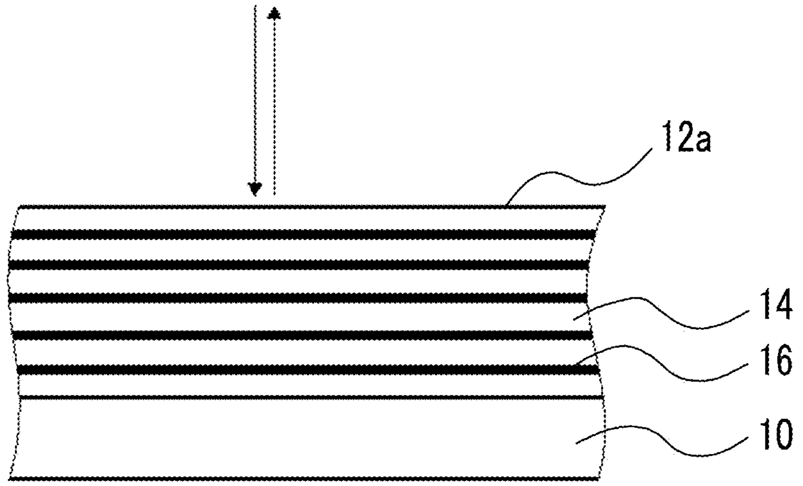
FIG. 1 is a schematic diagram in the case where a cross section of a layer in a general cholesteric liquid crystalline phase state is observed by a scanning electron microscope (SEM).

First, FIG. 1 shows a schematic cross-sectional view in the case where a layer of a composition in a general cholesteric liquid crystalline phase state is disposed on a substrate. As shown in FIG. 1, in the case where a cross section of a layer 12*a* of the composition in the cholesteric liquid crystalline phase state disposed on a substrate 10 is observed by a scanning electron microscope (SEM), normally, stripe patterns of a bright portion 14 and a dark portion 16 are observed. That is, a layered structure in which the bright portion 14 and the dark portion 16 are alternately laminated is observed in the cross section of the layer 12*a* of the composition in the cholesteric liquid crystalline phase state.

One bright portion 14 and two dark portions 16 disposed above and below the one bright portion 14 in FIG. 1 correspond to one helical pitch.

Generally, as shown in FIG. 1, the stripe pattern (layered structure) of the bright portion 14 and the dark portion 16 is formed to be parallel to the surface of the substrate 10. In such an aspect, in the case where light is incident from the normal direction of the layer 12*a* of the composition in the cholesteric liquid crystalline phase state, light is reflected in the normal direction, but light is hardly reflected in the oblique direction, which results in poor diffuse reflectivity (see arrows in FIG. 1).

Figure 2:
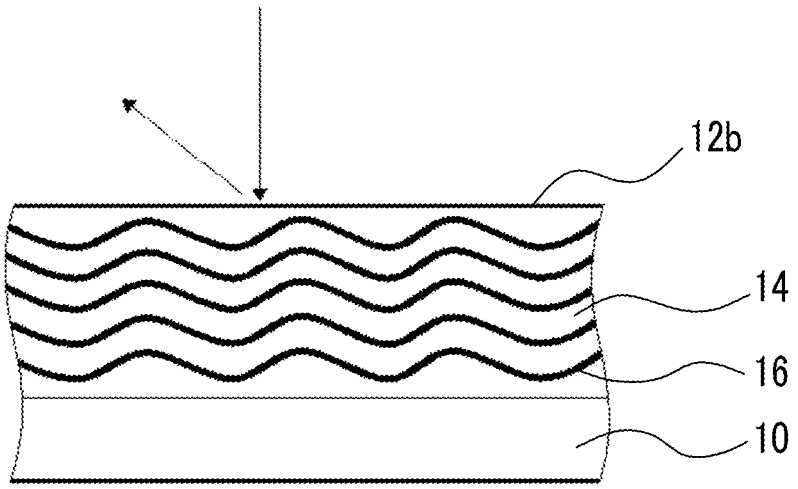
FIG. 2 is a schematic diagram in the case where a cross section of a reflective layer produced by a production method of the present invention is observed by SEM.

On the other hand, according to the production method of the present invention, by subjecting the composition in the cholesteric liquid crystalline phase state to a cooling treatment or heat treatment so that the helical twisting power of the chiral agent increases by 5% or more, the twist of the liquid crystal compound becomes stronger, and therefore the layer in the cholesteric liquid crystalline phase changes so as to be tilted. More specifically, by subjecting the layer 12*a* of the composition in the cholesteric liquid crystalline phase state shown in FIG. 1 to a predetermined treatment, as shown in FIG. 2, a layer 12*b* in which the bright portion 14 and the dark portion 16 have a wave-like structure (undulated structure) is obtained. In the case where light is incident on the layer 12*b* having such a wave-like structure (roughness structure) from the normal direction of the layer 12*b* having a wave-like structure, as shown in FIG. 2, a part of the incident light is reflected in an oblique direction since there is a region where the helical axis of the liquid crystal compound is inclined (see arrows in FIG. 2). That is, according to the production method of the present invention, a reflective layer having excellent diffuse reflectivity can be obtained.

The method for producing a reflective layer of the present invention has at least the following steps 1 and 2.

Step 1: a step of applying a composition containing a liquid crystal compound and a chiral agent onto a substrate and heating the applied composition to align the liquid crystal compound into a cholesteric liquid crystalline phase state Step 2: a step of cooling or heating the composition so as to form a reflective layer so that the helical twisting power of the chiral agent contained in the composition in the cholesteric liquid crystalline phase state increases by 5% or more Hereinafter, the materials used in each step and the procedure of each step will be described in detail.

<Step 1>

Step 1 is a step of applying a composition containing a liquid crystal compound and a chiral agent onto a substrate and heating the applied composition to align the liquid crystal compound into a cholesteric liquid crystalline phase state.

Hereinafter, the substrate and the composition used in the present step will be described first in detail, and then the procedure of the steps will be described in detail.

(Substrate)

The substrate is a plate that supports a layer of the composition described below. Among others, a transparent substrate is preferable. The transparent substrate is intended to refer to a substrate having a transmittance of visible light of 60% or more, and the transmittance thereof is preferably 80% or more and more preferably 90% or more.

The material constituting the substrate is not particularly limited, and examples thereof include a cellulose-based polymer, a polycarbonate-based polymer, a polyester-based polymer, a (meth)acrylic polymer, a styrene-based polymer, a polyolefin-based polymer, a vinyl chloride-based polymer, an amide-based polymer, an imide-based polymer, a sulfone-based polymer, a polyether sulfone-based polymer, and a polyether ether ketone-based polymer.

The substrate may contain various additives such as an ultraviolet (UV) absorber, a matting agent fine particle, a plasticizer, a deterioration inhibitor, and a release agent.

In addition, the substrate preferably has low birefringence in the visible light region. For example, the phase difference at a wavelength of 550 nm of the substrate is preferably 50 nm or less and more preferably 20 nm or less.

The thickness of the substrate is not particularly limited, but it is preferably 10 to 200 μm and more preferably 20 to 100 μm from the viewpoint of thinning and handleability.

The thickness is intended to refer to an average thickness, and is obtained by measuring thicknesses at five places of the substrate and arithmetically averaging the measured values. Regarding the method of measuring the thickness, the same applies to the thickness of a reflective layer (layer 12*a* of the composition in the cholesteric liquid crystalline phase state) to be described later.

(Liquid Crystal Compound)

The type of the liquid crystal compound is not particularly limited.

Generally, liquid crystal compounds can be classified into a rod type (rod-like liquid crystal compound) and a disc type (discotic liquid crystal compound, disk-like liquid crystal compound) depending on the shape thereof. Further, the rod type and the disk type each have a low molecular weight type and a high molecular weight type. The high molecular weight generally refers to having a degree of polymerization of 100 or more (Polymer Physics-Phase Transition Dynamics, Masao Doi, page 2, Iwanami Shoten, 1992). Any liquid crystal compound can be used in the present invention. Two or more liquid crystal compounds may be used in combination.

The liquid crystal compound may have a polymerizable group. The type of the polymerizable group is not particularly limited, and a functional group capable of addition polymerization reaction is preferable, and a polymerizable ethylenically unsaturated group or a cyclic polymerizable group is more preferable. More specifically, the polymerizable group is preferably a (meth)acryloyl group, a vinyl group, a styryl group, an allyl group, an epoxy group, or an oxetane group, and more preferably a (meth)acryloyl group.

The liquid crystal compound is preferably a liquid crystal compound represented by Formula (I) from the viewpoint that the reflective layer has superior diffuse reflectivity.

Among these, from the viewpoint of superior diffuse reflectivity of the reflective layer, in the case where the number obtained by dividing the number of trans-1,4-cyclohexylene groups which may have a substituent represented by A by m is defined as mc, a liquid crystal compound satisfying mc>0.1 is preferable, and a liquid crystal compound satisfying 0.4≤mc≤0.8 is more preferable.

Note that mc is a number represented by the following calculation formula.

$mc$=(the number of trans-1,4-cyclohexylene groups which may have a substituent represented by $A$)÷$m$ $$Q^1—Sp^1—\!\left[A—L\right]_m—Sp^2—Q^2 \qquad \text{(I)}$$

In the formula,

A represents a phenylene group which may have a substituent or a trans-1,4-cyclohexylene group which may have a substituent, at least one of A's represents a trans-1,4-cyclohexylene group which may have a substituent, L represents a single bond or a linking group selected from the group consisting of $—CH_2O—$, $—OCH_2—$, $—(CH_2)_2OC(═O)—$, $—C(═O)O(CH_2)_2—$, —C(═O)O—, —OC(═O)—, —OC(═O)O—, —CH═N—N═CH—, —CH═CH—, —C≡C—, —NHC(═O)—, —C(═O)NH—, —CH═N—, —N═CH—, —CH═CH—C(═O)O—, and —OC(═O)—CH═CH—, m represents an integer of 3 to 12, $Sp^1$ and $Sp^2$ each independently represent a single bond or a linking group selected from the group consisting of a linear or branched alkylene group having 1 to 20 carbon atoms and a group where one or two or more $—CH_2—$ in a linear or branched alkylene group having 1 to 20 carbon atoms is substituted with —O—, —S—, —NH—, $—N(CH_3)—$, —C(═O)—, —OC(═O)—, or —C(═O)O—, and $Q^1$ and $Q^2$ each independently represent a hydrogen atom or a polymerizable group selected from the group consisting of groups represented by Formulae (Q-1) to (Q-5), provided that one of $Q^1$ and $Q^2$ represents a polymerizable group.

(Q-1)

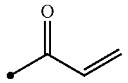

(Q-2)

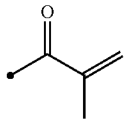

-continued (Q-3)

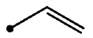

(Q-4)

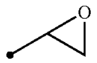

(Q-5)

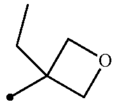

A is a phenylene group which may have a substituent or a trans-1,4-cyclohexylene group which may have a substituent. In the present specification, the phenylene group is preferably a 1,4-phenylene group.

At least one of A's is a trans-1,4-cyclohexylene group which may have a substituent.

(m) number of A's may be the same as or different from each other.

m represents an integer of 3 to 12, preferably an integer of 3 to 9, more preferably an integer of 3 to 7, and still more preferably an integer of 3 to 5.

The substituent which the phenylene group and the trans-1,4-cyclohexylene group in Formula (I) may have is not particularly limited, and examples thereof include substituents selected from the group consisting of an alkyl group, a cycloalkyl group, an alkoxy group, an alkyl ether group, an amide group, an amino group, a halogen atom, and a group formed by combining two or more of these substituents. Examples of the substituent include substituents represented by —C(═O)—$X^3$—$Sp^3$-$Q^3$ which will be described later. The phenylene group and the trans-1,4-cyclohexylene group may have 1 to 4 substituents. In the case of having two or more substituents, the two or more substituents may be the same as or different from each other.

In the present specification, the alkyl group may be either linear or branched. The number of carbon atoms in the alkyl group is preferably 1 to 30, more preferably 1 to 10, and still more preferably 1 to 6. Examples of the alkyl group include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a 1,1-dimethylpropyl group, an n-hexyl group, an isohexyl group, a heptyl group, an octyl group, a nonyl group, a decyl group, an undecyl group, and a dodecyl group. The explanation of the alkyl group in the alkoxy group is also the same as the explanation on the foregoing alkyl group. Further, in the present specification, specific examples of the alkylene group in the case of being referred to as an alkylene group include divalent groups obtained by removing one hydrogen atom from each of the foregoing examples of the alkyl group. Examples of the halogen atom include a fluorine atom, a chlorine atom, a bromine atom, and an iodine atom.

In the present specification, the number of carbon atoms in the cycloalkyl group is preferably 3 or more and more preferably 5 or more and is preferably 20 or less, more preferably 10 or less, still more preferably 8 or less, and particularly preferably 6 or less. Examples of the cycloalkyl group include a cyclopropyl group, a cyclobutyl group, a cyclopentyl group, a cyclohexyl group, a cycloheptyl group, and a cyclooctyl group.

The substituent which the phenylene group and the trans-1,4-cyclohexylene group may have is preferably a substituent selected from the group consisting of an alkyl group, an alkoxy group, and —C(═O)—$X^3$—$Sp^3$-$Q^3$. Here, $X^3$ represents a single bond, —O—, —S—, or —N($Sp^4$-$Q^4$)- or represents a nitrogen atom forming a ring structure together with $Q^3$ and $Sp^3$. $Sp^3$ and $Sp^4$ each independently represent a single bond or a linking group selected from the group consisting of a linear or branched alkylene group having 1 to 20 carbon atoms and a group where one or two or more —$CH_2$— in a linear or branched alkylene group having 1 to 20 carbon atoms is substituted with —O—, —S—, —NH—, —N($CH_3$)—, —C(═O)—, —OC(═O)—, or —C(═O)O—.

$Q^3$ and $Q^4$ each independently represent a hydrogen atom, a cycloalkyl group, a group where one or two or more —$CH_2$— in a cycloalkyl group is substituted with —O—, —S—, —NH—, —N($CH_3$)—, —C(═O)—, —OC(═O)—, or —C(═O)O—, or any polymerizable group selected from the group consisting of groups represented by Formulae (Q-1) to (Q-5).

Specific examples of the group where one or two or more —$CH_2$— in a cycloalkyl group is substituted with —O—, —S—, —NH—, —N($CH_3$)—, —C(═O)—, —OC(═O)—, or —C(═O)O— include a tetrahydrofuranyl group, a pyrrolidinyl group, an imidazolidinyl group, a pyrazolidinyl group, a piperidyl group, a piperazinyl group, and a morpholinyl group. Among them, a tetrahydrofuranyl group is preferable, and a 2-tetrahydrofuranyl group is more preferable.

In Formula (I), L represents a single bond or a linking group selected from the group consisting of —$CH_2O$—, —$OCH_2$—, —$(CH_2)_2OC$(═O)—, —C(═O)O$(CH_2)_2$—, —C(═O)O—, —OC(═O)—, —OC(═O)O—, —CH═CH—C(═O)O—, and —OC(═O)—CH═CH—. L is preferably —C(═O)O— or —OC(═O)—. (m) number of L's may be the same as or different from each other.

$Sp^1$ and $Sp^2$ each independently represent a single bond or a linking group selected from the group consisting of a linear or branched alkylene group having 1 to 20 carbon atoms and a group where one or two or more —$CH_2$— in a linear or branched alkylene group having 1 to 20 carbon atoms is substituted with —O—, —S—, —NH—, —N($CH_3$)—, —C(═O)—, —OC(═O)—, or —C(═O)O—. $Sp^1$ and $Sp^2$ are each independently preferably a linking group formed by combining one or two or more groups selected from the group consisting of a linear alkylene group having 1 to 10 carbon atoms to which a linking group selected from the group consisting of —P—, —OC(═O)—, and —C(═O)O— is bonded to both terminals thereof, —OC(═O)—, —C(═O)O—, —O—, and a linear alkylene group having 1 to 10 carbon atoms, and more preferably a linear alkylene group having 1 to 10 carbon atoms to which —O— is bonded to both terminals thereof.

$Q^1$ and $Q^2$ each independently represent a hydrogen atom or a polymerizable group selected from the group consisting of groups represented by Formulae (Q-1) to (Q-5), provided that either one of $Q^1$ and $Q^2$ represents a polymerizable group.

(Q-1)

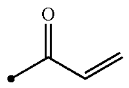

(Q-2)

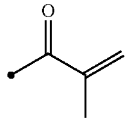

(Q-3)

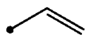

(Q-4)

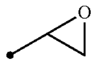

(Q-5)

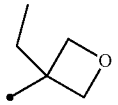

The polymerizable group is preferably an acryloyl group (Formula (Q-1)) or a methacryloyl group (Formula (Q-2)).

Specific examples of the liquid crystal compound include a liquid crystal compound represented by Formula (I-11), a liquid crystal compound represented by Formula (I-21), and a liquid crystal compound represented by Formula (I-31). In addition to the foregoing compounds, known compounds such as a compound represented by Formula (I) in JP2013-112631A, a compound represented by Formula (I) in JP2010-70543A, a compound represented by Formula (I) in JP2008-291218A, a compound represented by Formula (I) in JP4725516B, a compound represented by Formula (II) in JP2013-087109A, a compound described in paragraph [0043] of JP2007-176927A, a compound represented by Formula (1-1) in JP2009-286885A, a compound represented by Formula (I) in WO2014/10325A, a compound represented by Formula (1) in JP2016-81035A, and a compound represented by Formulae (2-1) and (2-2) in JP2016-121339A can be mentioned.

A liquid crystal compound represented by Formula (I-11)

$L^{11}$ represents a single bond, —C(═O)O—, or —O(C═O)—, $L^{12}$ represents —C(═O)O—, —OC(═O)—, or —CONR$^2$—

$R^2$ represents a hydrogen atom or an alkyl group having 1 to 3 carbon atoms, $Z^{11}$ and $Z^{12}$ each independently represent a single bond, —O—, —NH—, —N($CH_3$)—, —S—, —C(═O)O—, —OC(═O)—, —OC(═O)O—, or —C(═O)NR$^{12}$—

$R^{12}$ represents a hydrogen atom or —Sp$^{12}$-Q$^{12}$, $Sp^{11}$ and $Sp^{12}$ each independently represent a single bond, a linear or branched alkylene group having 1 to 12 carbon atoms which may be substituted with $Q^{11}$, or a linking group obtained by substituting one or more —$CH_2$— in a linear or branched alkylene group having 1 to 12 carbon atoms which may be substituted with $Q^{11}$ with —O—, —S—, —NH—, —N($Q^{11}$)-, or —C(═O)—, $Q^{11}$ represents a hydrogen atom, a cycloalkyl group, a group where one or more —$CH_2$— in a cycloalkyl group is substituted with —O—, —S—, —NH—, —N($CH_3$)—, —C(═O)—, —OC(═O)—, or —C(═O)O—, or a polymerizable group selected from the group consisting of groups represented by Formulae (Q-1) to (Q-5), $Q^{12}$ represents a hydrogen atom or a polymerizable group selected from the group consisting of groups represented by Formulae (Q-1) to (Q-5)

$l^{11}$ represents an integer of 0 to 2, $m^{11}$ represents an integer of 1 or 2, $n^{11}$ represents an integer of 1 to 3, and a plurality of $R^{11}$'s, a plurality of $L^{11}$'s, a plurality of $L^{12}$'s, a plurality of $l^{11}$'s, a plurality of $Z^{11}$'s, a plurality of $Sp^{11}$'s, and a plurality of $Q^{11}$'s may be respectively the same as or different from each other.

The liquid crystal compound represented by Formula (I-11) contains at least one —Z$^{12}$—Sp$^{12}$-Q$^{12}$ in which $Q^{12}$ is a polymerizable group selected from the group consisting of groups represented by Formulae (Q-1) to (Q-5), as $R^{11}$.

In addition, the liquid crystal compound represented by Formula (I-11) is preferably —Z$^{11}$—Sp$^{11}$-Q$^{11}$ in which $Z^{11}$ is —C(═O)O— or —C(═O)NR$^{12}$— and $Q^{11}$ is a polymerizable group selected from the group consisting of groups represented by Formulae (Q-1) to (Q-5). The liquid crystal compound represented by Formula (I-11) is preferably —Z$^{12}$-Sp$^{12}$-Q$^{12}$ in which $Z^{12}$ is —C(═O)O— or —C(═O)NR$^{12}$—, and $Q^{12}$ is a polymerizable group selected from the group consisting of groups represented by Formulae (Q-1) to (Q-5), as $R^{11}$.

The 1,4-cyclohexylene group contained in the liquid crystal compound represented by Formula (I-11) is a trans-1,4-cyclohexylene group.

A suitable aspect of the liquid crystal compound represented by Formula (I-11) may be, for example, a compound in which $L^{11}$ is a single bond, $l^{11}$ is 1-(a dicyclohexyl group), (I-11)

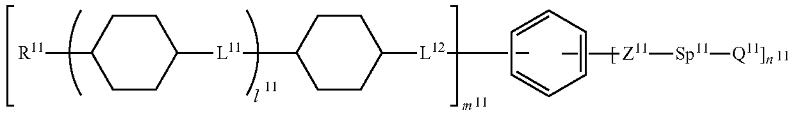

In the formula, $R^{11}$ represents a hydrogen atom, a linear or branched alkyl group having 1 to 12 carbon atoms, or —Z$^{12}$—SP$^{12}$-Q$^{12}$-Q$^{12}$, and $Q^{11}$ is a polymerizable group selected from the group consisting of groups represented by Formulae (Q-1) to (Q-5).

Another suitable aspect of the liquid crystal compound represented by Formula (I-11) may be, for example, a compound in which $m^{11}$ is 2, $l^{11}$ is 0, and two $R^{11}$'s each represent $—Z^{12}\text{-}Sp^{12}\text{-}Q^{12}$, and $Q^{12}$ is a polymerizable group selected from the group consisting of groups represented by Formulae (Q-1) to (Q-5).

The liquid crystal compound represented by Formula (I-21)

(I-21)

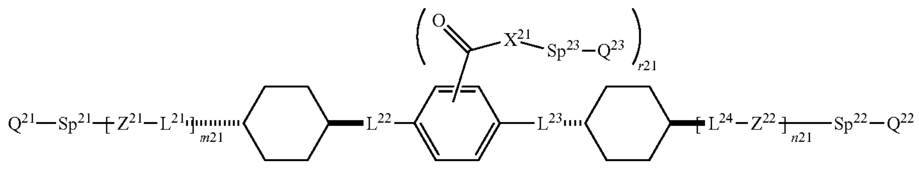

In the formula, $Z^{21}$ and $Z^{22}$ each independently represent a trans-1,4-cyclohexylene group which may have a substituent or a phenylene group which may have a substituent, the above substituents are each independently 1 to 4 substituents selected from the group consisting of $—CO—X^{21}\text{-}Sp^{23}\text{-}Q^{23}$, an alkyl group, and an alkoxy group, m21 represents an integer of 1 or 2, and n21 represents an integer of 0 or 1, in the case where m21 represents 2, n21 represents 0, in the case where m21 represents 2, two $Z^{21}$'s may be the same or different, at least one of $Z^{21}$ or $Z^{22}$ is a phenylene group which may have a substituent, $L^{21}$, $L^{22}$, $L^{23}$, $L^{24}$ each independently represent a single bond or a linking group selected from the group consisting of $—CH_2O—$, $—OCH_2—$, $—(CH_2)_2OC(=O)—$, $—C(=O)O(CH_2)_2—$, $—C(=O)O—$, $—OC(=O)—$, $—OC(=O)O—$, $—CH=CH—C(=O)O—$, and $—OC(=O)—CH=CH—$, $X^{21}$ represents —O—, —S—, or $—N(Sp^{25}\text{-}Q^{25})$- or represents a nitrogen atom forming a ring structure together with $Q^{23}$ and $Sp^{23}$, $r^{21}$ represents an integer of 1 to 4, $Sp^{21}$, $Sp^{22}$, $Sp^{23}$, and $Sp^{25}$ each independently represent a single bond or a linking group selected from the group consisting of a linear or branched alkylene group having 1 to 20 carbon atoms and a group where one or two or more $—CH_2—$ in a linear or branched alkylene group having 1 to 20 carbon atoms is substituted with —O—, —S—, —NH—, $—N(CH_3)—$, $—C(=O)—$, $—OC(=O)—$, or $—C(=O)O—$, $Q^{21}$ and $Q^{22}$ each independently represent a polymerizable group selected from the group consisting of groups represented by Formulae (Q-1) to (Q-5), $Q^{23}$ represents a hydrogen atom, a cycloalkyl group, a group where one or two or more $—CH_2—$ in a cycloalkyl group is substituted with —O—, —S—, —NH—, $—N(CH_3)—$, $—C(=O)—$, $—OC(=O)—$, or $—C(=O)O—$, any one polymerizable group selected from the group consisting of groups represented by Formulae (Q-1) to (Q-5), or a single bond in the case where $X^{21}$ is a nitrogen atom forming a ring structure together with $Q^{23}$ and $Sp^{23}$, and $Q^{25}$ represents a hydrogen atom, a cycloalkyl group, a group where one or two or more $—CH_2—$ in a cycloalkyl group is substituted with —O—, —S—, —NH—, $—N(CH_3)—$, $—C(=O)$-, $—OC(=O)—$, or $—C(=O)O—$, or any one polymerizable group selected from the group consisting of groups represented by Formulae (Q-1) to (Q-5), provided that in the case where $Sp^{25}$ is a single bond, $Q^{25}$ is not a hydrogen atom.

It is also preferred that the liquid crystal compound represented by Formula (I-21) has a structure in which a 1,4-phenylene group and a trans-1,4-cyclohexylene group are alternately present. For example, preferred is a structure in which m21 is 2, n21 is 0, and $Z^{21}$ is a trans-1,4-cyclohexylene group which may have a substituent from the $Q^{21}$ side or an arylene group which may have a substituent, or a structure in which m21 is 1, n21 is 1, $Z^{21}$ is an arylene group which may have a substituent, and $Z^{22}$ is an arylene group which may have a substituent.

A liquid crystal compound represented by Formula (I-31);

(I-31)

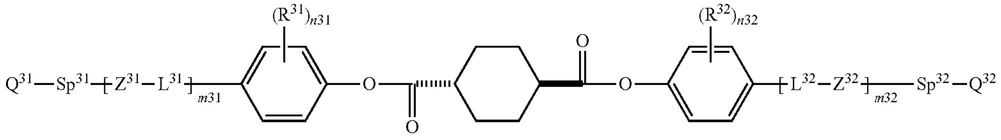

In the formula, $R^{31}$ and $R^{32}$ each independently represent an alkyl group, an alkoxy group, and a group selected from the group consisting of $—C(=O)—X^{31}\text{-}Sp^{33}\text{-}Q^{33}$, n31 and n32 each independently represent an integer of 0 to 4, $X^{31}$ represents a single bond, —O—, —S—, or $—N(Sp^{34}\text{-}Q^{34})$- or represents a nitrogen atom forming a ring structure together with $Q^{33}$ and $Sp^{33}$, $Z^{31}$ represents a phenylene group which may have a substituent, $Z^{32}$ represents a trans-1,4-cyclohexylene group which may have a substituent or a phenylene group which may have a substituent, the above substituents are each independently 1 to 4 substituents selected from the group consisting of an alkyl group, an alkoxy group, and $—C(=O)—X^{31}\text{-}Sp^{33}\text{-}Q^{33}$, m31 represents an integer of 1 or 2, and m32 represents an integer of 0 to 2, in the case where m31 and m32 represent 2, two $Z^{31}$'s and $Z^{32}$'s may be the same or different, $L^{31}$ and $L^{32}$ each independently represent a single bond or a linking group selected from the group consisting of —$CH_2O$—, —$OCH_2$—, —$(CH_2)_2OC(=O)$—, —$C(=O)O(CH_2)_2$—, —$C(=O)O$—, —$OC(=O)$—, —$OC(=O)O$—, —$CH=CH-C(=O)O$—, and —$OC(=O)-CH=CH$—, $Sp^{31}$, $Sp^{32}$, $Sp^{33}$, and $Sp^{34}$ each independently represent a single bond or a linking group selected from the group consisting of a linear or branched alkylene group having 1 to 20 carbon atoms and a group where one or two or more —$CH_2$— in a linear or branched alkylene group having 1 to 20 carbon atoms is substituted with —O—, —S—, —NH—, —$N(CH_3)$—, —$C(=O)$—, —$OC(=O)$—, or —$C(=O)O$—, $Q^{31}$ and $Q^{32}$ each independently represent a polymerizable group selected from the group consisting of groups represented by Formulae (Q-1) to (Q-5), and $Q^{33}$ and $Q^{34}$ each independently represent a hydrogen atom, a cycloalkyl group, a group where one or two or more —$CH_2$— in a cycloalkyl group is substituted with —O—, —S—, —NH—, —$N(CH_3)$—, —$C(=O)$—, —$OC(=O)$—, or —$C(=O)O$—, or any one polymerizable group selected from the group consisting of groups represented by Formulae (Q-1) to (Q-5), provided that $Q^{33}$ may represent a single bond in the case of forming a ring structure together with $X^{31}$ and $Sp^{33}$, and $Q^{34}$ is not a hydrogen atom in the case where $Sp^{34}$ is a single bond.

As the liquid crystal compound represented by Formula (I-31), particularly preferable compounds include a compound in which $Z^{32}$ is a phenylene group and a compound in which m32 is 0.

In the formula, $R_1$ and $R_2$ are each independently a group selected from the group consisting of a hydrogen atom, an alkyl group, an alkoxy group, and a group represented by —$C(=O)$—$X^3$-$Sp^3$-$Q^3$. Here, $X^3$ represents a single bond, —O—, —S—, or —$N(Sp^4$-$Q^4)$- or represents a nitrogen atom forming a ring structure together with $Q^3$ and $Sp^3$. $X^3$ is preferably a single bond or —O—. $R_1$ and $R_2$ are preferably —$C(=O)$—$X^3$-$Sp^3$-$Q^3$. It is also preferred that $R_1$ and $R_2$ are the same. The bonding position of each of $R_1$ and $R_2$ to the phenylene group is not particularly limited.

$Sp^3$ and $Sp^4$ each independently represent a single bond or a linking group selected from the group consisting of a linear or branched alkylene group having 1 to 20 carbon atoms and a group where one or two or more —$CH_2$— in a linear or branched alkylene group having 1 to 20 carbon atoms is substituted with —O—, —S—, —NH—, —$N(CH_3)$—, —$C(=O)$—, —$OC(=O)$—, or —$C(=O)O$—. $Sp^3$ and $Sp^4$ are each independently preferably a linear or branched alkylene group having 1 to 10 carbon atoms, more preferably a linear alkylene group having 1 to 5 carbon atoms, and still more preferably a linear chain alkylene group having 1 to 3 carbon atoms.

$Q^3$ and $Q^4$ each independently represent a hydrogen atom, a cycloalkyl group, a group where one or two or more —$CH_2$— in a cycloalkyl group is substituted with —O—, —S—, —NH—, —$N(CH_3)$—, —$C(=O)$—, —$OC(=O)$—, or —$C(=O)O$—, or any one polymerizable group selected from the group consisting of groups represented by Formulae (Q-1) to (Q-5).

It is also preferred that the compound represented by Formula (I) has, for example, a structure represented by Formula (II-2).

(II-2)

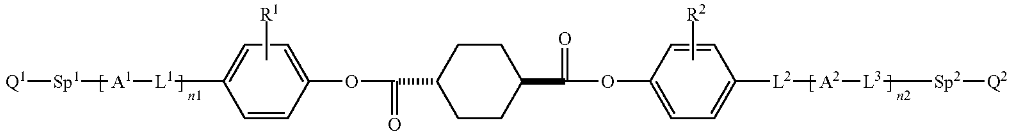

It is also preferred that the compound represented by Formula (I) has a partial structure represented by Formula (II).

(II)

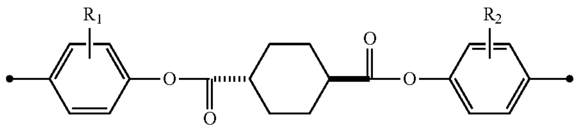

In Formula (II), black circles indicate the bonding positions with other moieties of Formula (I). The partial structure represented by Formula (II) may be included as a part of the partial structure represented by Formula (III) in Formula (I).

(III)

$$-\![A-L]_m\!-$$

In the formula, $A^1$ and $A^2$ each independently represent a phenylene group which may have a substituent or a trans-1,4-cyclohexylene group which may have a substituent, and the above substituents are each independently 1 to 4 substituents selected from the group consisting of an alkyl group, an alkoxy group, and —$C(=O)$—$X^3$-$Sp^3$-$Q^3$, $L^1$, $L^2$, and $L^3$ each represent a single bond or a linking group selected from the group consisting of —$CH_2O$—, —$OCH_2$—, —$(CH_2)_2OC(=O)$—, —$C(=O)O(CH_2)_2$—, —$C(=O)O$—, —$OC(=O)$—, —$OC(=O)O$—, —$CH=CH-C(=O)O$—, and —$OC(=O)-CH=CH$—, and n1 and n2 each independently represent an integer of 0 to 9, and n1+n2 is 9 or less.

Each of $Q^1$, $Q^2$, $Sp^1$, and $Sp^2$ has the same definition as that of each group in Formula (I). Each of $X^3$, $Sp^3$, $Q^3$, $R^1$, and $R^2$ has the same definition as that of each group in Formula (II).

As the liquid crystal compound which is a liquid crystal compound represented by Formula (I) and satisfies $0.4 \leq mc \leq 0.8$, the following compounds are exemplified.

1-1
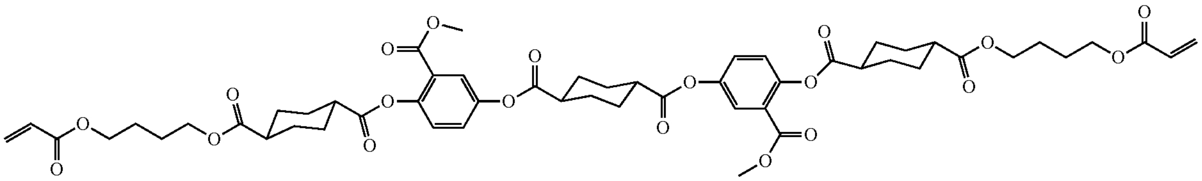
1-2
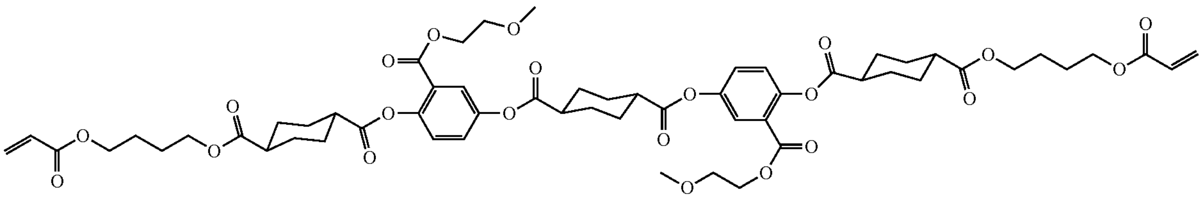
1-3
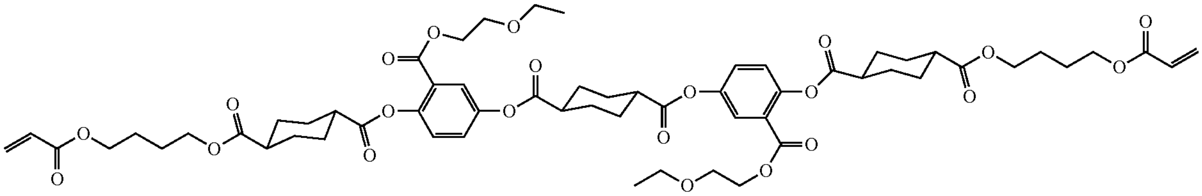
1-4
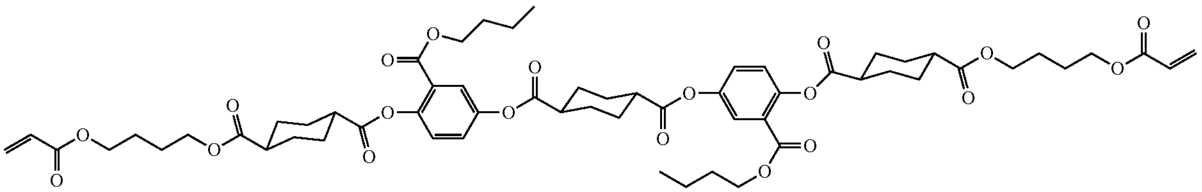
1-5
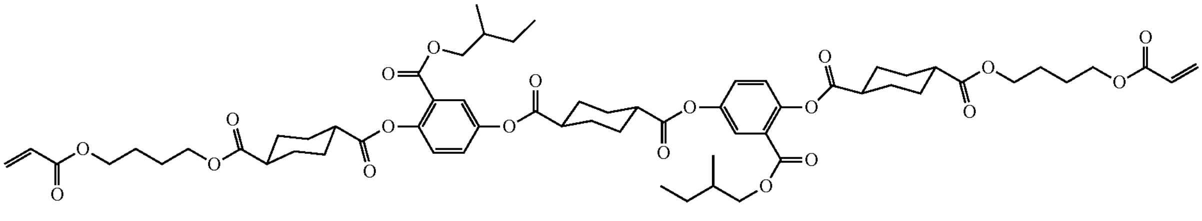
1-6
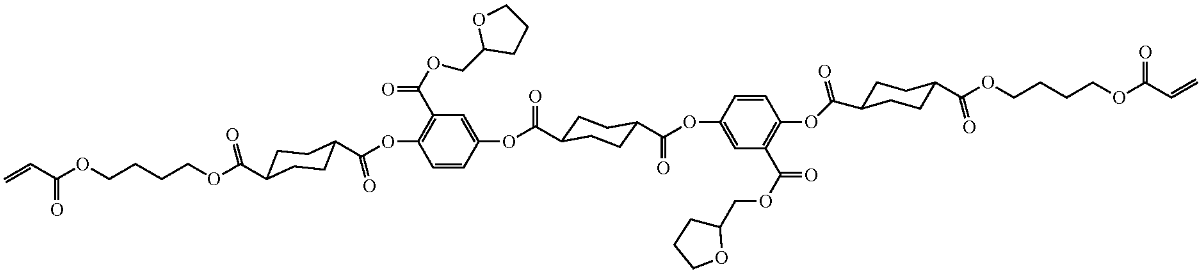

-continued
1-7
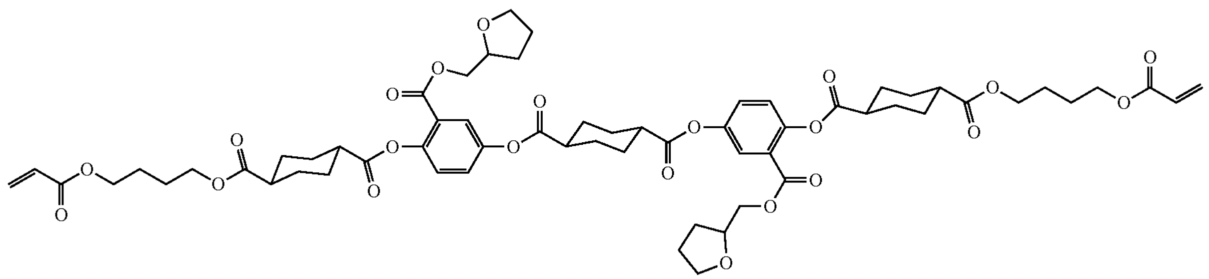
1-8
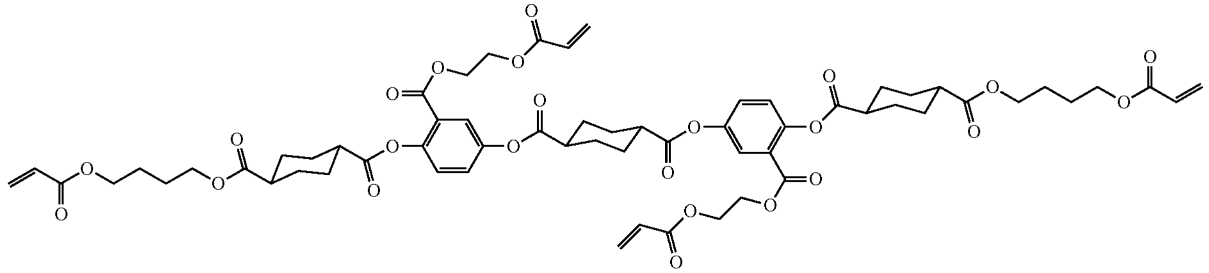
1-9
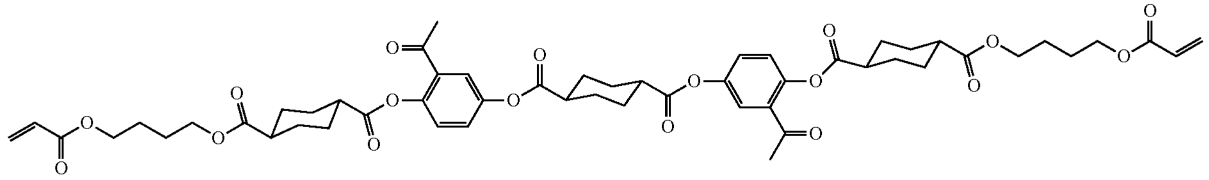
1-10
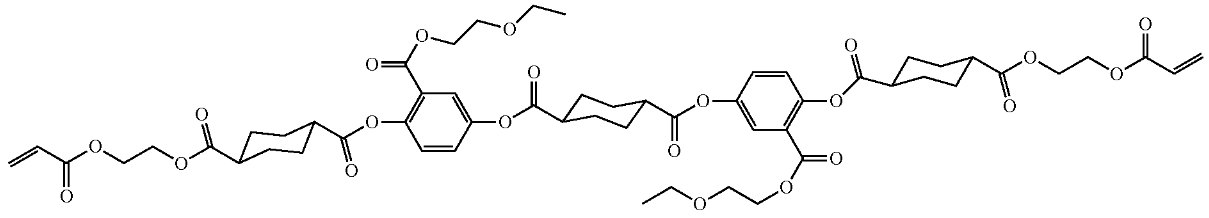
1-11
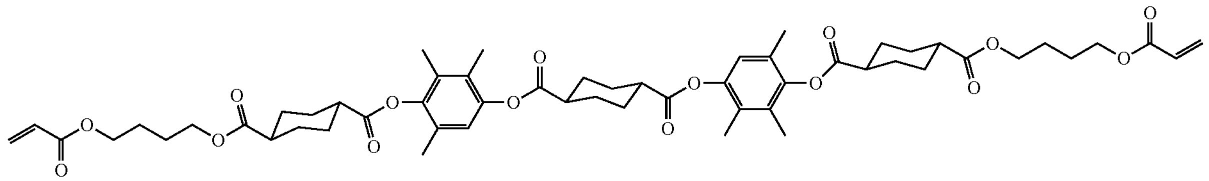
1-12
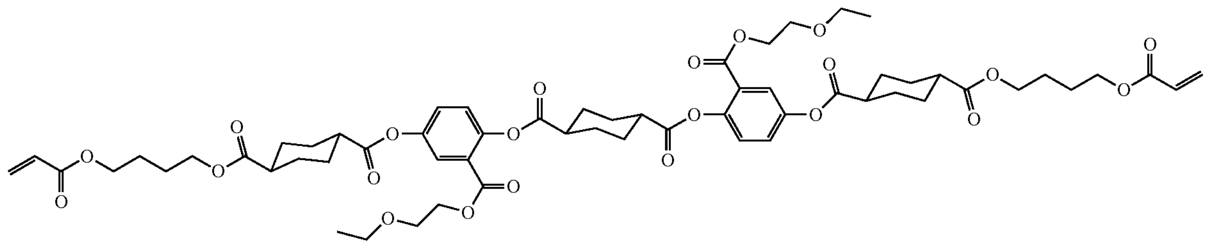

-continued
1-13
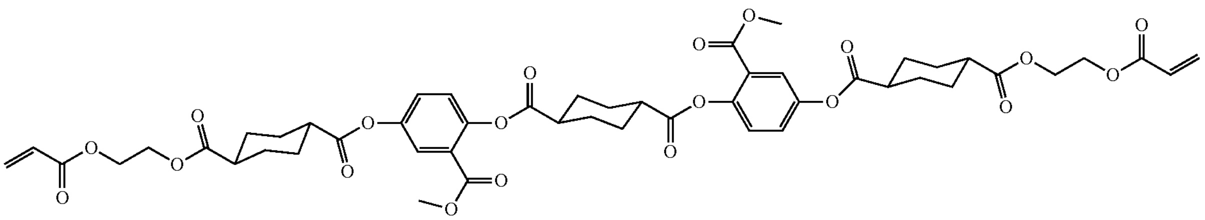
1-14
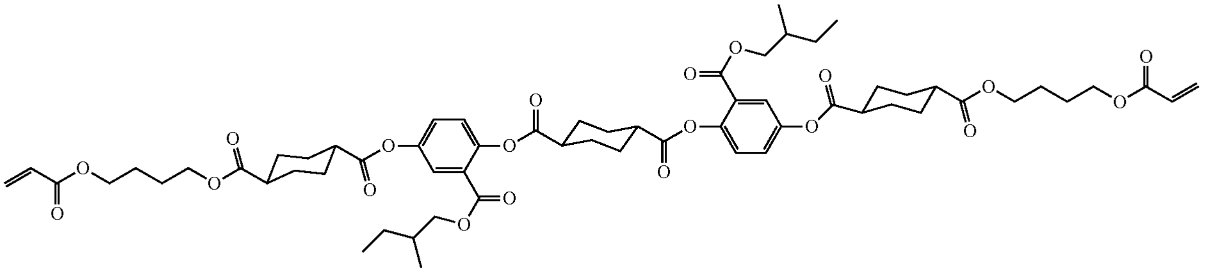
1-15
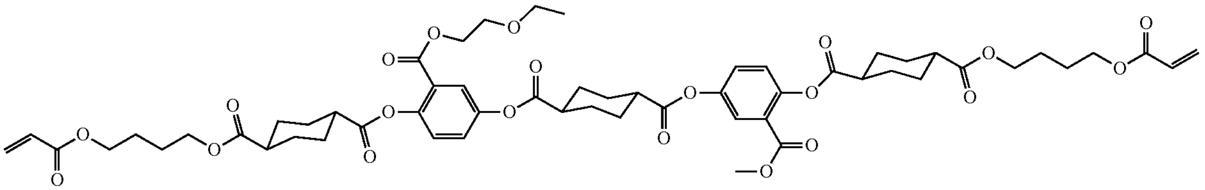
1-16
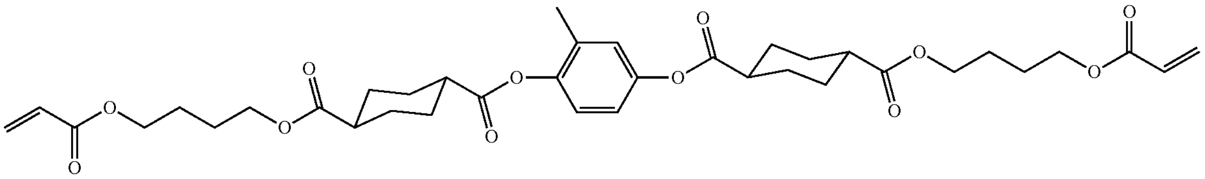
1-17
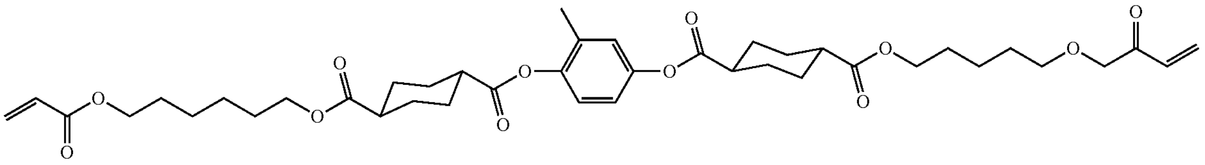
1-18
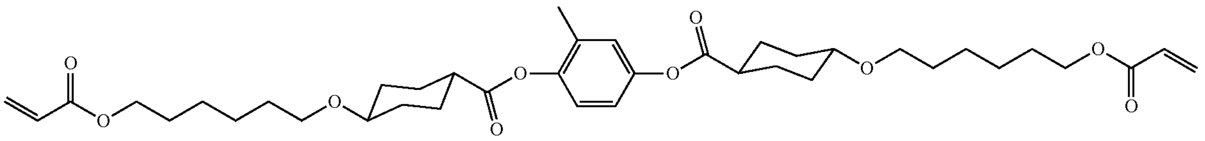
1-19
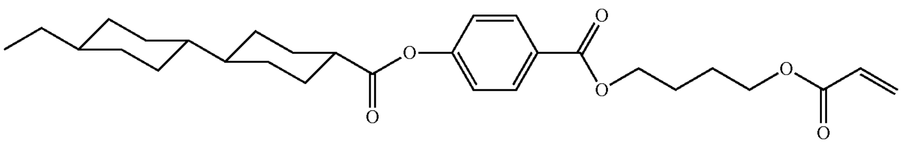
1-20
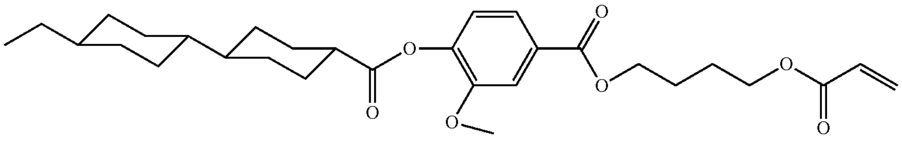

-continued
1-21
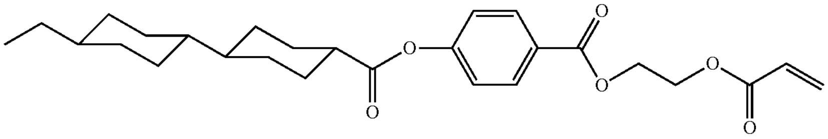
1-22
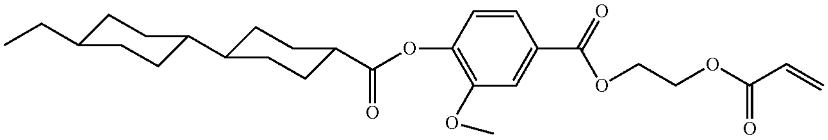
1-23
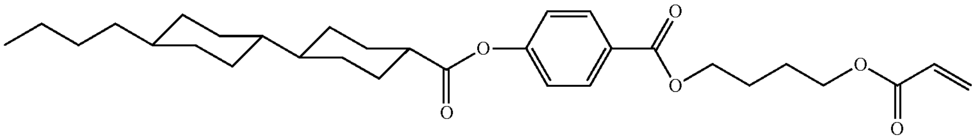
1-24
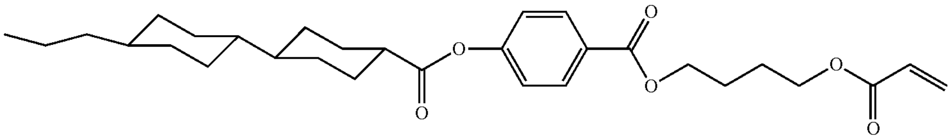
1-25
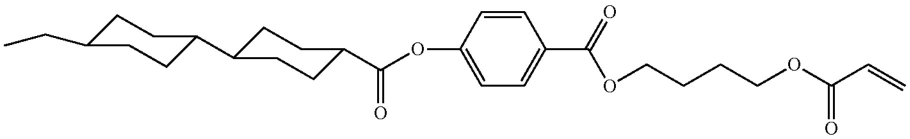
1-26
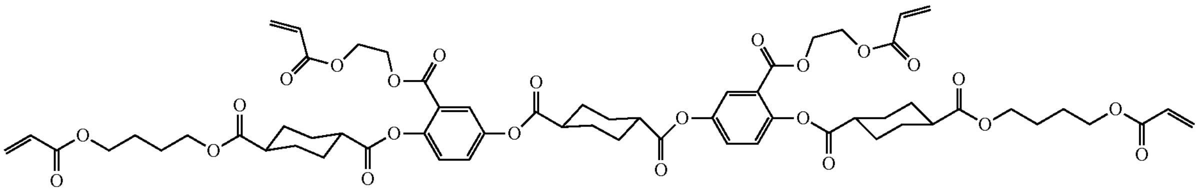
1-27
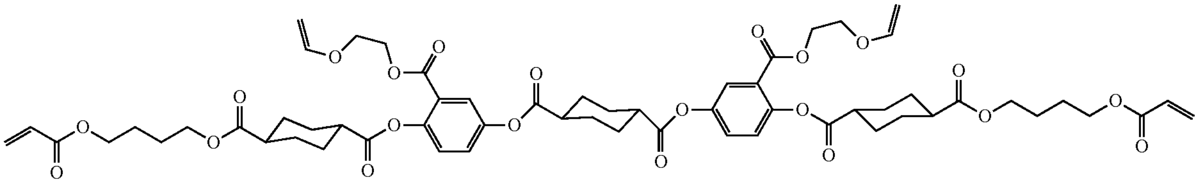
1-28
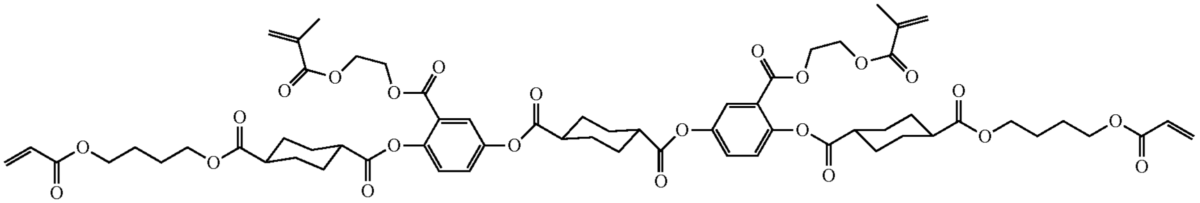

-continued
1-29
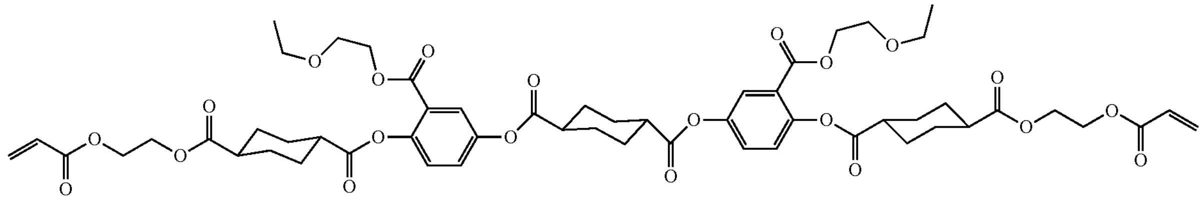
1-30
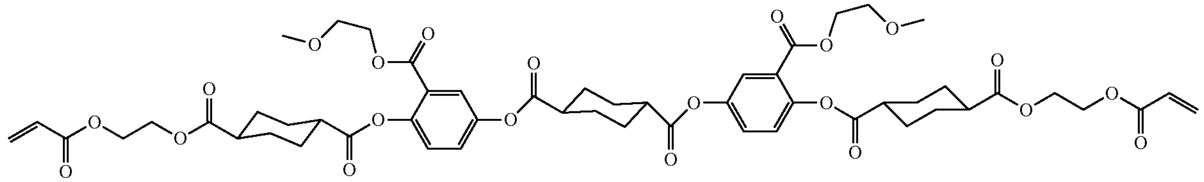
1-31
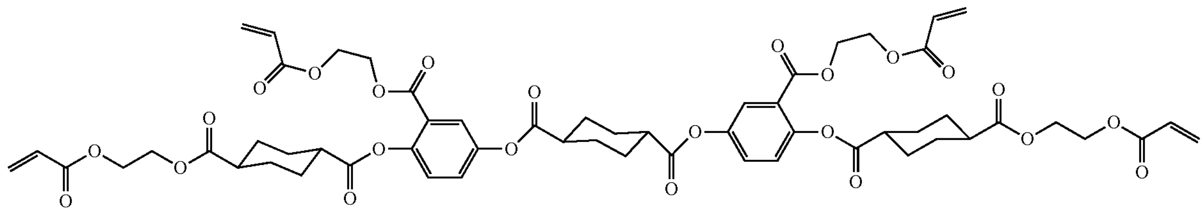
1-32
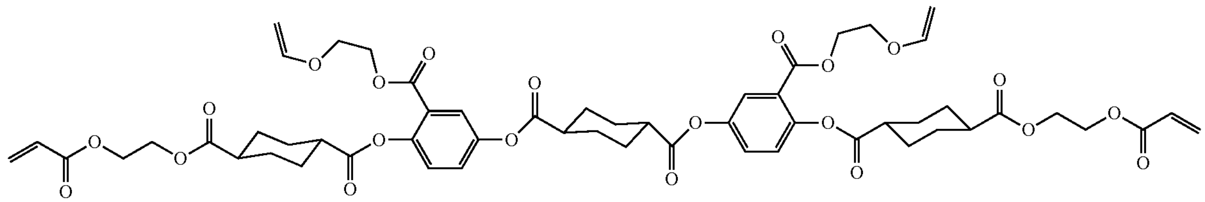
1-33
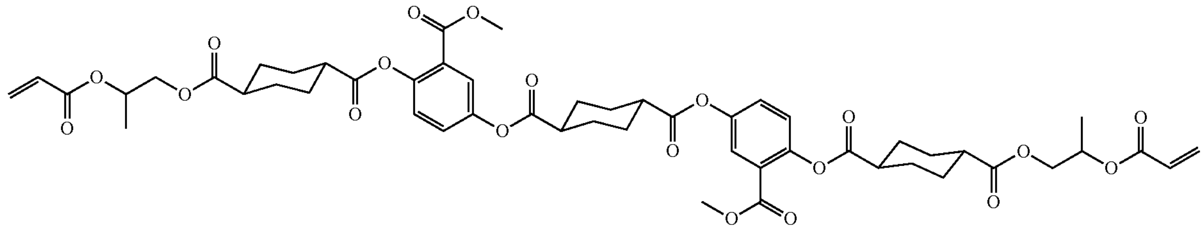
1-34
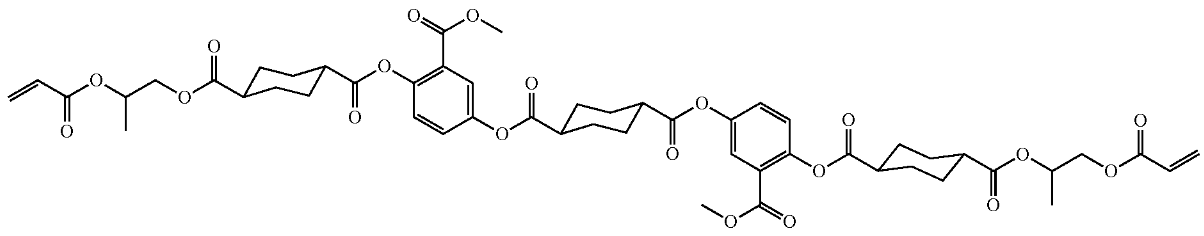

-continued
1-35
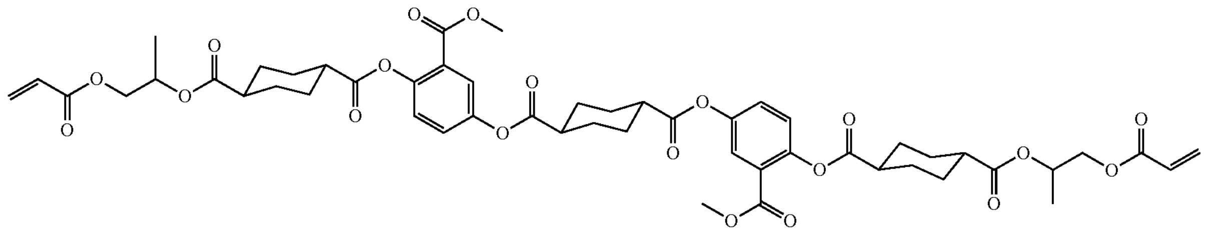
1
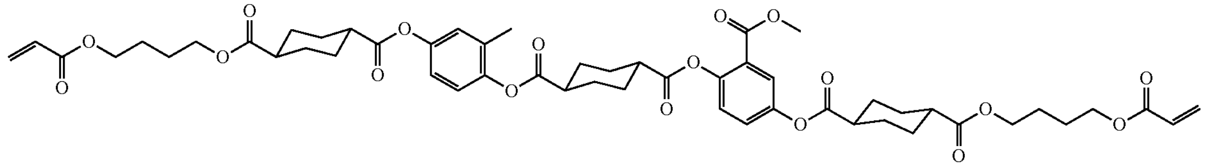
2
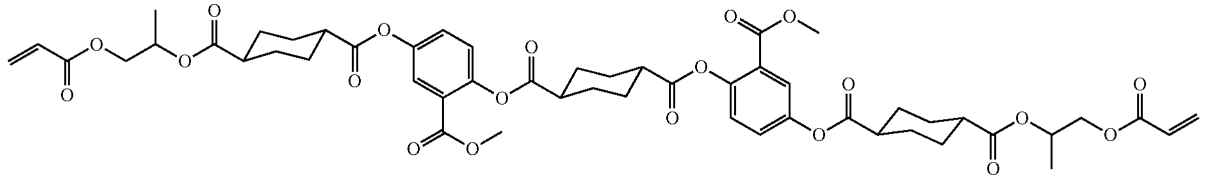
3
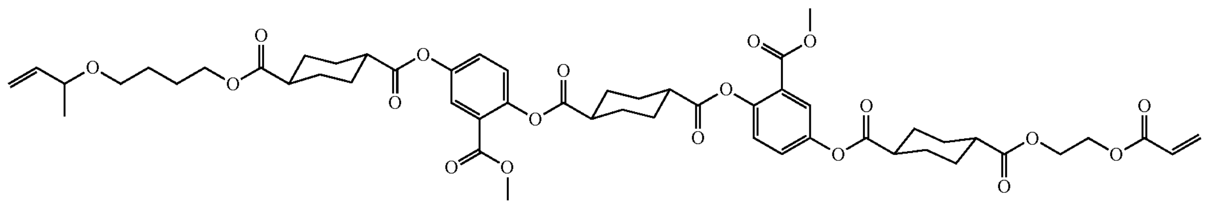
4
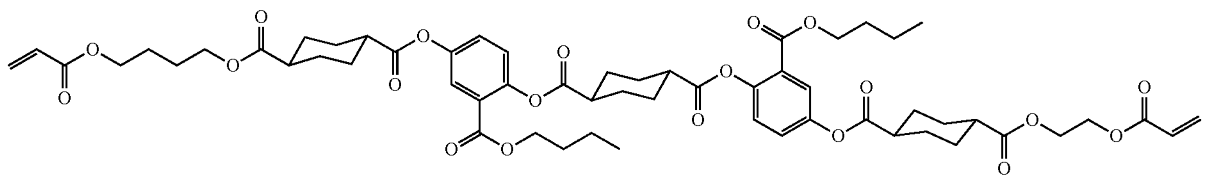
5
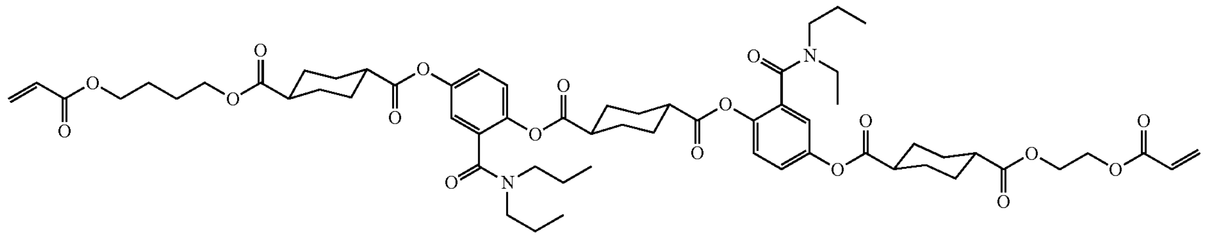
6
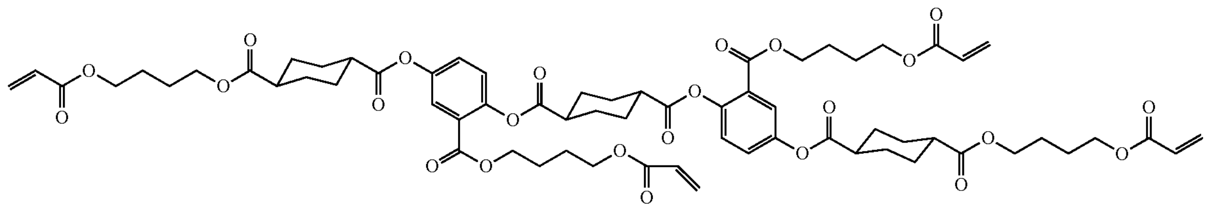

-continued
7
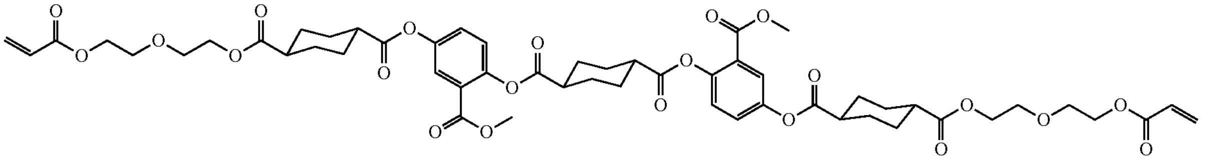
8
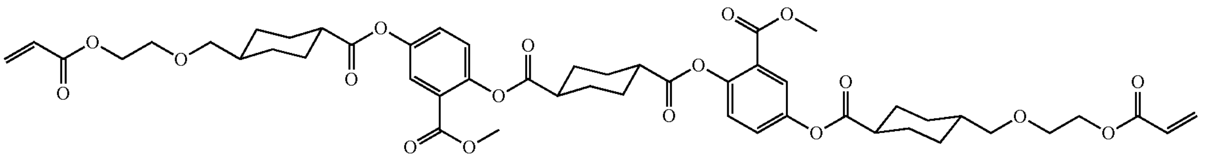
9
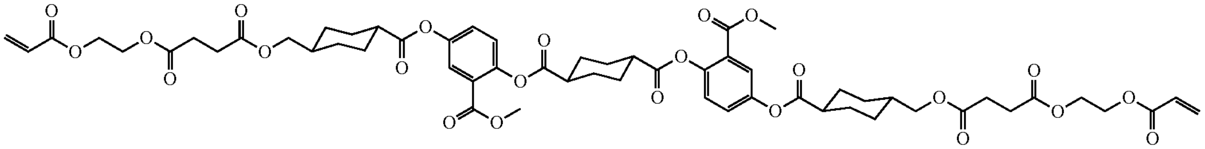
10
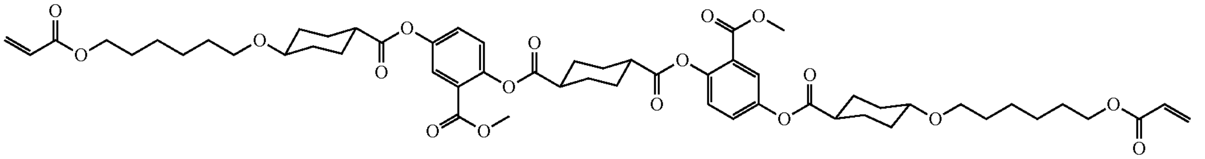
11
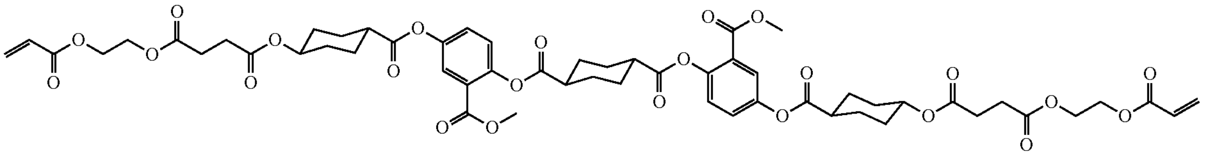
12
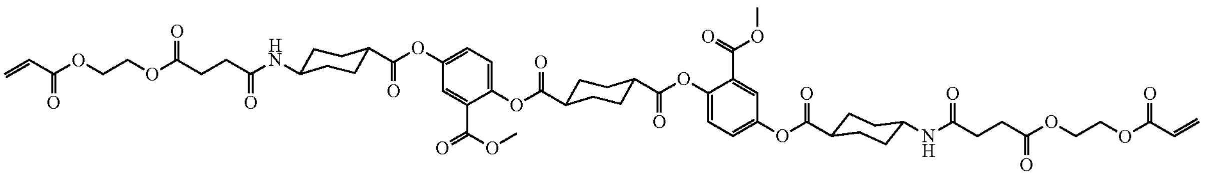
13
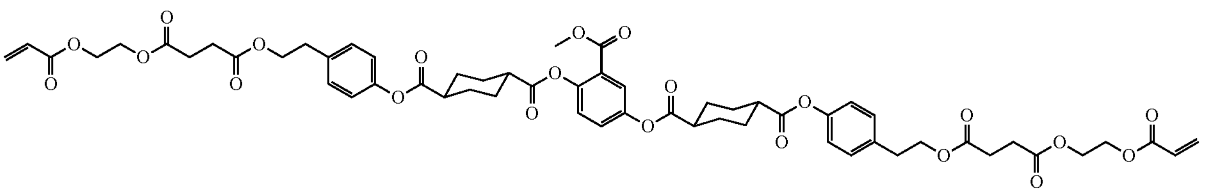
14
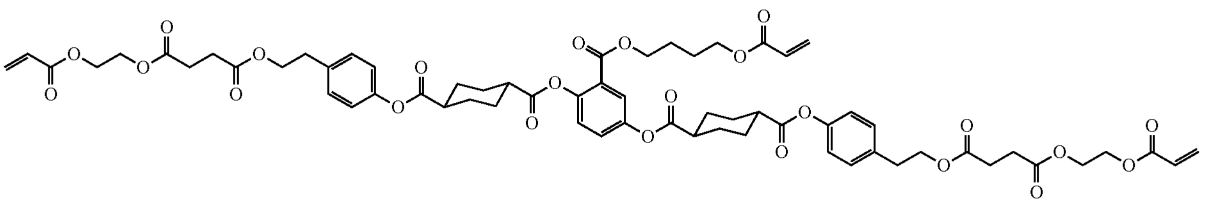

-continued
15
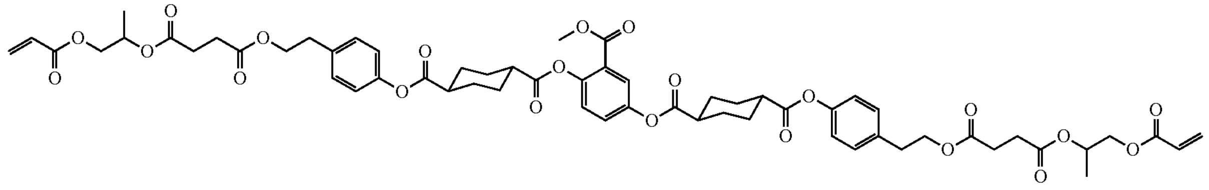
16
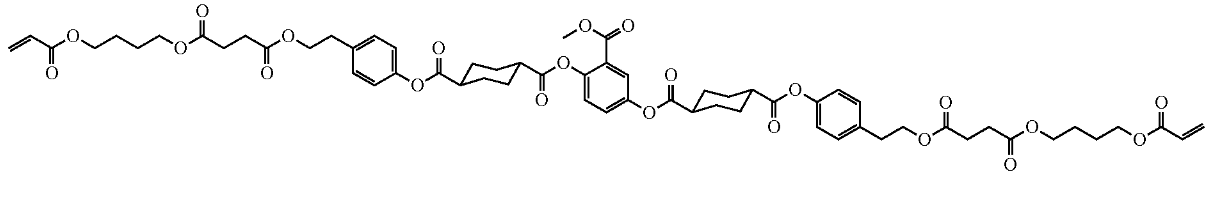
17
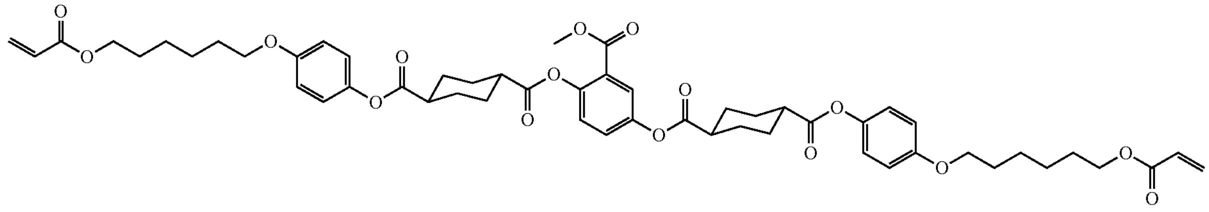
18
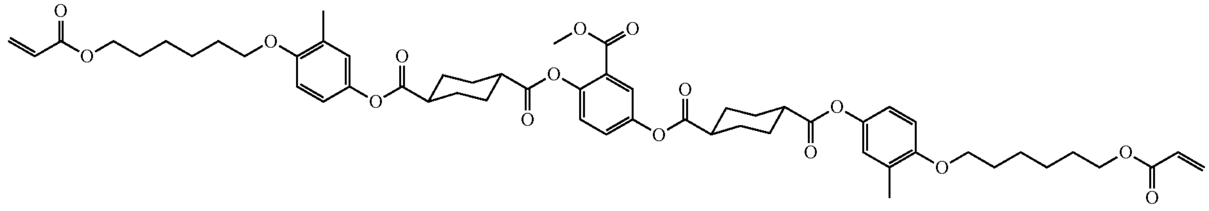
19
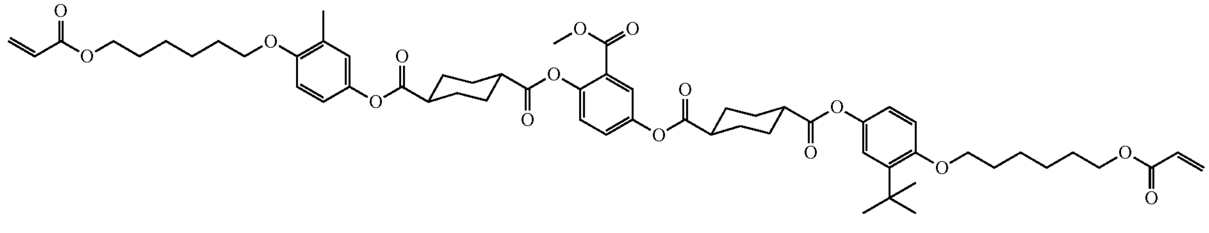
20
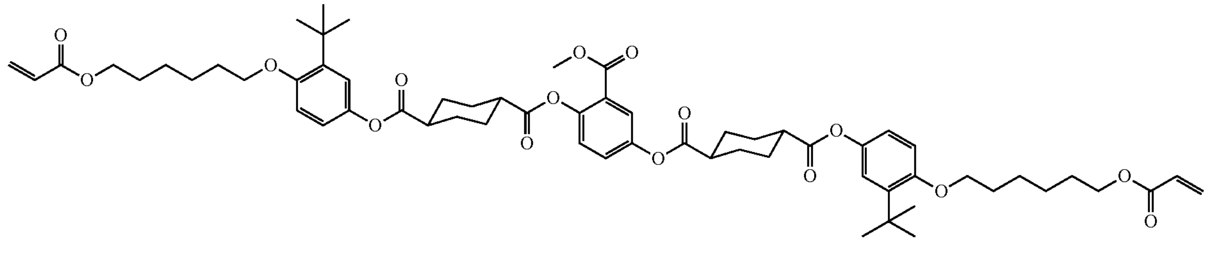

-continued
21
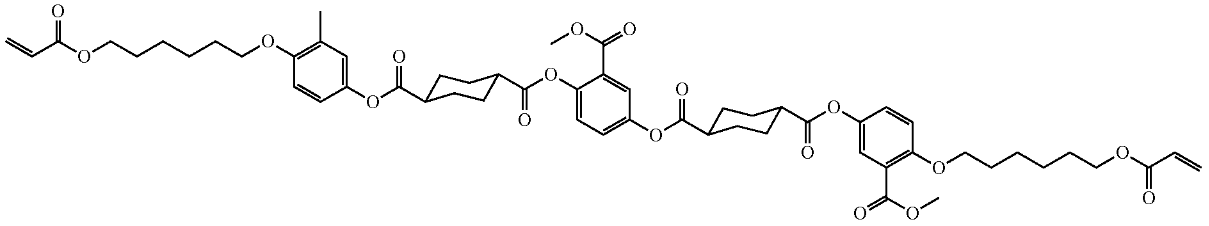
22
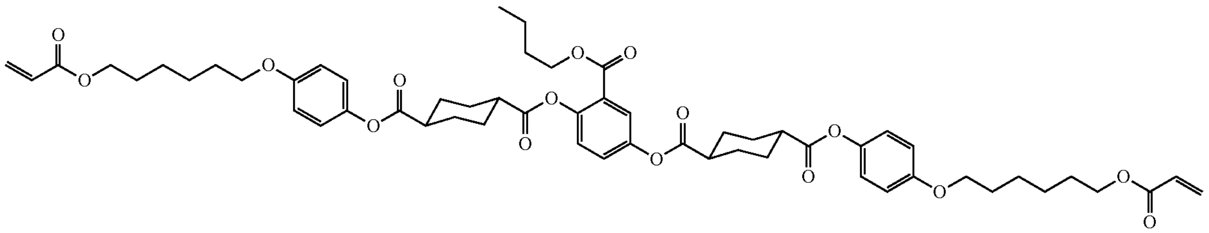
23
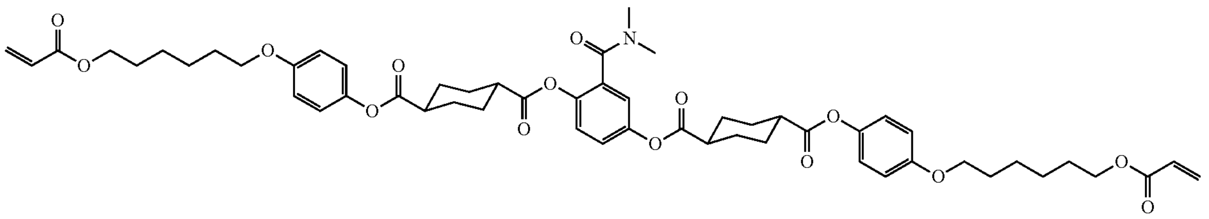
24
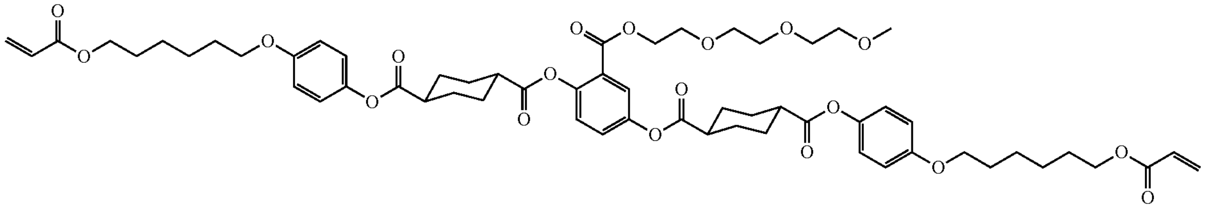
25
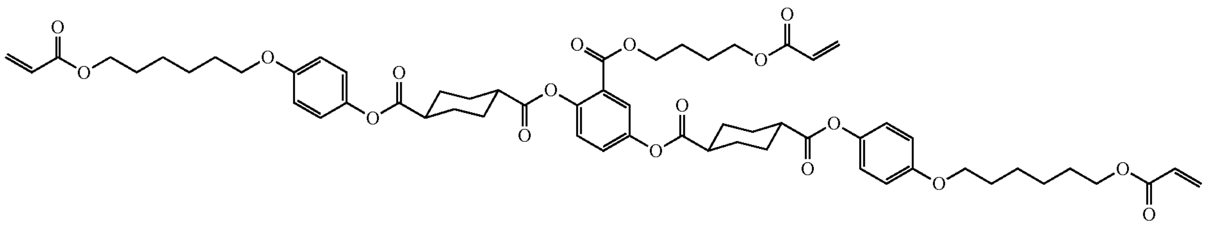
26
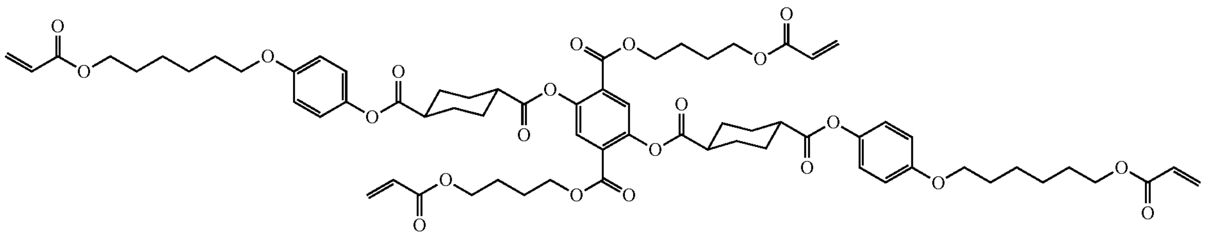

-continued
27
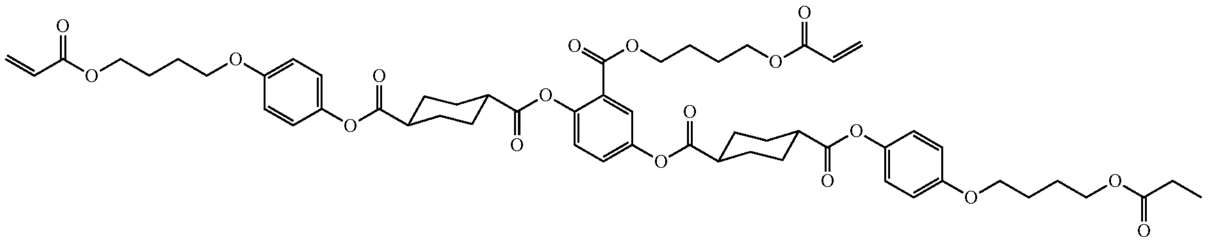
28
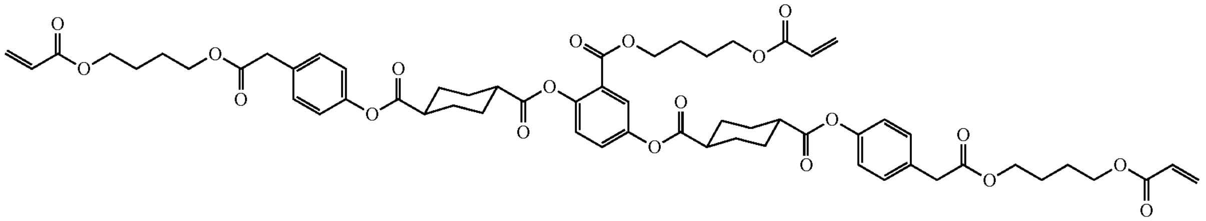
29
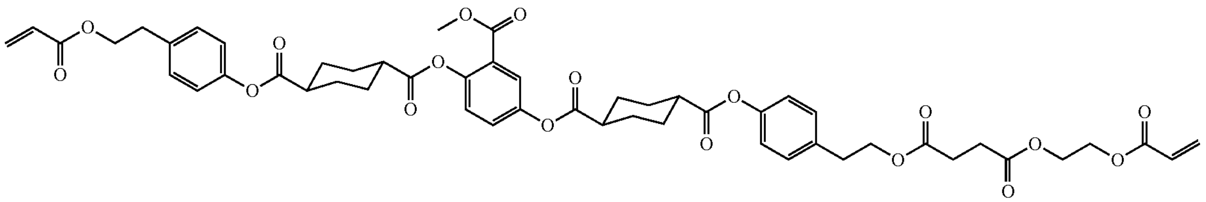
30
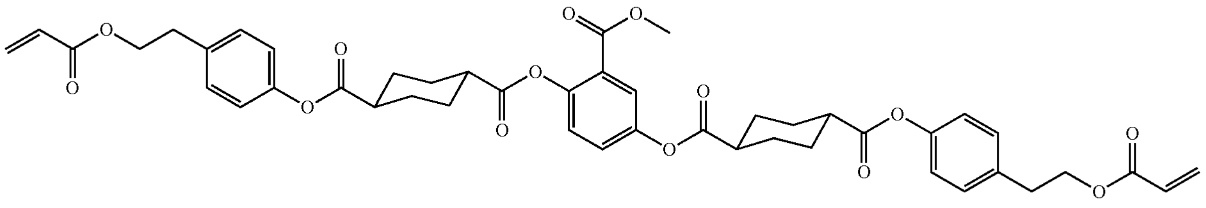
31
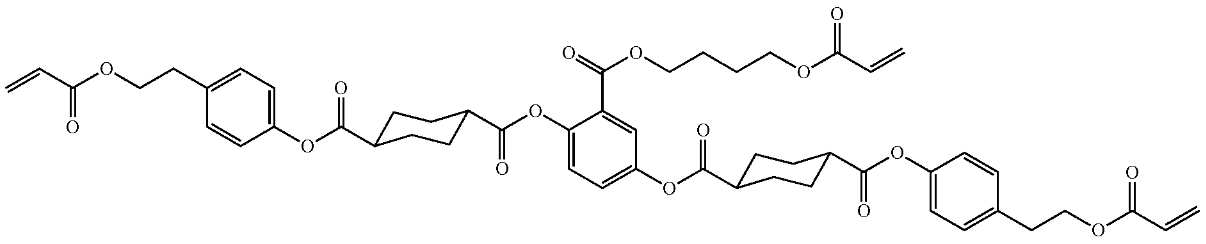
32
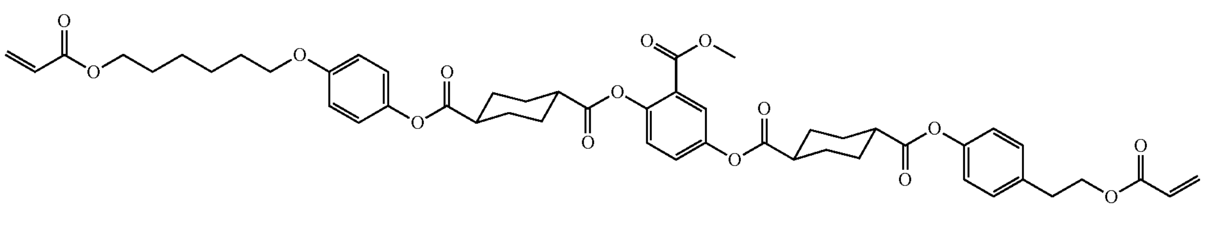

-continued
33
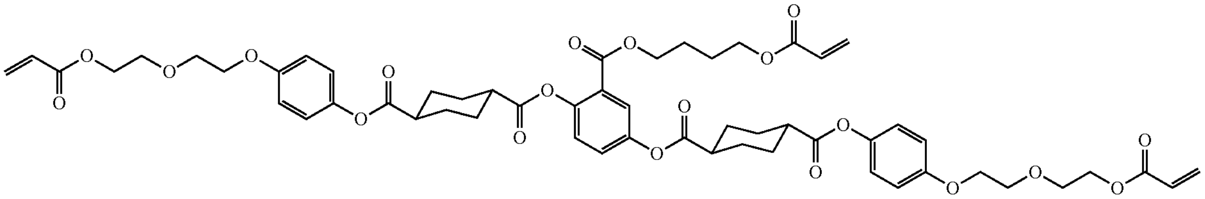
34
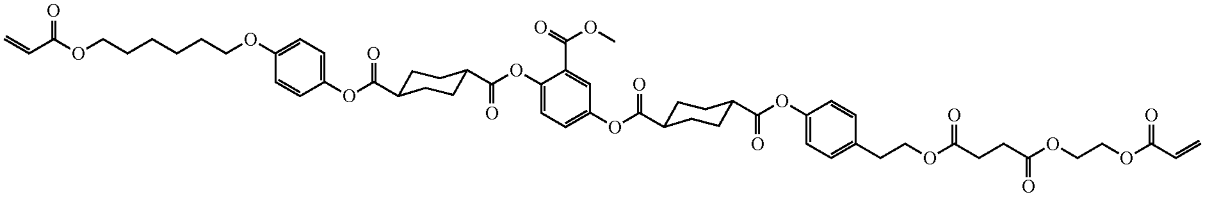
35
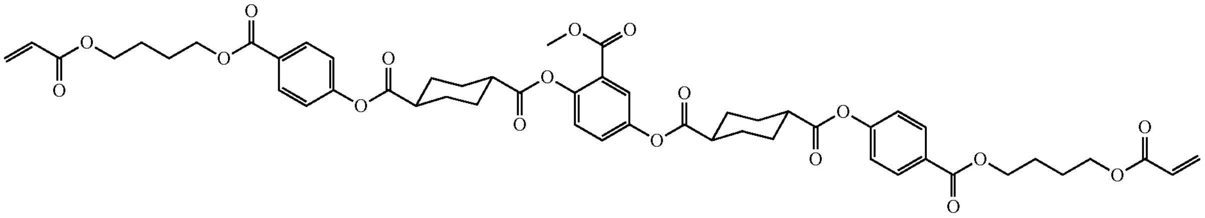
36
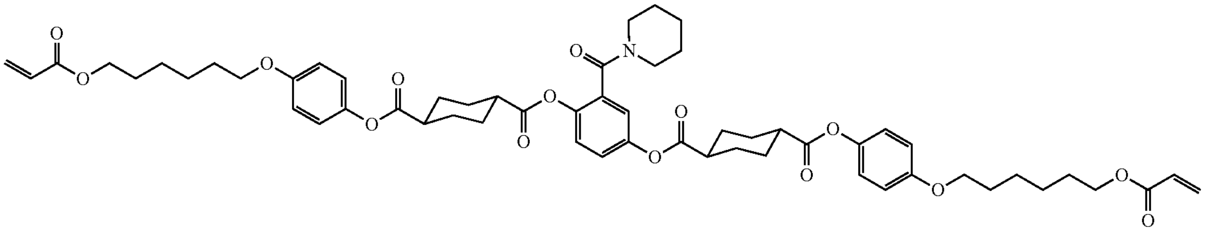
I-1-56
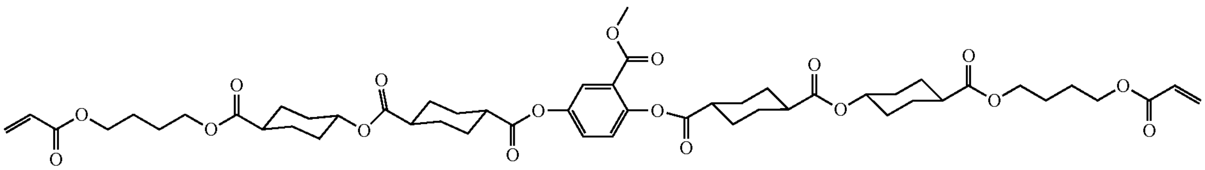
I-1-57
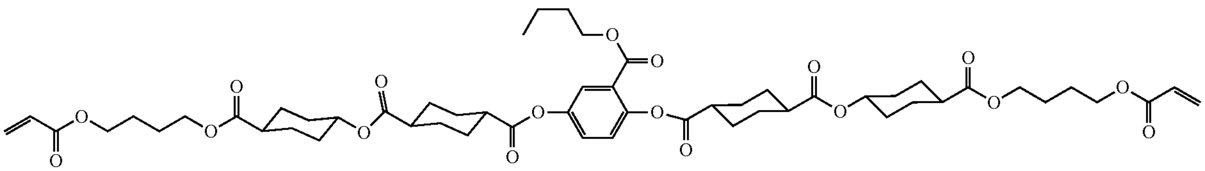
I-1-58
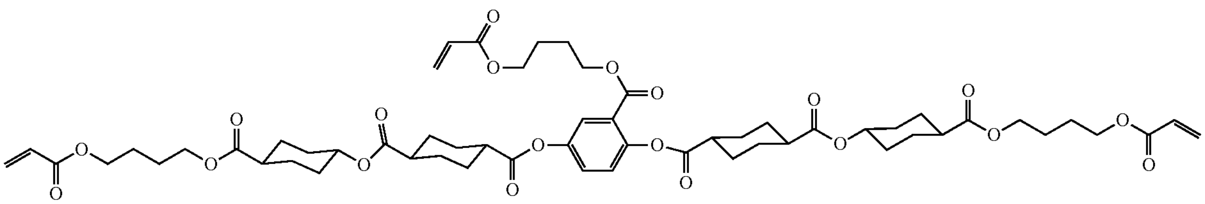

-continued

I-1-59

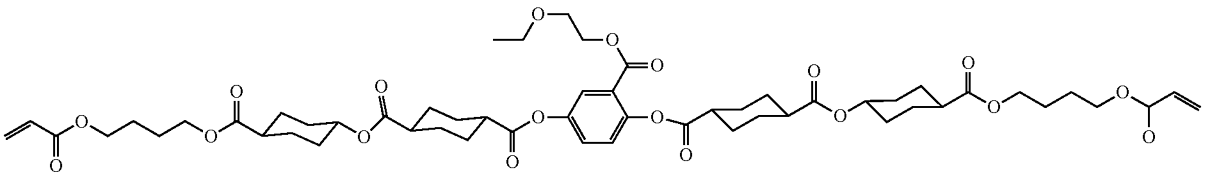

Two or more liquid crystal compounds may be used in combination. For example, two or more liquid crystal compounds represented by Formula (I) may be used in combination.

Among these, it is preferable to use a liquid crystal compound which is a liquid crystal compound represented by Formula (I) and satisfies 0.1<mc<0.3, together with the liquid crystal compound which is a liquid crystal compound represented by Formula (I) and satisfies 0.4≤mc≤0.8.

As the liquid crystal compound which is a liquid crystal compound represented by Formula (I) and satisfies 0.1<mc<0.3, the following compounds are exemplified.

2-1

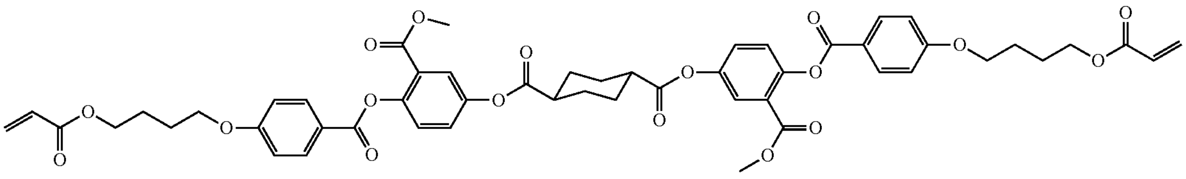

2-2

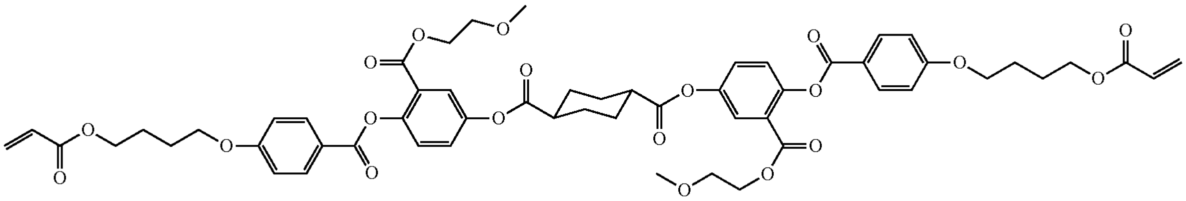

2-3

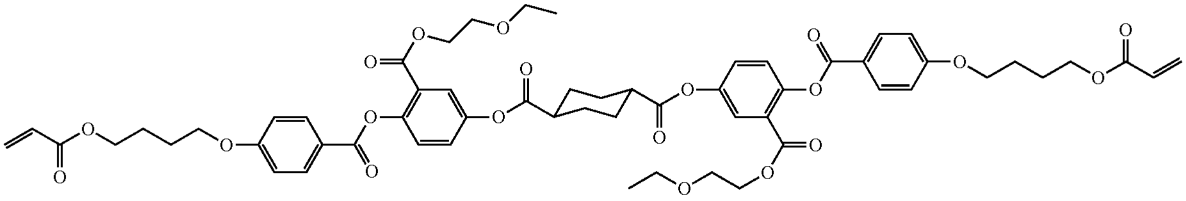

2-4

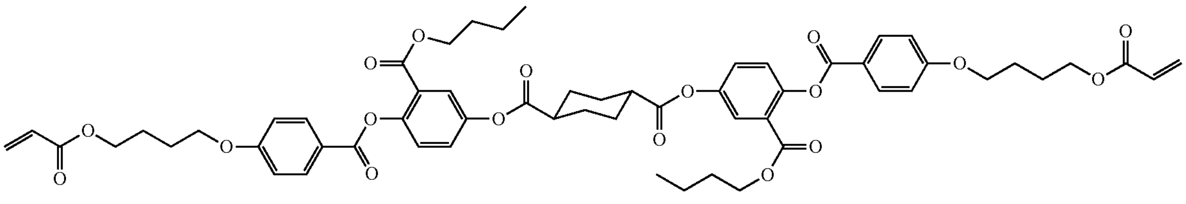

2-5

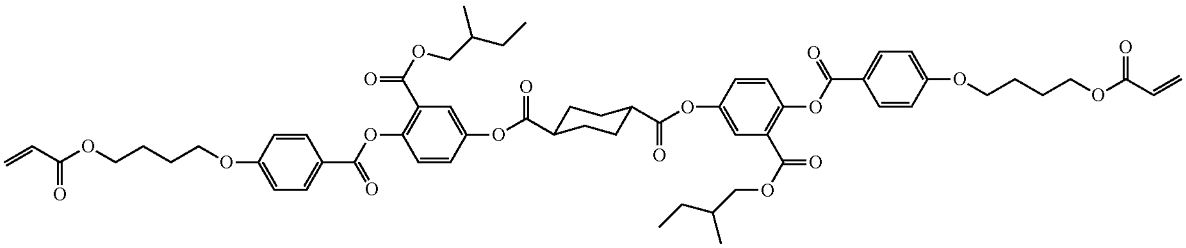

-continued
2-6
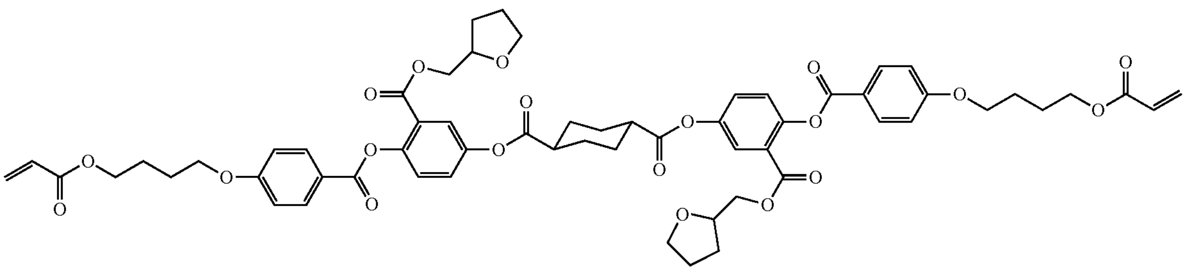
2-7
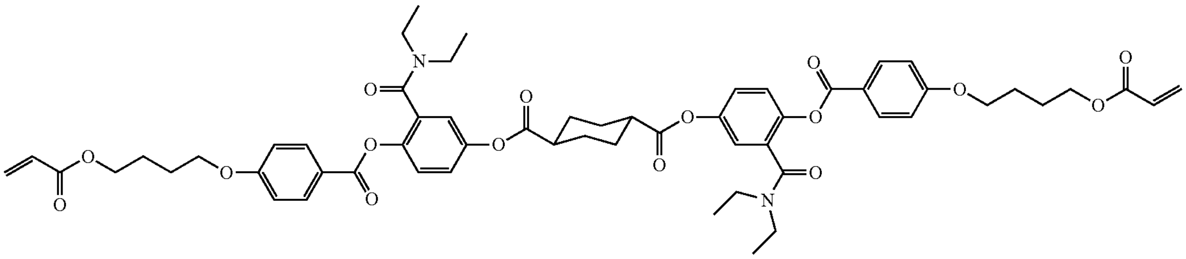
2-8
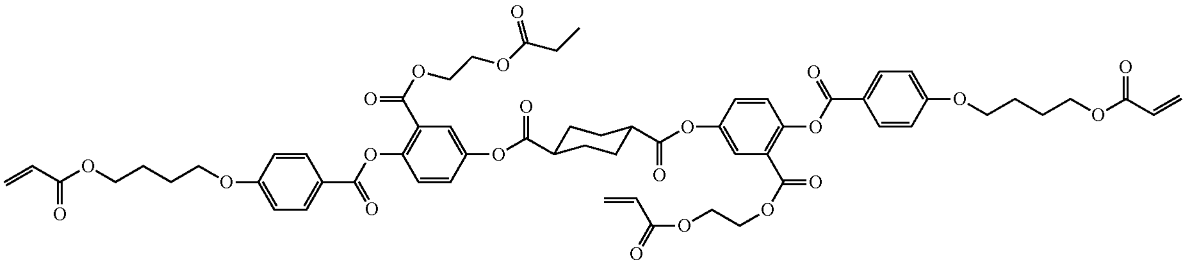
2-9
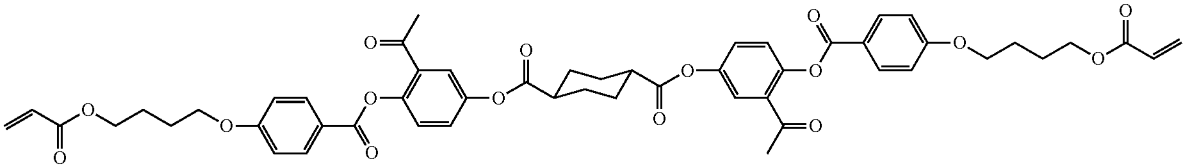
2-10
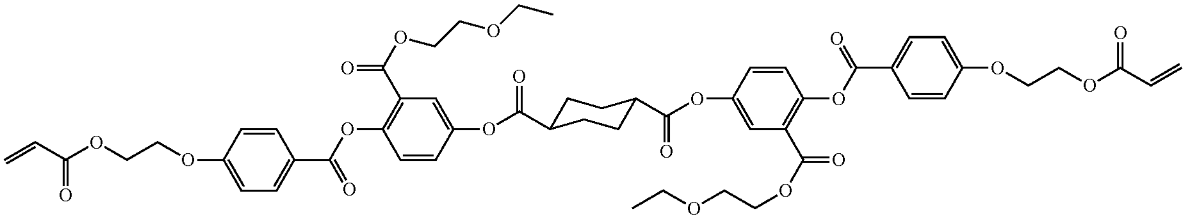
2-11
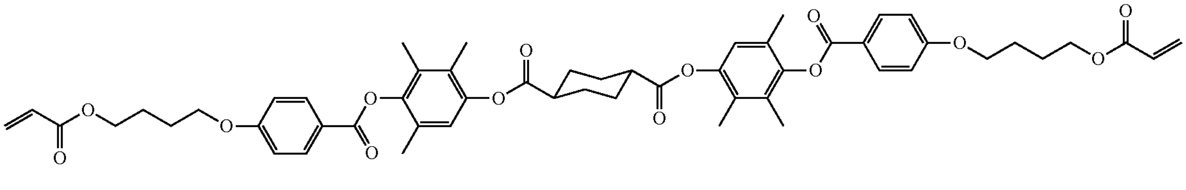

-continued
2-12
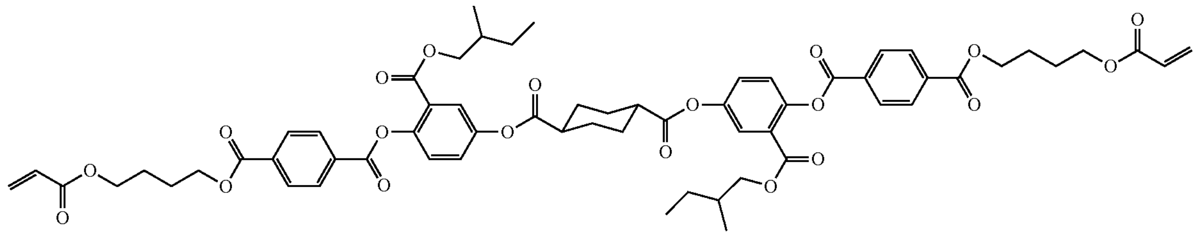
2-13
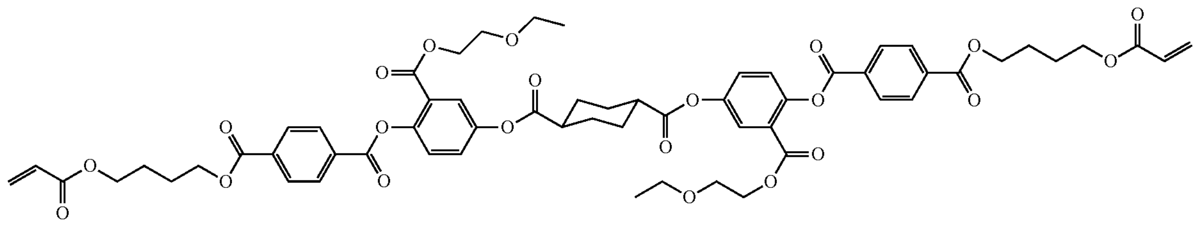
2-14
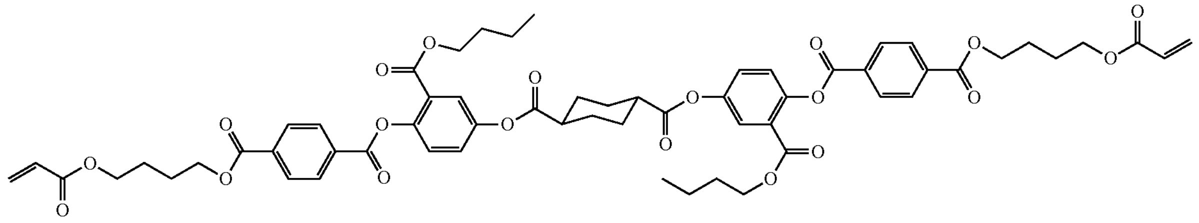
2-15
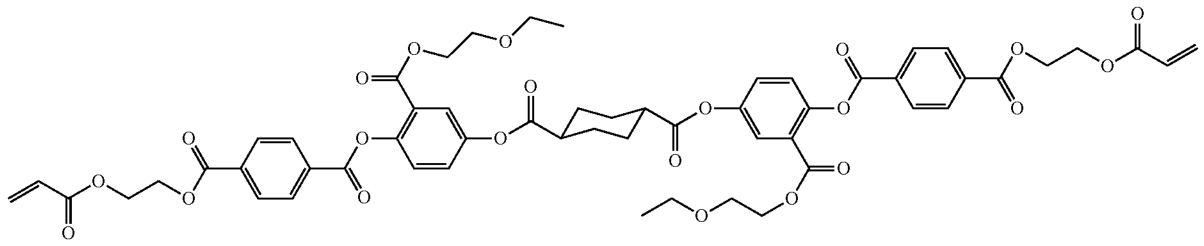
2-16
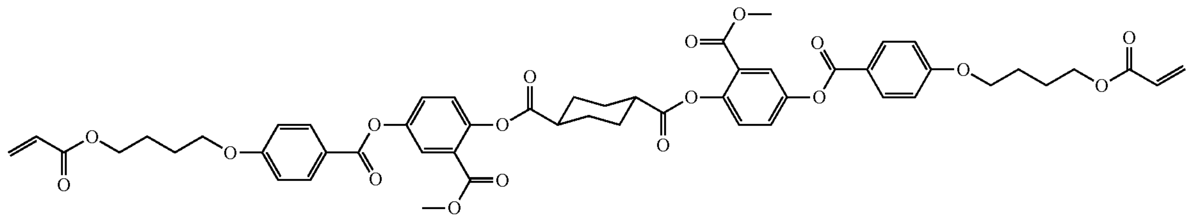
2-17
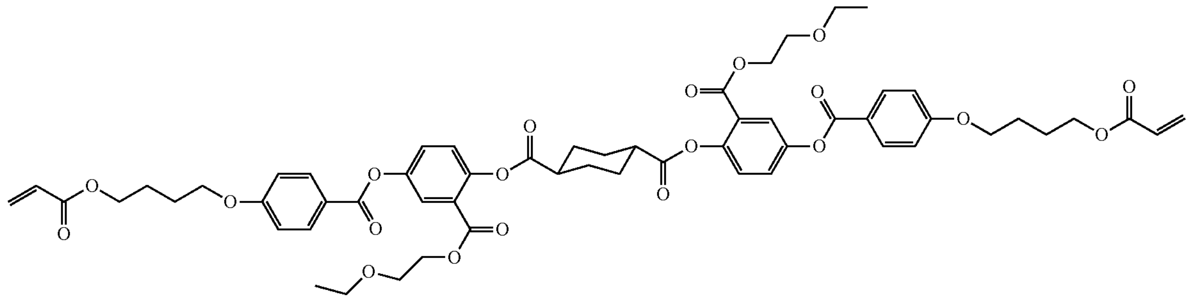

-continued
2-18
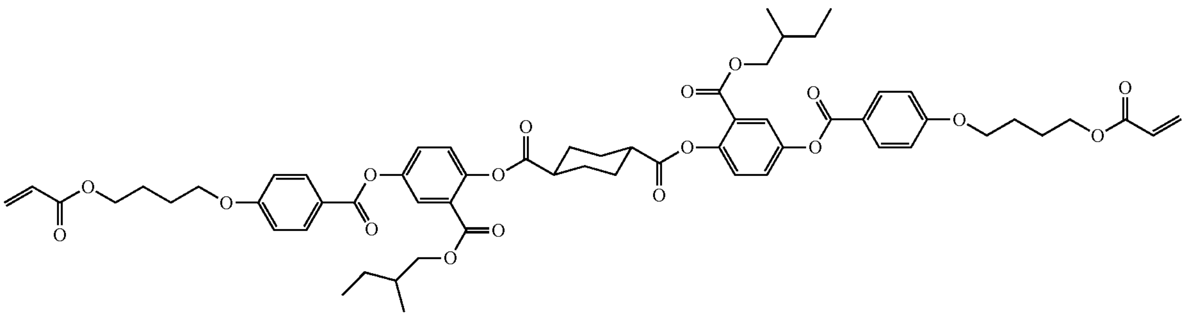
2-19
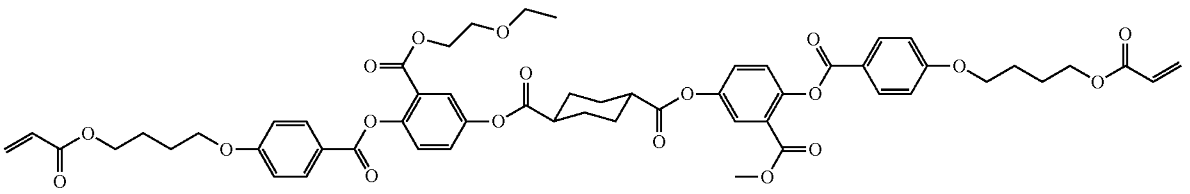
2-20
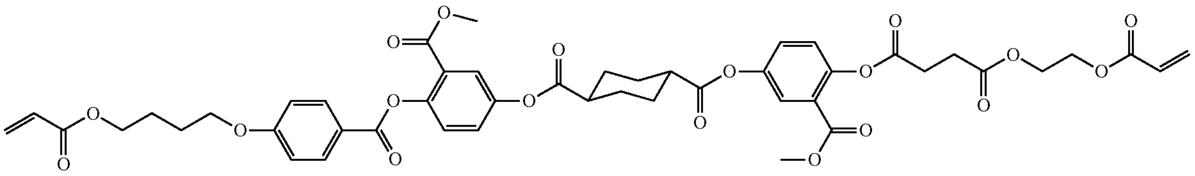
2-21
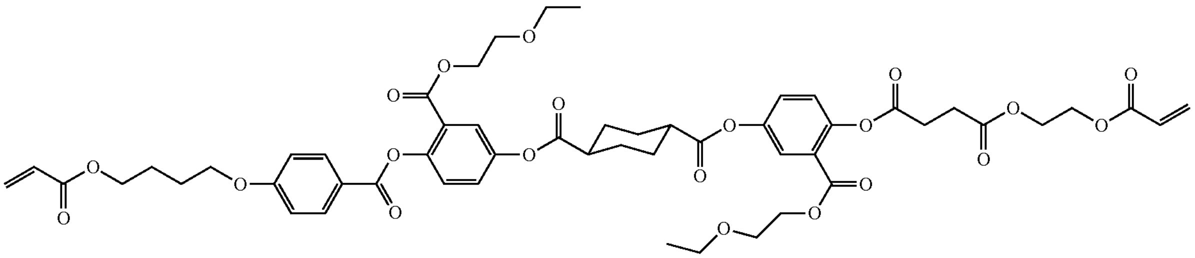
2-22
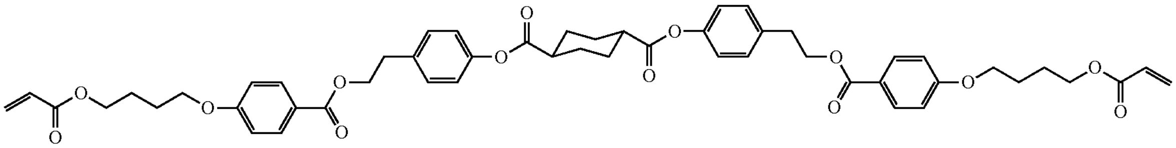
2-23
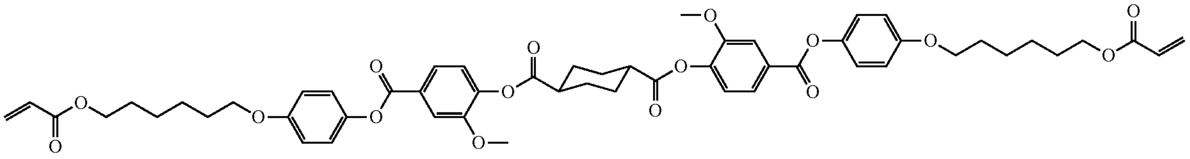

-continued
2-24
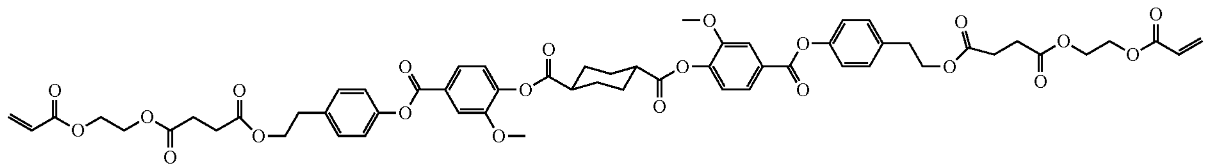
2-28
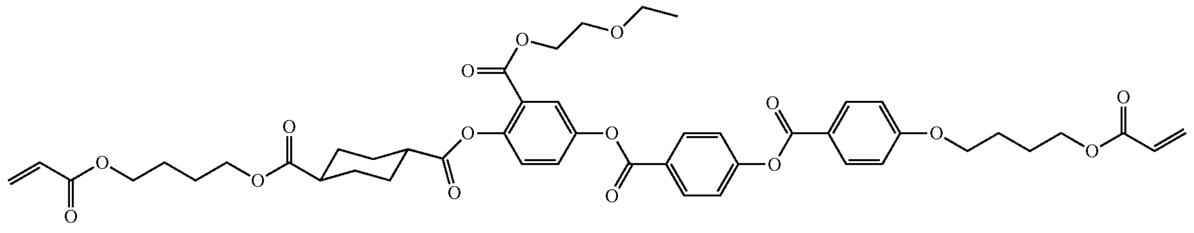
2-29
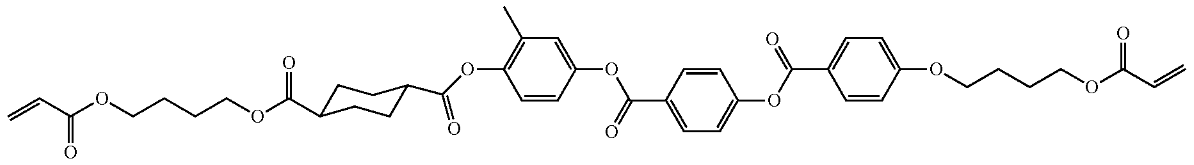
2-30
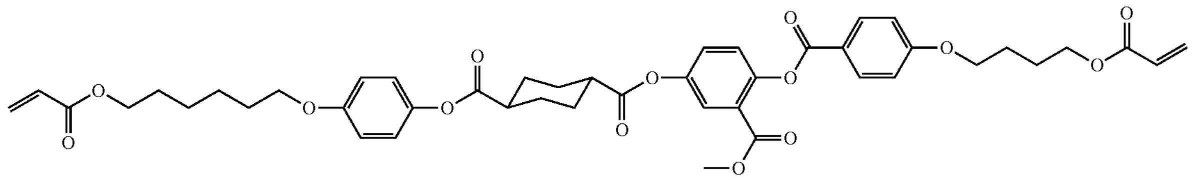
2-31
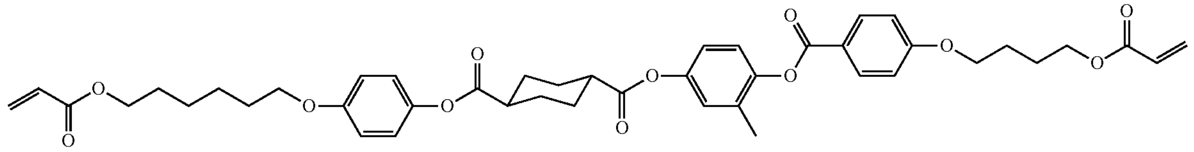
2-32
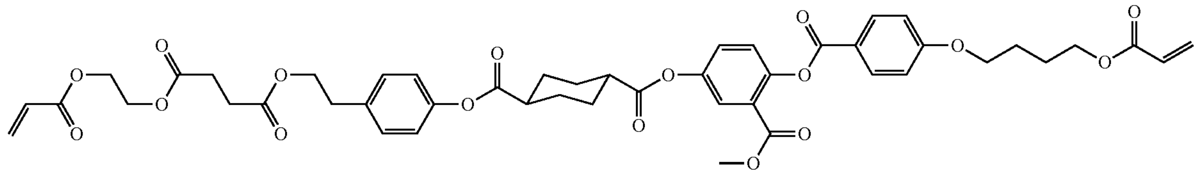

-continued 2-33

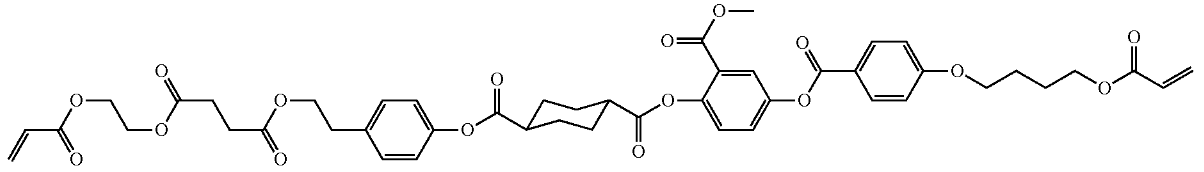

As the liquid crystal compound for use in the present invention, a compound represented by Formula (IV) and described in JP2014-198814A, in particular, a polymerizable liquid crystal compound having one (meth)acrylate group represented by Formula (IV) is also suitably used.

Formula (IV)

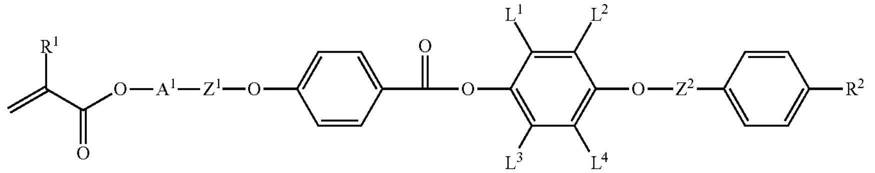

In Formula (IV), $A^1$ represents an alkylene group having 2 to 18 carbon atoms, in which one $CH_2$ in the alkylene group or two or more non-adjacent $CH_2$ may be substituted with —O—;

$Z^1$ represents —C(=O)—, —O—C(=O)—, or a single bond;

$Z^2$ represents —C(=O)— or —C(=O)—CH=CH—;

$R^1$ represents a hydrogen atom or a methyl group;

$R^2$ represents a hydrogen atom, a halogen atom, a linear alkyl group having 1 to 4 carbon atoms, a methoxy group, an ethoxy group, a phenyl group which may have a substituent, a vinyl group, a formyl group, a nitro group, a cyano group, an acetyl group, an acetoxy group, an N-acetylamide group, an acryloylamino group, an N,N-dimethylamino group, a maleimide group, a methacryloylamino group, an allyloxy group, an allyloxycarbamoyl group, an N-alkyloxycarbamoyl group in which the alkyl group has 1 to 4 carbon atoms, an N-(2-methacryloyloxyethyl)carbamoyloxy group, an N-(2-acryloyloxyethyl)carbamoyloxy group, or a structure represented by Formula (IV-2); and $L^1$, $L^2$, $L^3$, and $L^4$ each independently represent an alkyl group having 1 to 4 carbon atoms, an alkoxy group having 1 to 4 carbon atoms, an alkoxycarbonyl group having 2 to 5 carbon atoms, an acyl group having 2 to 4 carbon atoms, a halogen atom, or a hydrogen atom, and at least one of $L^1$, $L^2$, $L^3$, or $L^4$ represents a group other than a hydrogen atom.

$$—Z^5\text{-T-Sp-P} \qquad \text{Formula (IV-2)}$$

In Formula (IV-2), P represents an acryl group, a methacryl group, or a hydrogen atom, and $Z^5$ represents a single bond, C(=O)O—, —OC(=O)—, —C(=O)NR$^1$— (where $R^1$ represents a hydrogen atom or a methyl group), —NR$^1$C(=O)—, —C(=O)S—, or —SC(=O)—, T represents 1,4-phenylene, and Sp represents a divalent aliphatic group having 1 to 12 carbon atoms which may have a substituent, in which one $CH_2$ in the aliphatic group or two or more non-adjacent $CH_2$ may be substituted with —O—, —S—, —OC(=O)—, —C(=O)O—, or —OC(=O)O—.

The compound represented by Formula (IV) is preferably a compound represented by Formula (V).

Formula (V)

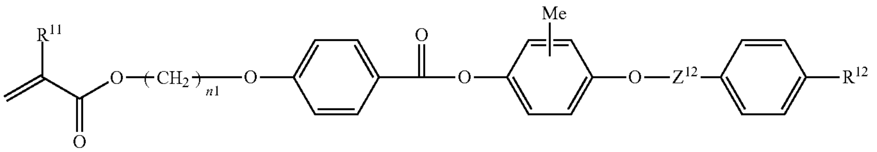

In Formula (V), n1 represents an integer of 3 to 6;

$R^{11}$ represents a hydrogen atom or a methyl group;

$Z^{12}$ represents —C(=O)— or —C(=O)—CH=CH—; and $R^{12}$ represents a hydrogen atom, a linear alkyl group having 1 to 4 carbon atoms, a methoxy group, an ethoxy group, a phenyl group, an acryloylamino group, a methacryloylamino group, an allyloxy group, or a structure represented by Formula (IV-3).

$$—Z^{51}\text{-T-Sp-P} \qquad \text{Formula (IV-3)}$$

In Formula (IV-3), P represents an acryl group or a methacryl group;

$Z^{51}$ represents —C(=O)O— or —OC(=O)—; T represents 1,4-phenylene; and

Sp represents a divalent aliphatic group having 2 to 6 carbon atoms which may have a substituent. One $CH_2$ in this aliphatic group or two or more non-adjacent $CH_2$ may be substituted with —O—, —OC(=O)—, —C(=O)O—, or —OC(=O)O—.

n1 represents an integer of 3 to 6, preferably 3 or 4.

$Z^{12}$ represents —C(═O)— or —C(═O)—CH═CH— and preferably represents —C(═O)—.

$R^{12}$ is a hydrogen atom, a linear alkyl group having 1 to 4 carbon atoms, a methoxy group, an ethoxy group, a phenyl group, an acryloylamino group, a methacryloylamino group, an allyloxy group, or a group represented by Formula (IV-3), preferably represents a methyl group, an ethyl group, a propyl group, a methoxy group, an ethoxy group, a phenyl group, an acryloylamino group, a methacryloylamino group, or a group represented by Formula (IV-3), and more preferably represents a methyl group, an ethyl group, a methoxy group, an ethoxy group, a phenyl group, an acryloylamino group, a methacryloylamino group, or a structure represented by Formula (IV-3).

Specific examples of the compound represented by Formula (IV) are shown below. However, in the present invention, the compound represented by Formula (IV) is not limited thereto.

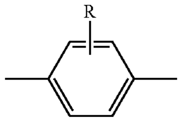

represents

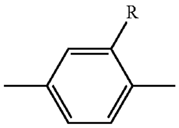

or

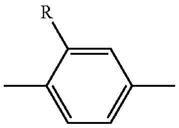

(1)

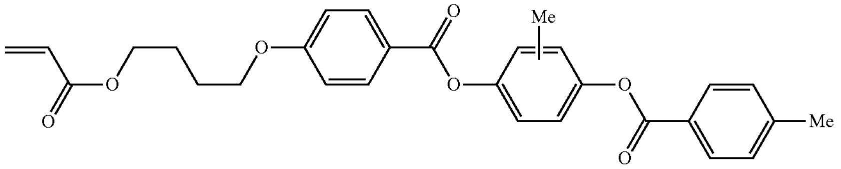

(2)

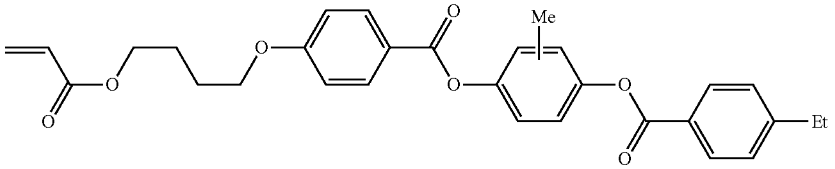

(3)

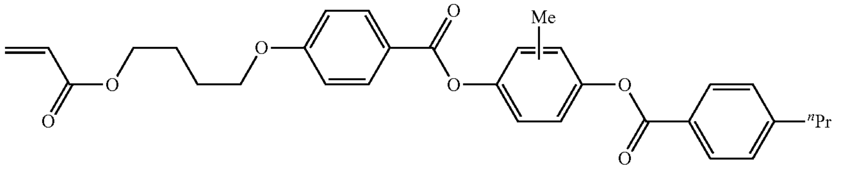

(4)

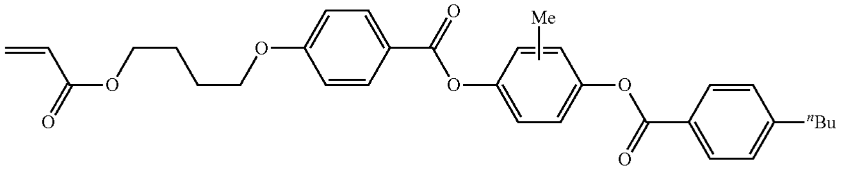

(5)

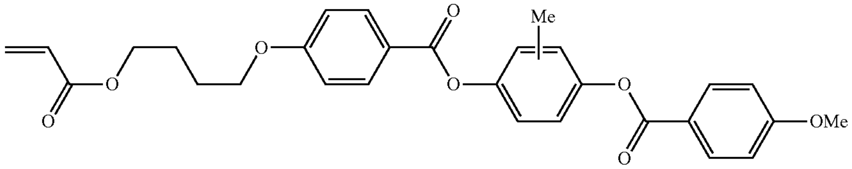

(6)

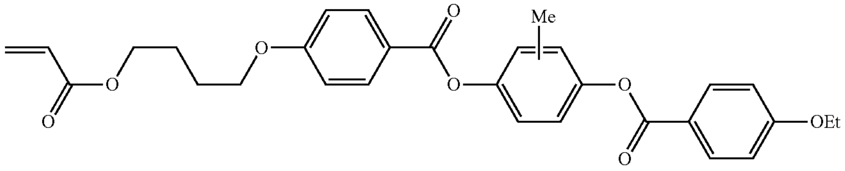

(7)

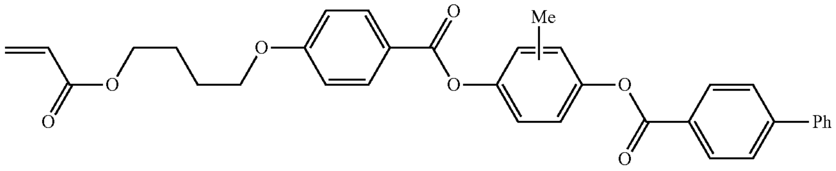

-continued
(8)
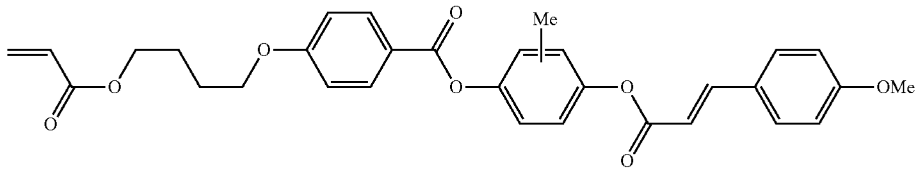
(9)
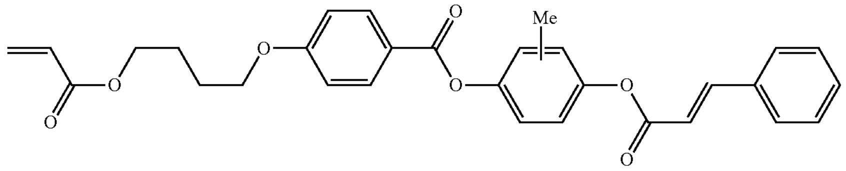
(1A)
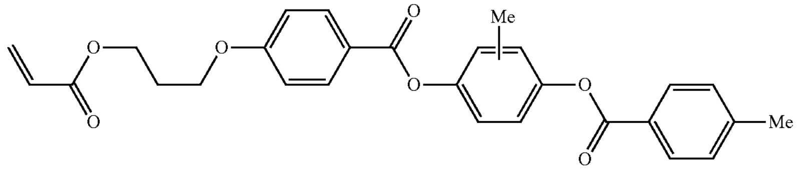
(2A)
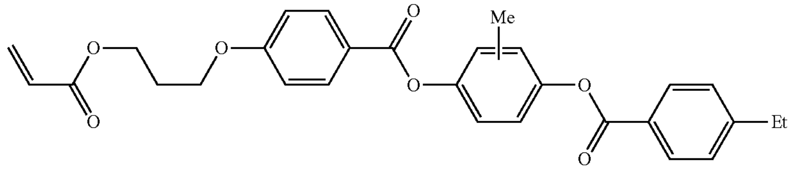
(3A)
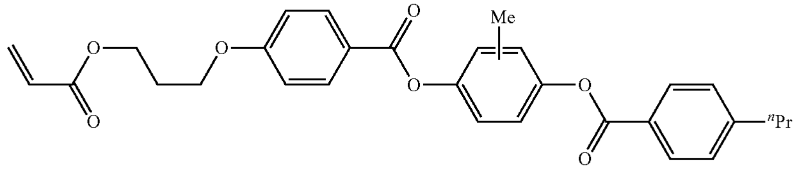
(4A)
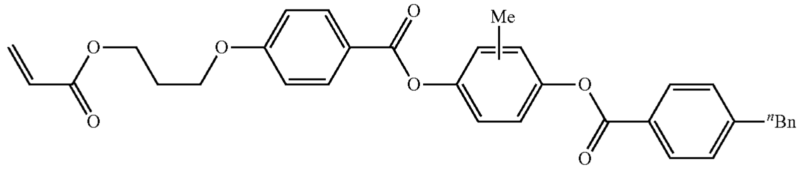
(5A)
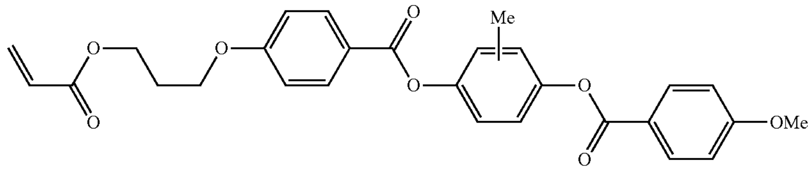
(6A)
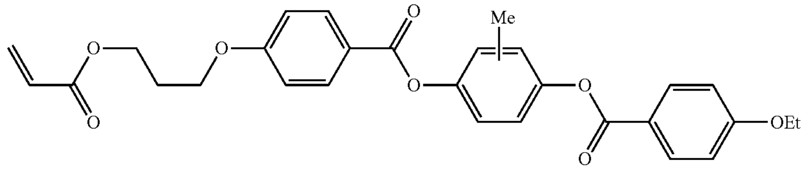
(7A)
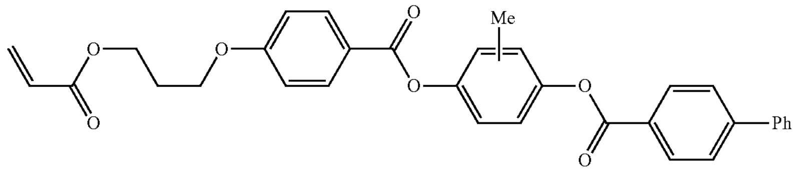

-continued
(8A)
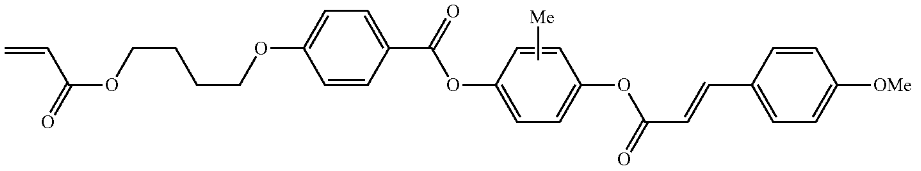
(9A)
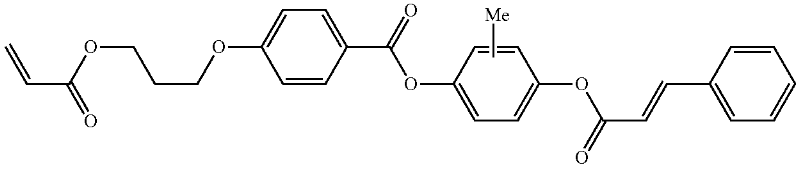
(1B)
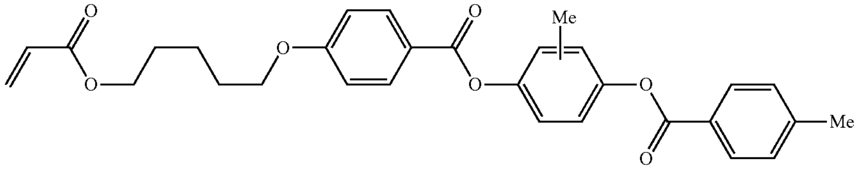
(2B)
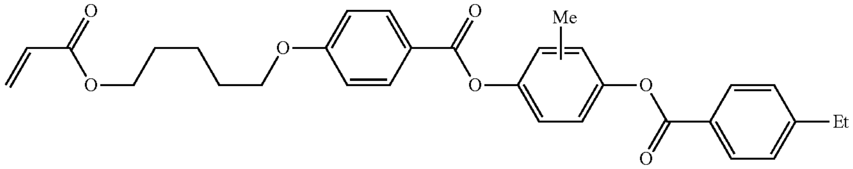
(3B)
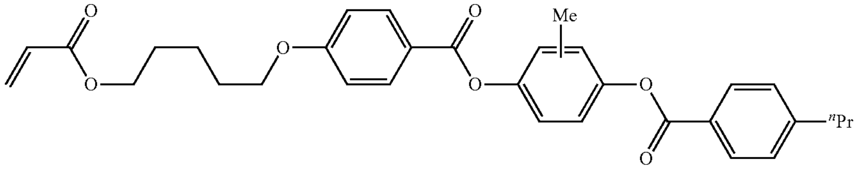
(4B)
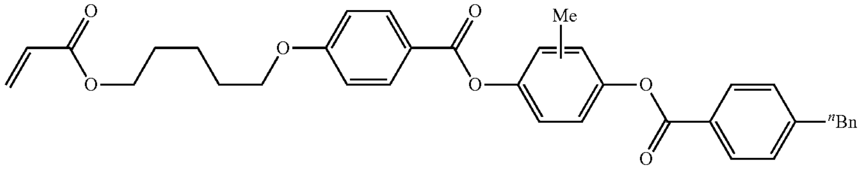
(5B)
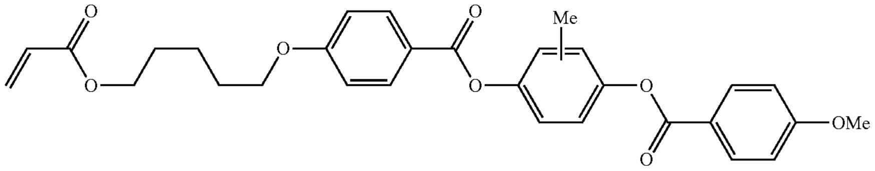
(6B)
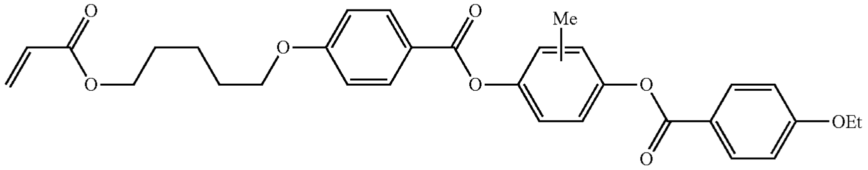
(7B)
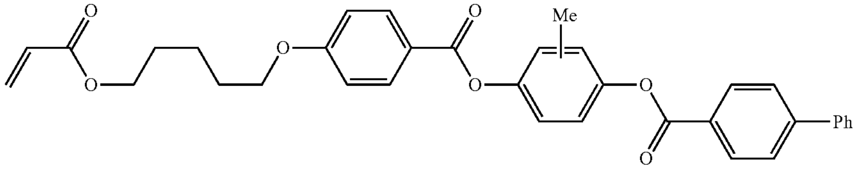

-continued
(8B)
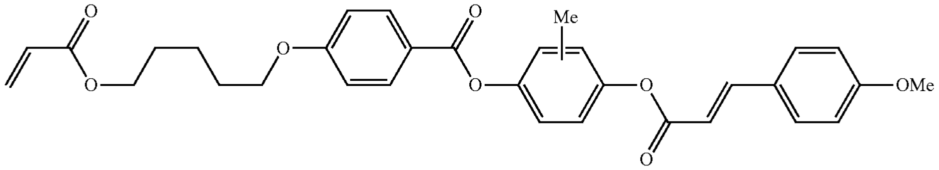
(9B)
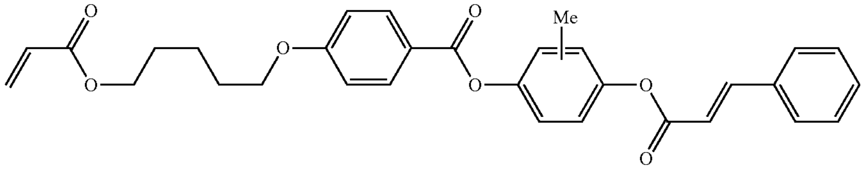
(1C)
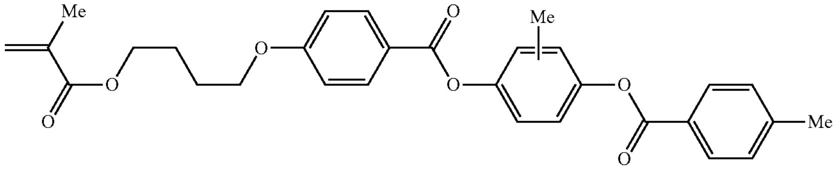
(2C)
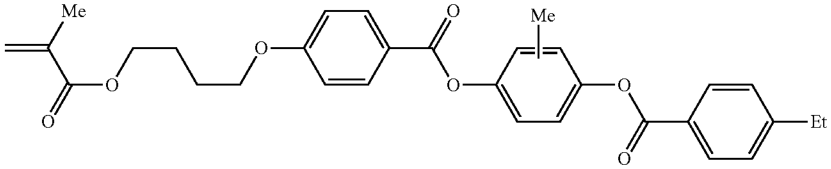
(3C)
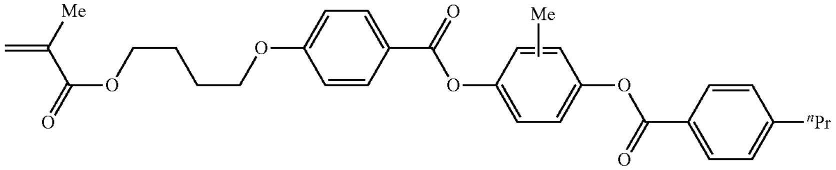
(4C)
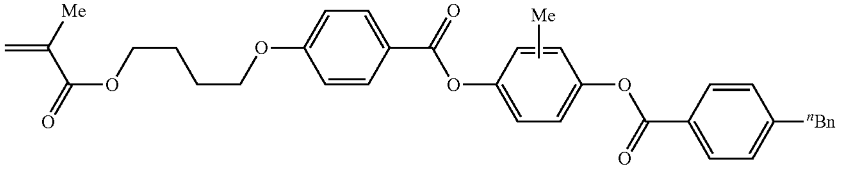
(5C)
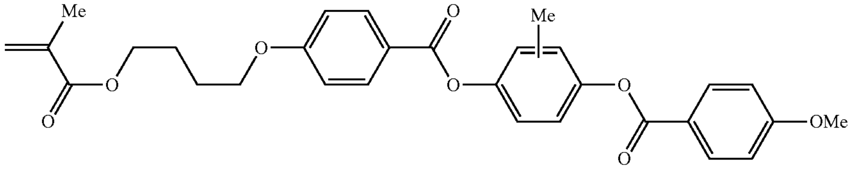
(6C)
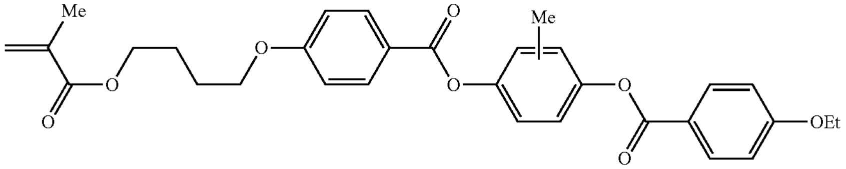
(7C)
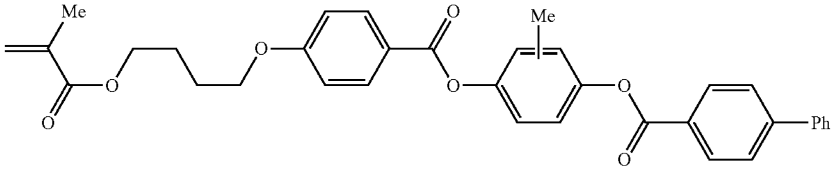

-continued
(8C)
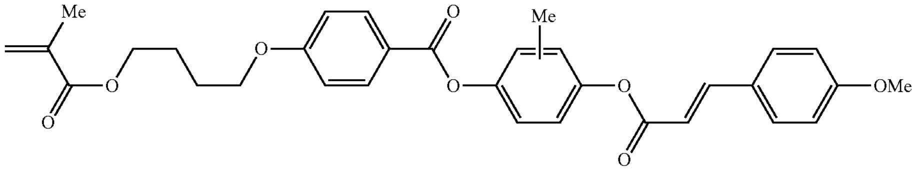
(9C)
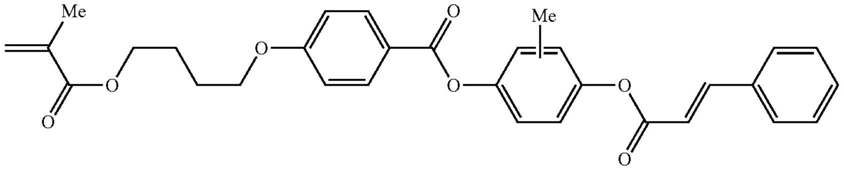
(1D)
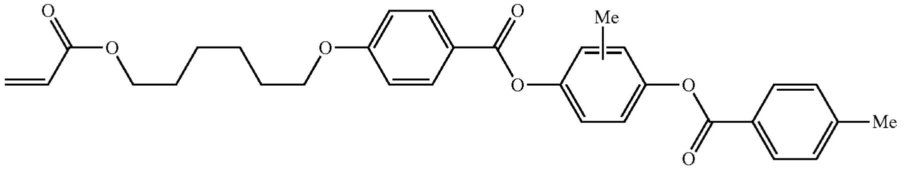
(2D)
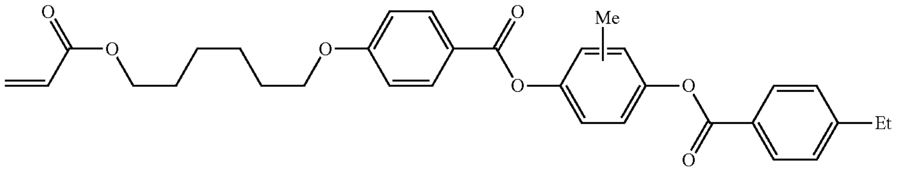
(3D)
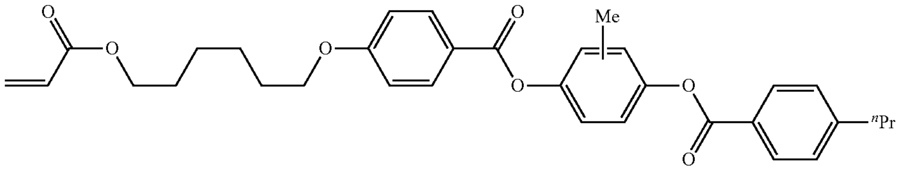
(4D)
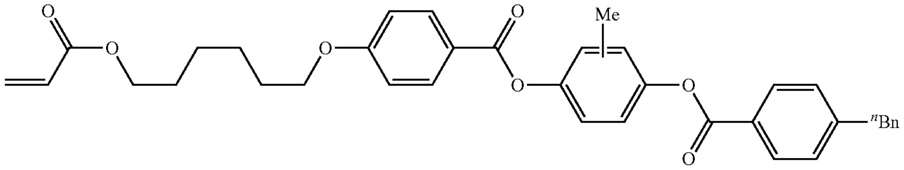
(5D)
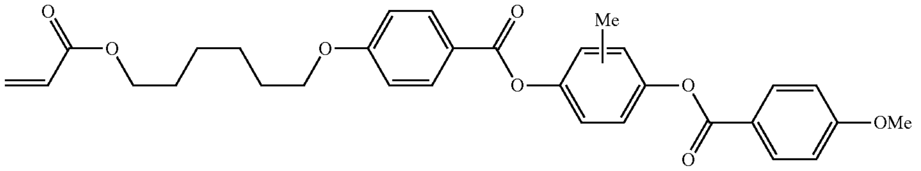
(6D)
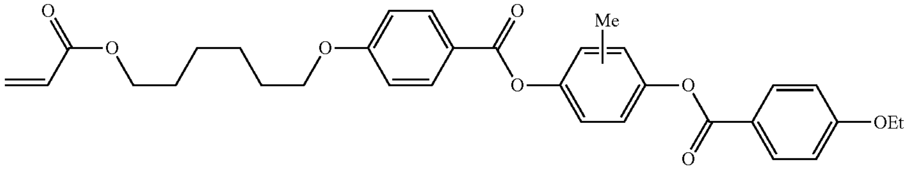
(7D)
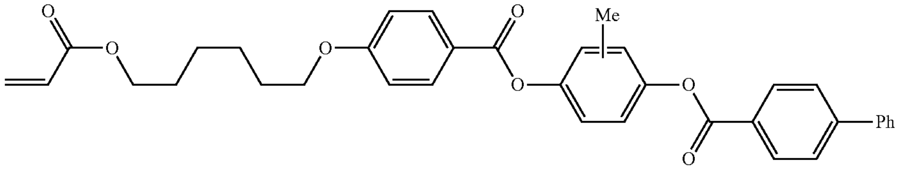

-continued
(8D)
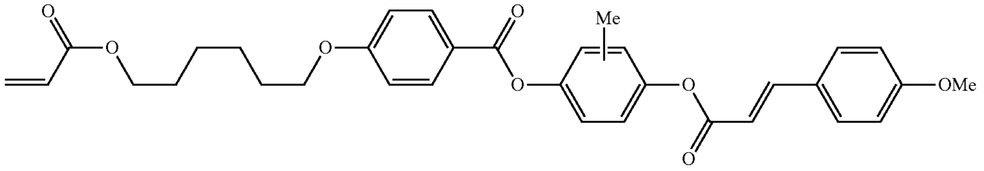
(9D)
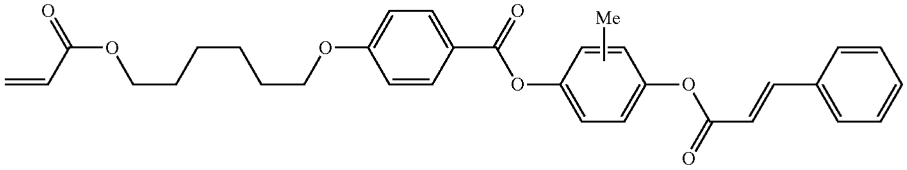
(1L)
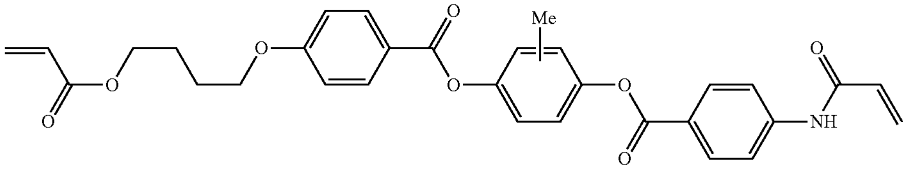
(2L)
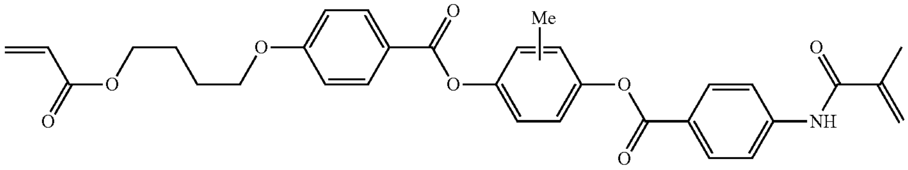
(3L)
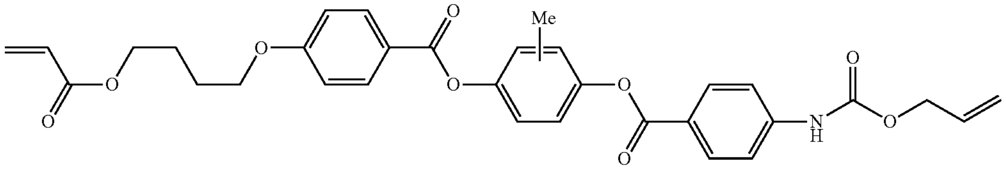
(4L)
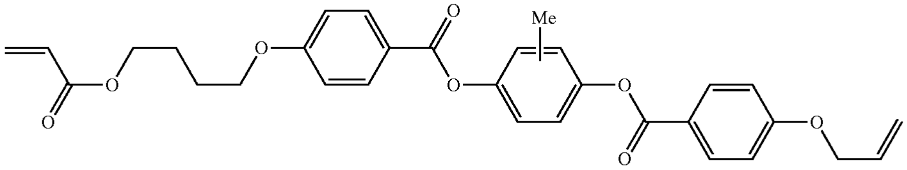
(5L)
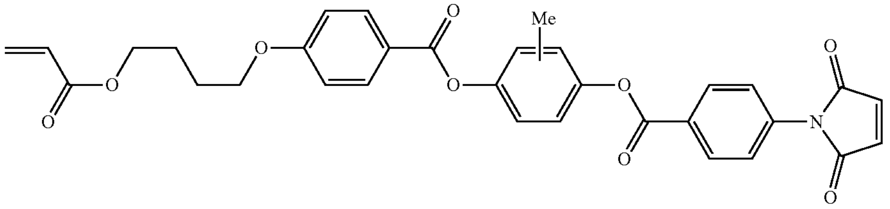
(6L)
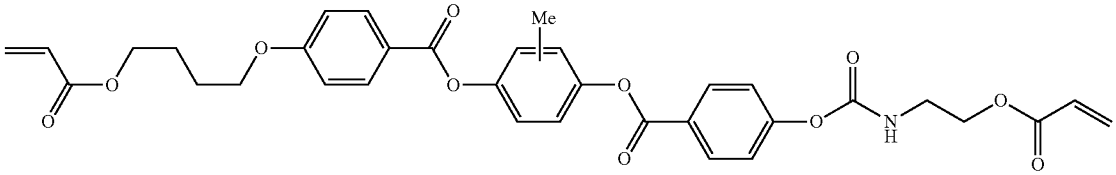

-continued
(7L)
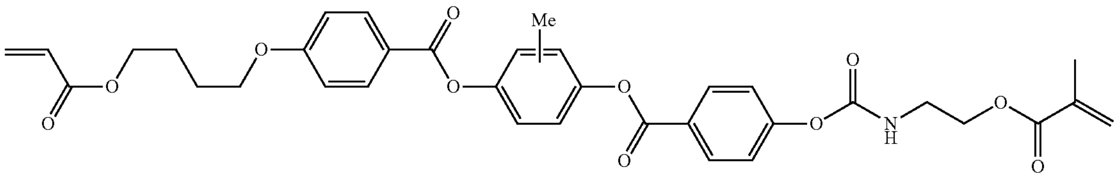
(8L)
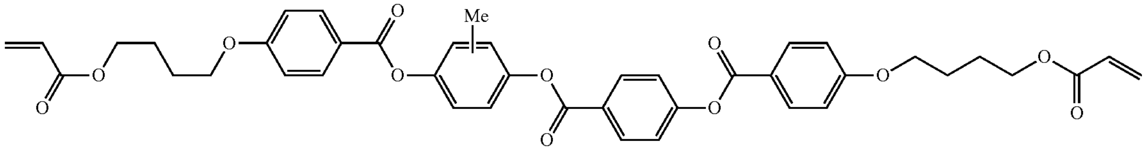
(9L)
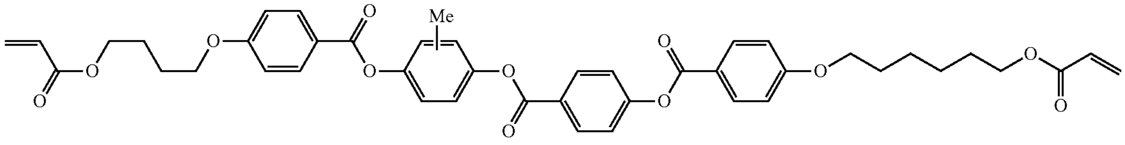
(10L)
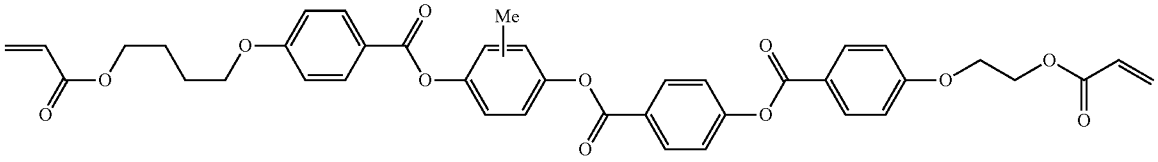
(1M)
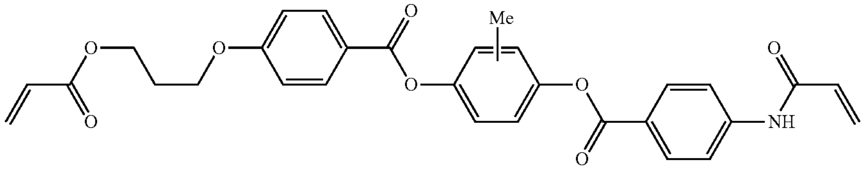
(2M)
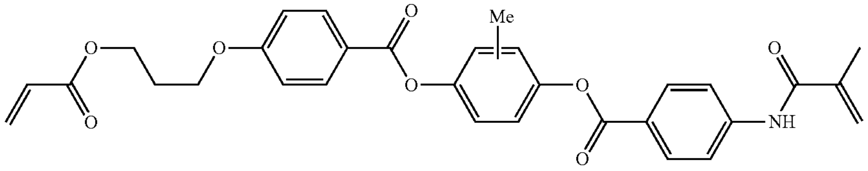
(3M)
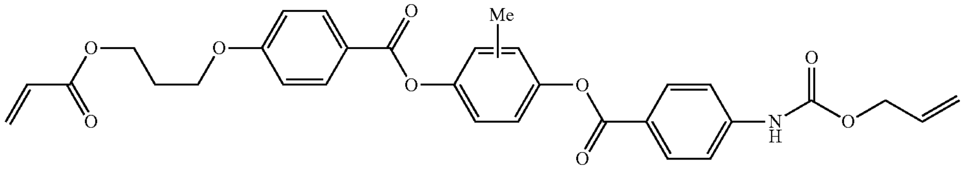
(4M)
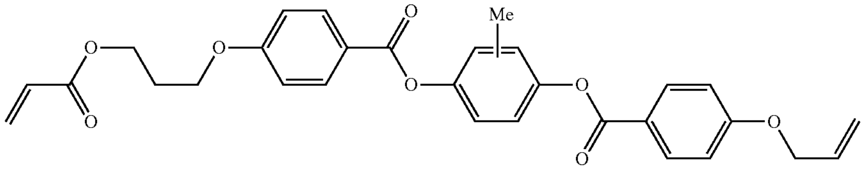

-continued
(5M)
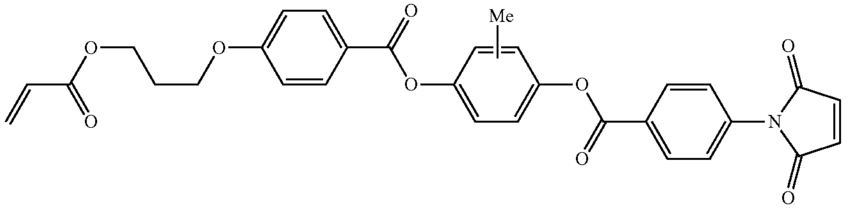
(6M)
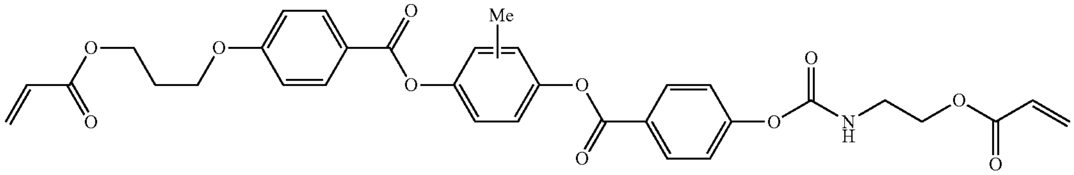
(7M)
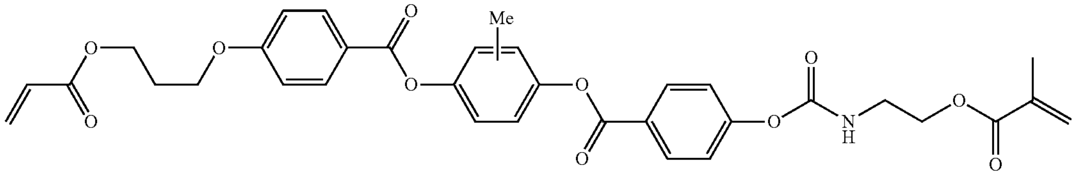
(8M)
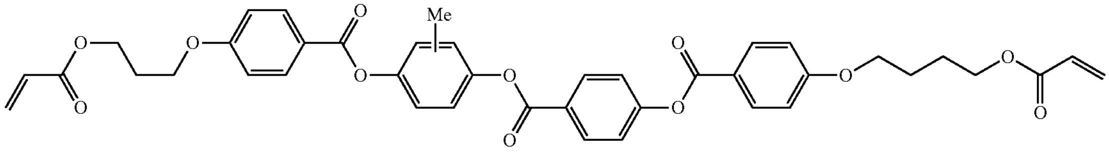
(9M)
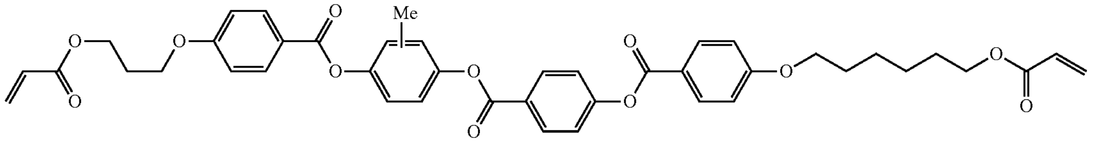
(10M)
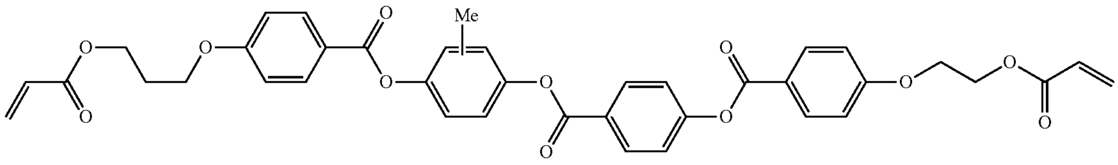
(1N)
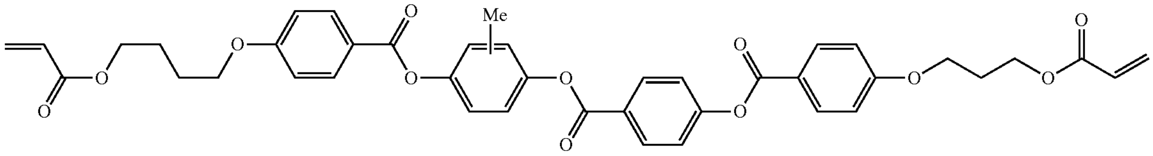
(2N)
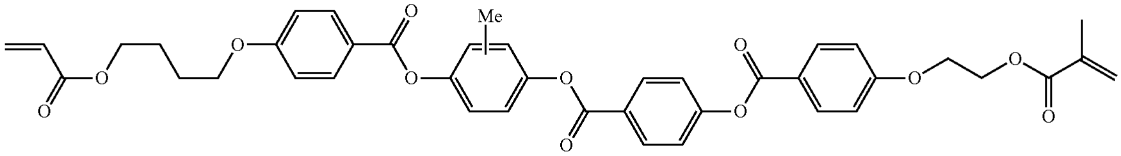

-continued
(3N)
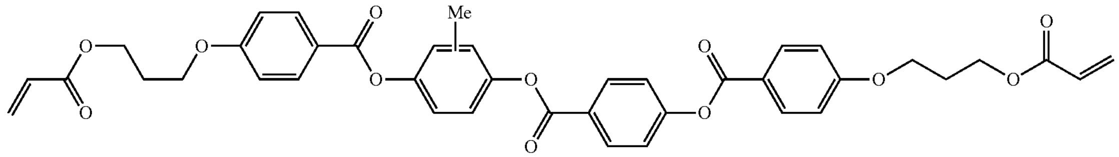
(4N)
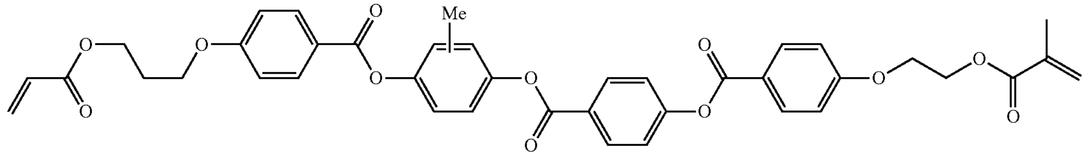
(5N)
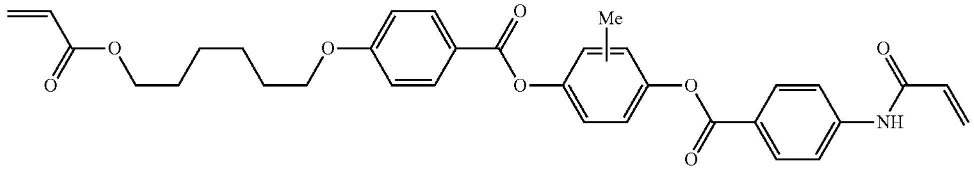
(6N)
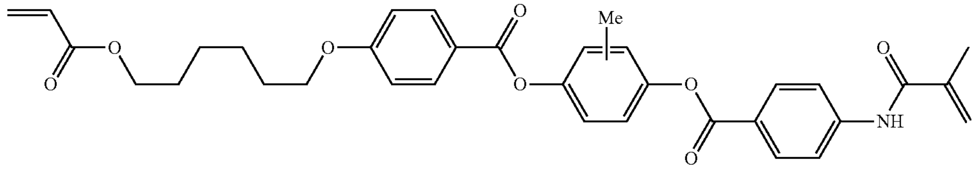
(7N)
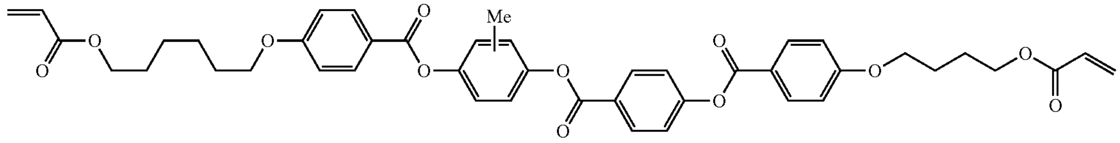
(8N)
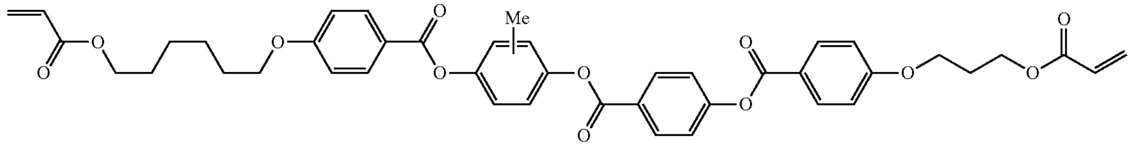
(9N)
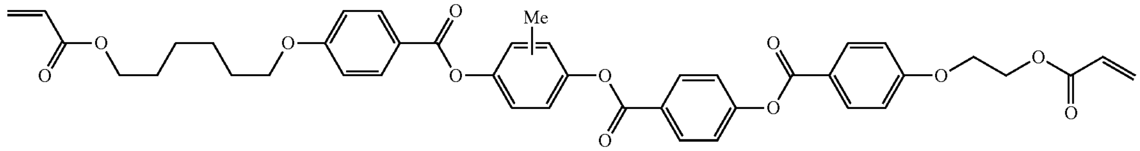
(10N)
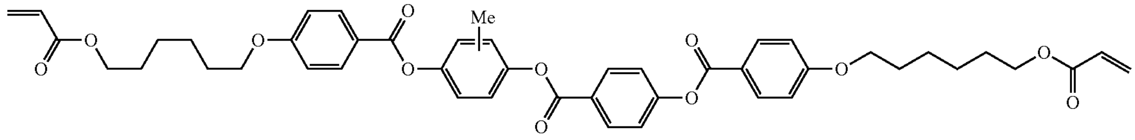

As the liquid crystal compound for use in the present invention, a compound represented by Formula (VI) and described in JP2014-198814A, in particular, a liquid crystal compound having no (meth)acrylate group represented by Formula (VI) is also suitably used.

Formula (VI)

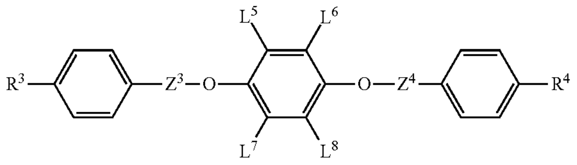

In Formula (VI), $Z^3$ represents —C(=O)— or —CH=CH—C(=O)—;

$Z^4$ represents —C(=O)— or —C(=O)—CH=CH—;

$R^3$ and $R^4$ each independently represent a hydrogen atom, a halogen atom, a linear alkyl group having 1 to 4 carbon atoms, a methoxy group, an ethoxy group, an aromatic ring which may have a substituent, a cyclohexyl group, a vinyl group, a formyl group, a nitro group, a cyano group, an acetyl group, an acetoxy group, an acryloylamino group, an N,N-dimethylamino group, a maleimide group, a methacryloylamino group, an allyloxy group, an allyloxycarbamoyl group, an N-alkyloxycarbamoyl group in which the alkyl group has 1 to 4 carbon atoms, an N-(2-methacryloyloxyethyl)carbamoyloxy group, an N-(2-acryloyloxyethyl)carbamoyloxy group, or a structure represented by Formula (VI-2); and $L^5$, $L^6$, $L^7$, and $L^8$ each independently represent an alkyl group having 1 to 4 carbon atoms, an alkoxy group having 1 to 4 carbon atoms, an alkoxycarbonyl group having 2 to 5 carbon atoms, an acyl group having 2 to 4 carbon atoms, a halogen atom, or a hydrogen atom, and at least one of $L^5$, $L^6$, $L^7$, or $L^8$ represents a group other than a hydrogen atom.

$$—Z^5\text{-T-Sp-P} \quad \text{Formula (VI-2)}$$

In Formula (VI-2), P represents an acryl group, a methacryl group, or a hydrogen atom, $Z^5$ represents —C(=O)O—, —OC(=O)—, —C(=O)NR$^1$— (where $R^1$ represents a hydrogen atom or a methyl group), —NR$^1$C(=O)—, —C(=O)S—, or —SC(=O)—, T represents 1,4-phenylene, and Sp represents a divalent aliphatic group having 1 to 12 carbon atoms which may have a substituent. However, one $CH_2$ in this aliphatic group or two or more non-adjacent $CH_2$ may be substituted with —O—, —S—, —OC(=O)—, —C(=O)O—, or —OC(=O)O—.

The compound represented by Formula (VI) is preferably a compound represented by Formula (VII).

Formula (VII)

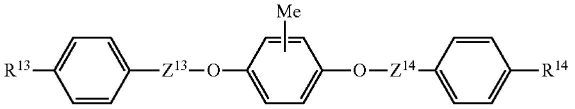

In Formula (VII), $Z^{13}$ represents —C(=O)— or —C(=O)—CH=CH—;

$Z^{14}$ represents —C(=O)— or —CH=CH—C(=O)—; and $R^{13}$ and $R^{14}$ each independently represent a hydrogen atom, a linear alkyl group having 1 to 4 carbon atoms, a methoxy group, an ethoxy group, a phenyl group, an acryloylamino group, a methacryloylamino group, an allyloxy group, or a structure represented by Formula (IV-3).

$Z^{13}$ represents —C(=O)— or —C(=O)—CH=CH— and is preferably —C(=O)—.

$R^{13}$ and $R^{14}$ each independently represent a hydrogen atom, a linear alkyl group having 1 to 4 carbon atoms, a methoxy group, an ethoxy group, a phenyl group, an acryloylamino group, a methacryloylamino group, an allyloxy group, or a structure represented by Formula (IV-3), preferably represents a methyl group, an ethyl group, a propyl group, a methoxy group, an ethoxy group, a phenyl group, an acryloylamino group, a methacryloylamino group, or a structure represented by Formula (IV-3), and more preferably represents a methyl group, an ethyl group, a methoxy group, an ethoxy group, a phenyl group, an acryloylamino group, a methacryloylamino group, or a structure represented by Formula (IV-3).

Specific examples of the compound represented by Formula (VI) are shown below. However, in the present invention, the compound represented by Formula (VI) is not limited thereto.

(11L)

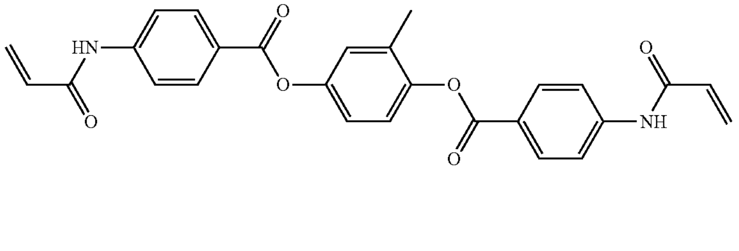

(12L)

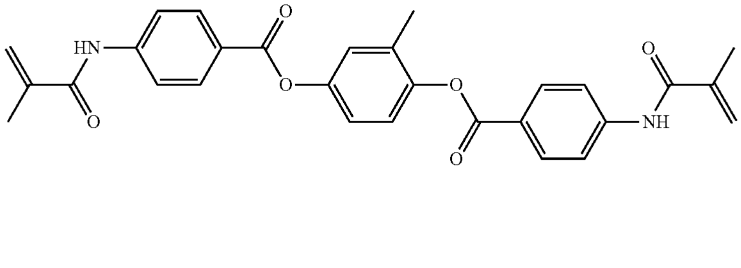

-continued
(13L)
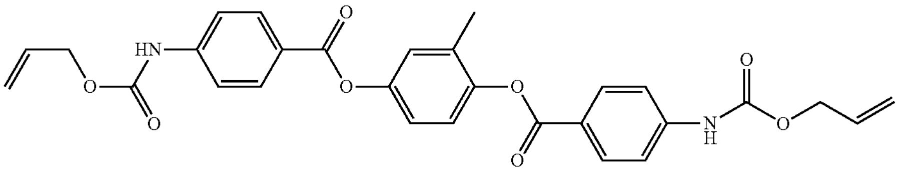
(14L)
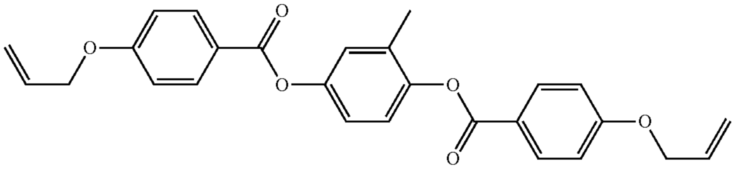
(15L)
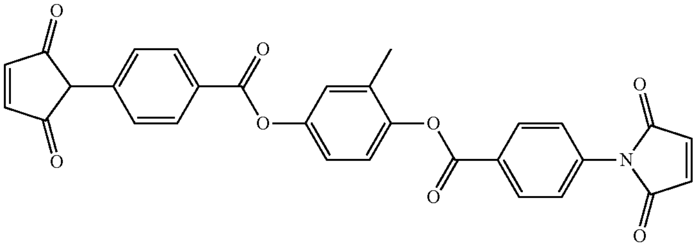
(16L)
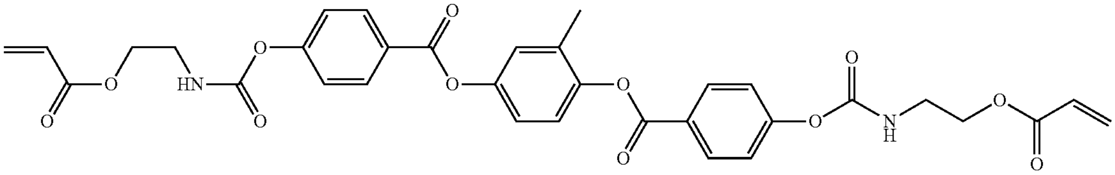
(17L)
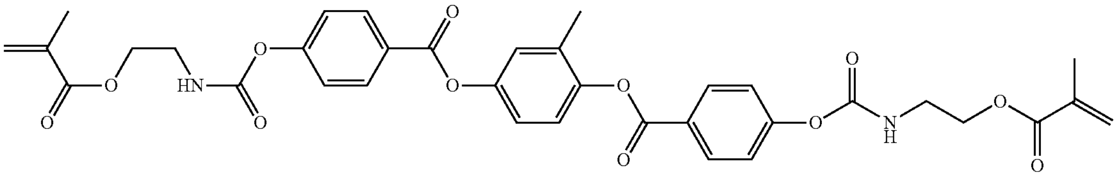
(18L)
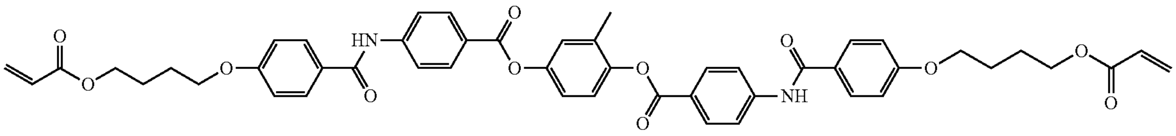
(19L)
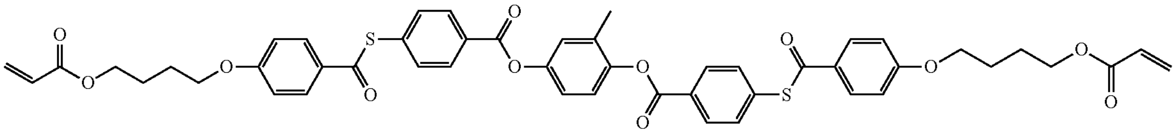
(11M)
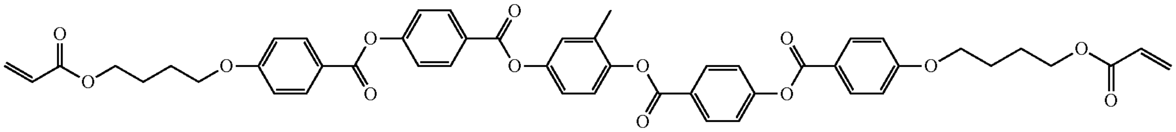

-continued
(12M)
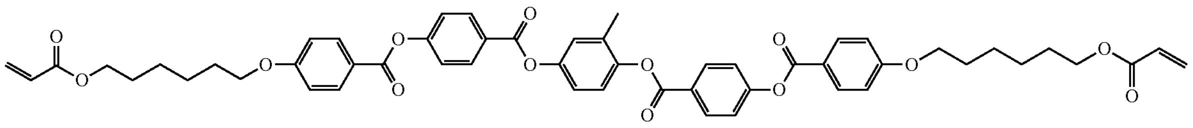
(13M)
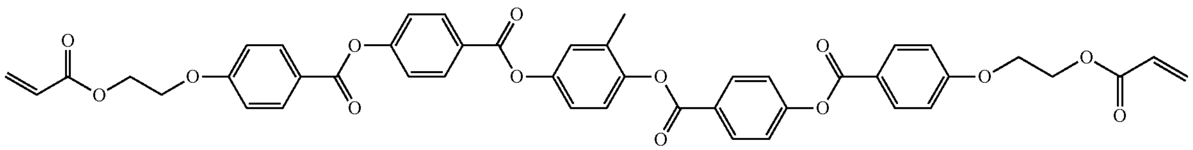
(14M)
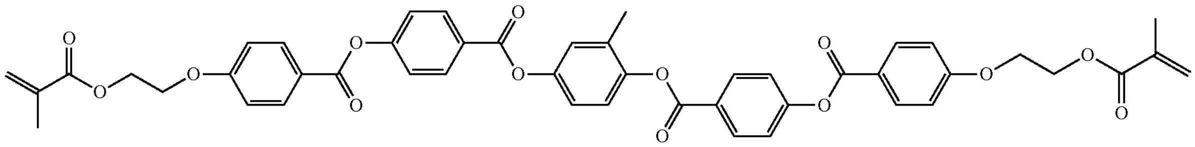
(15M)
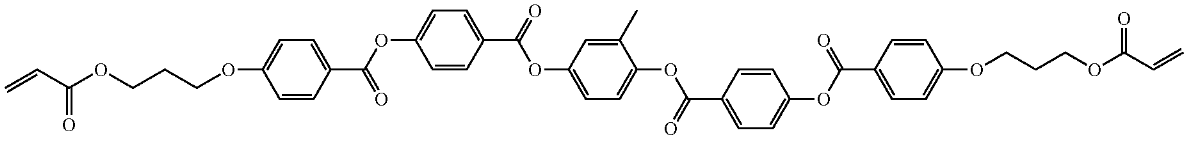
(16M)
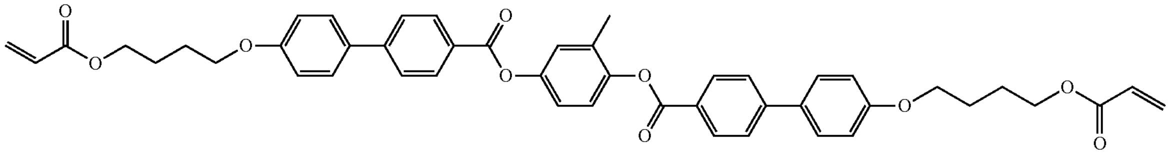
(17M)
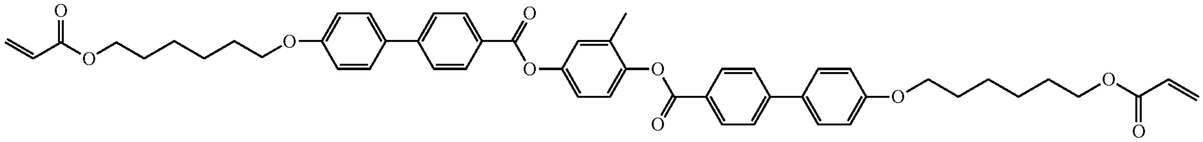
(18M)
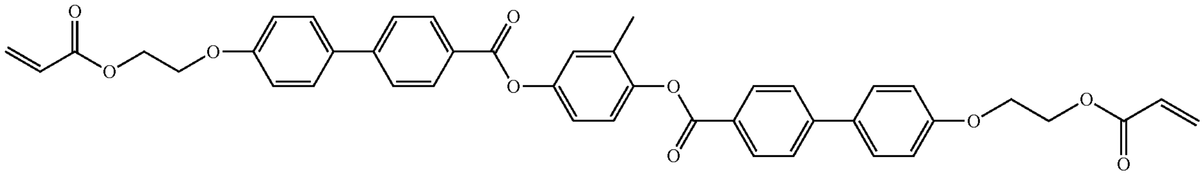
(19M)
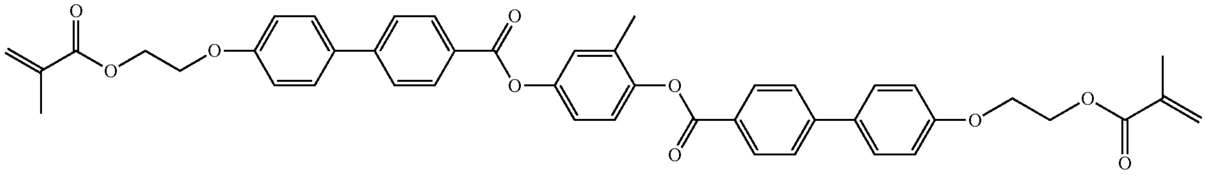

-continued (20M)

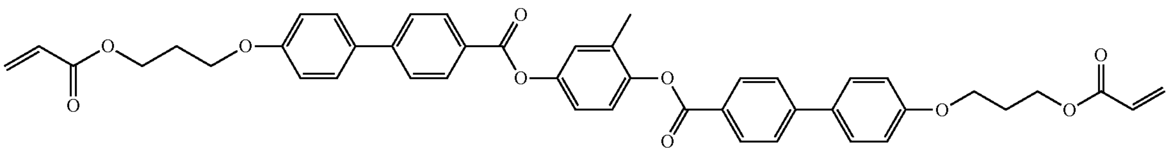

As the liquid crystal compound for use in the present invention, a compound represented by Formula (VIII) and described in JP2014-198814A, in particular, a polymerizable liquid crystal compound having two (meth)acrylate groups represented by Formula (VIII) is also suitably used.

Formula (VIII)

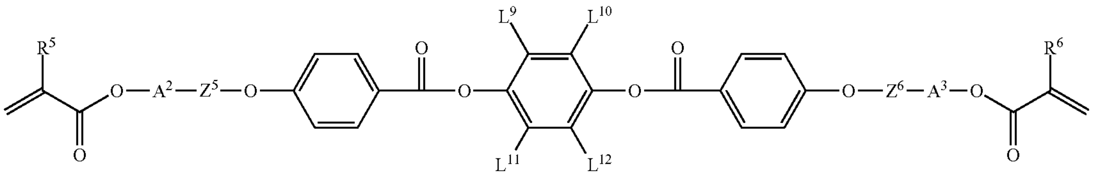

In Formula (VIII), $A^2$ and $A^3$ each independently represent an alkylene group having 2 to 18 carbon atoms, and one $CH_2$ in the alkylene group or two or more non-adjacent $CH_2$ may be substituted with —O—;

$Z^5$ represents —C(=O)—, —OC(=O)—, or a single bond;

$Z^6$ represents —C(=O)—, —C(=O)O—, or a single bond;

$R^5$ and $R^6$ each independently represent a hydrogen atom or a methyl group; and $L^9$, $L^{10}$, $L^{11}$, and $L^{12}$ each independently represent an alkyl group having 1 to 4 carbon atoms, an alkoxy group having 1 to 4 carbon atoms, an alkoxycarbonyl group having 2 to 5 carbon atoms, an acyl group having 2 to 4 carbon atoms, a halogen atom, or a hydrogen atom, and at least one of $L^9$, $L^{10}$, $L^{11}$, or $L^{12}$ represents a group other than a hydrogen atom.

The compound represented by Formula (VIII) is preferably a compound represented by Formula (IX).

Formula (IX)

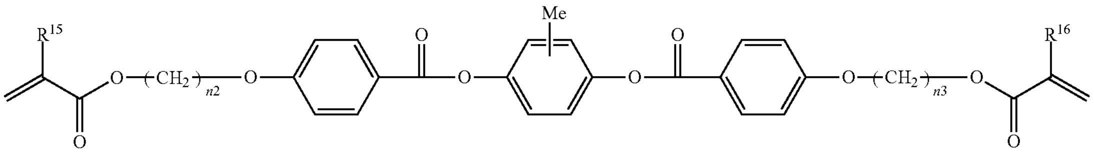

In Formula (IX), n2 and n3 each independently represent an integer of 3 to 6; and $R^{15}$ and $R^{16}$ each independently represent a hydrogen atom or a methyl group.

In Formula (IX), n2 and n3 each independently represent an integer of 3 to 6, and it is preferred that n2 and n3 are 4.

In Formula (IX), $R^{15}$ and $R^{16}$ each independently represent a hydrogen atom or a methyl group, and it is preferred that $R^{15}$ and $R^{16}$ each represent a hydrogen atom.

Specific examples of the compound represented by Formula (VIII) are shown below. However, in the present invention, the compound represented by Formula (VIII) is not limited thereto.

(I-1)
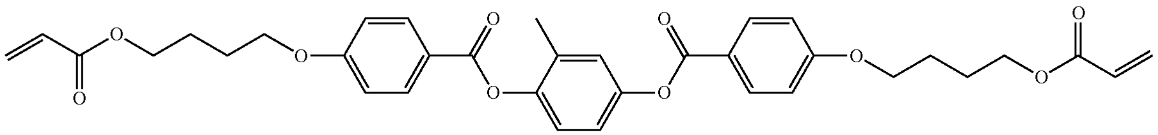
(I-2)
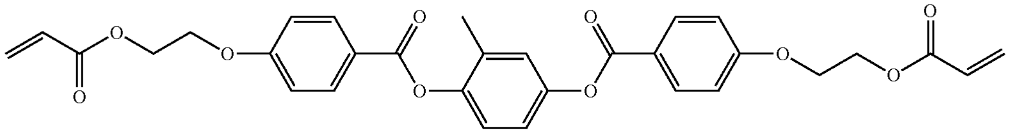
(I-3)
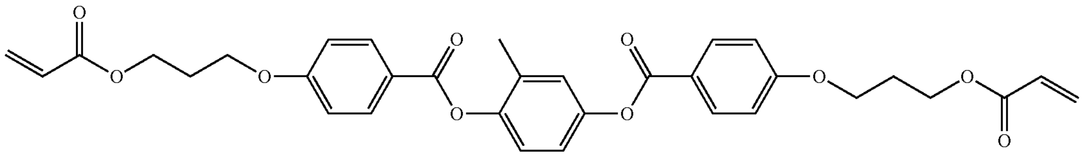
(I-4)
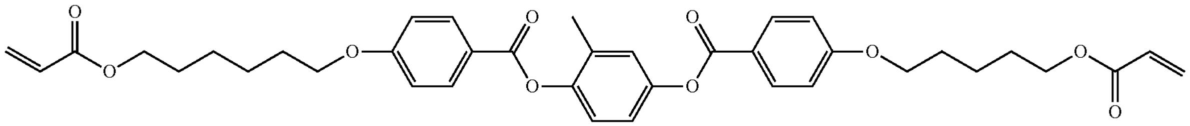
(I-5)
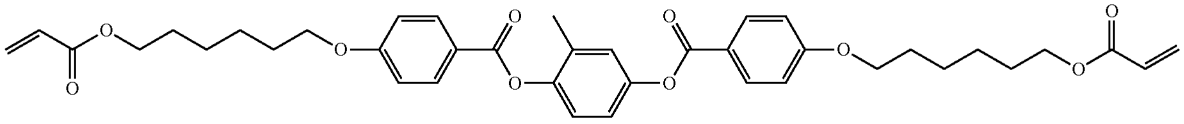
(I-6)
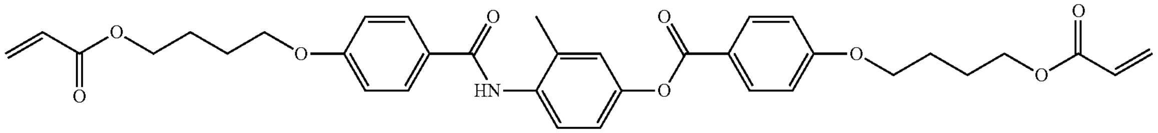
(I-7)
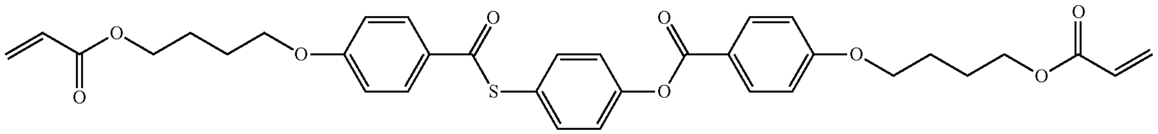
(I-8)
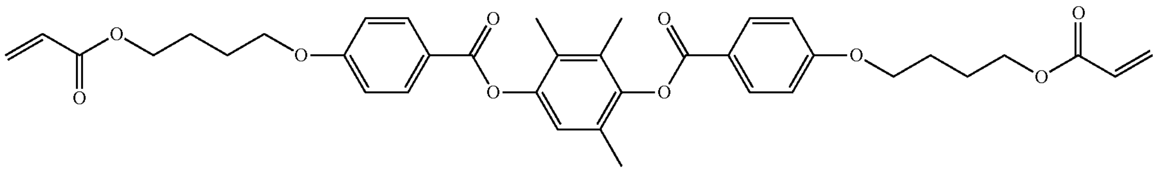
(I-9)
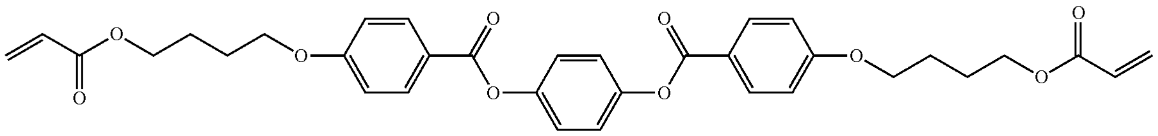

-continued (I-10)

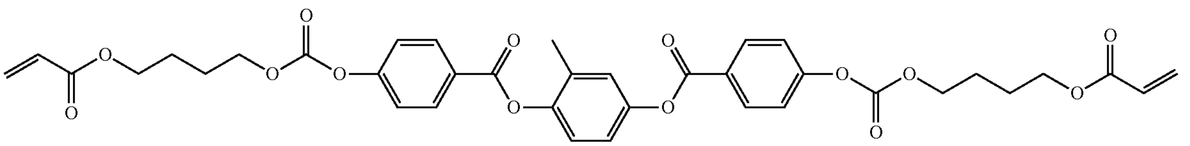

(I-11)

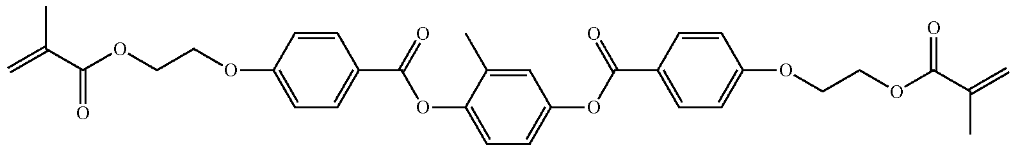

(I-12)

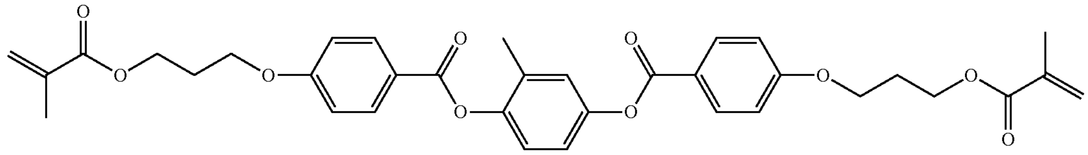

(I-13)

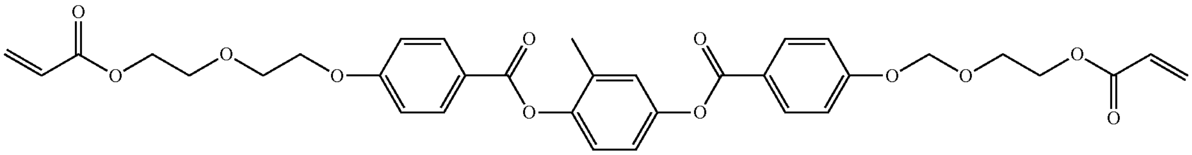

(I-14)

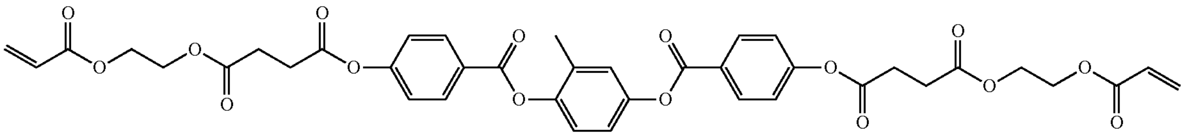

Such liquid crystal compounds can be produced by a known method.

(Chiral Agent (Chiral Compound))

The composition contains a chiral agent.

The type of the chiral agent is not particularly limited. The chiral agent may be liquid crystalline or non-liquid crystalline. The chiral agent may be selected from a variety of known chiral agents (for example, as described in Liquid Crystal Device Handbook, Chap. 3, Item 4-3, Chiral Agents for Twisted Nematic (TN) and Super Twisted Nematic (STN), p. 199, edited by the $142^{nd}$ Committee of the Japan Society for the Promotion of Science, 1989). The chiral agent generally contains an asymmetric carbon atom; however, an axial asymmetric compound or planar asymmetric compound not containing an asymmetric carbon atom may also be used as the chiral agent. Examples of the axial asymmetric compound or the planar asymmetric compound include binaphthyl, helicene, paracyclophane, and derivatives thereof. The chiral agent may have a polymerizable group.

The content of the chiral agent in the composition is preferably 0.5 to 30% by mass with respect to the total mass of the liquid crystal compound. The chiral agent is preferably used in a smaller amount, as it tends not to affect the liquid crystallinity. Accordingly, the chiral agent is preferably a compound having a strong twisting power in order that the compound could achieve twisted alignment of the desired helical pitch even though its amount used is small.

Examples of such a chiral agent having strong twisting power include the chiral agents described in, for example, JP2002-302487A, JP2002-80478A, JP2002-80851A, JP2002-179668A, JP2002-179670A, JP2002-338575A, JP2002-180051A, JP1987-81354A (JP-S62-81354A), WO2002/006195A, JP2011-241215A, JP2003-287623A, JP2002-302487A, JP2002-80478A, JP2002-80851A, and JP2014-034581A, and LC-756 manufactured by BASF Corporation.

(Optional Components)

The composition may contain components other than the liquid crystal compound and the chiral agent.

(Polymerization Initiator)

The composition may contain a polymerization initiator. In particular, in the case where the liquid crystal compound has a polymerizable group, the composition preferably contains a polymerization initiator.

The polymerization initiator is preferably a photopolymerization initiator capable of initiating a polymerization reaction upon irradiation with ultraviolet rays. Examples of the photopolymerization initiator include α-carbonyl compounds (as described in U.S. Pat. Nos. 2,367,661A and 2,367,670A), acyloin ethers (as described in U.S. Pat. No. 2,448,828A), α-hydrocarbon-substituted aromatic acyloin compounds (as described in U.S. Pat. No. 2,722,512A), polynuclear quinone compounds (as described in U.S. Pat. Nos. 3,046,127A and 2,951,758A), combinations of triarylimidazole dimer and p-aminophenyl ketone (as described in U.S. Pat. No. 3,549,367A), acridine and phenazine compounds (as described in JP1985-105667A (JP-S60-105667A) and U.S. Pat. No. 4,239,850A), and oxadiazole compounds (as described in U.S. Pat. No. 4,212,970A).

The content of the polymerization initiator in the composition is not particularly limited, but it is preferably 0.1 to 20% by mass and more preferably 1 to 8% by mass, with respect to the total mass of the liquid crystal compound.

(Alignment Control Agent (Alignment Agent))

Figure 3:
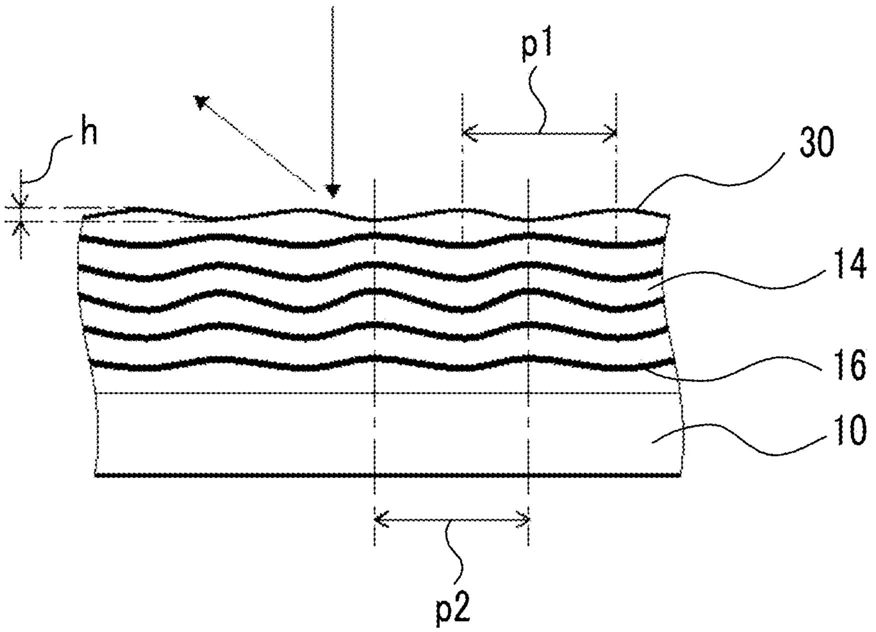
FIG. 3 is a schematic diagram in the case where the cross section of the reflective layer of the present invention is observed by SEM.

The composition may contain an alignment control agent. The inclusion of the alignment control agent in the composition makes it possible to achieve stable or rapid formation of a cholesteric liquid crystalline phase. Further, depending on at least one of the selection of an alignment control agent and/or a chiral agent or the selection of the conditions of a heat treatment or a cooling treatment in Step 2 described later, a reflective layer 30 (a layer of a composition in a cholesteric liquid crystalline phase state) having roughness on the surface thereof, as shown in FIG. 3 described later, can be produced.

Examples of the alignment control agent include fluorine-containing (meth)acrylate-based polymers, compounds represented by General Formulae (X1) to (X3) described in WO2011/162291A, compounds described in paragraphs [0007] to [0029] of JP2012-211306A, compounds described in paragraphs [0020] to [0031] of JP2013-47204A, compounds described in paragraphs [0165] to [0170] of WO2016/009648A, the compounds described in paragraphs [0077] to [0081] of WO2016/092844, and General Formulae (Cy201) to (Cy211) described in JP4592225B. The composition may contain two or more selected from these compounds. These compounds can reduce the tilt angle of the molecules of the liquid crystal compound at the air interface of the layer, or align the molecules substantially horizontally. In the present specification, the term "horizontal alignment" refers to that the long axis of the liquid crystal molecule is parallel to the film surface, but does not require strict parallelism. In the present specification, the "horizontal alignment" means an alignment in which the tilt angle to the horizontal plane is less than 20°.

The alignment control agents may be used alone or in combination of two or more thereof.

The content of the alignment control agent in the composition is not particularly limited, but it is preferably 0.01 to 10% by mass, more preferably 0.01 to 5% by mass, and still more preferably 0.01 to 1% by mass, with respect to the total mass of the liquid crystal compound.

(Solvent)

The composition may contain a solvent.

The solvent may be, for example, water or an organic solvent. Examples of the organic solvent include amides such as N,N-dimethylformamide; sulfoxides such as dimethylsulfoxide; heterocyclic compounds such as pyridine; hydrocarbons such as benzene and hexane; alkyl halides such as chloroform and dichloromethane; esters such as methyl acetate, butyl acetate, and propylene glycol monoethyl ether acetate; ketones such as acetone, methyl ethyl ketone, cyclohexanone, and cyclopentanone; ethers such as tetrahydrofuran and 1,2-dimethoxyethane; and 1,4-butanediol diacetate. These solvents may be used alone or in combination of two or more thereof.

(Other Additives)

The composition may contain one or two or more other additives such as an antioxidant, an ultraviolet absorber, a sensitizer, a stabilizer, a plasticizer, a chain transfer agent, a polymerization inhibitor, an antifoaming agent, a leveling agent, a thickening agent, a flame retardant, a surface-active substance, a dispersant, and a color material such as a dye and a pigment.

In the composition, it is preferred that one or more of the compounds constituting the composition are a compound having a plurality of polymerizable groups (a polyfunctional compound). Further, in the composition, the total content of the compound having a plurality of polymerizable groups is preferably 80% by mass or more with respect to the total solid content in the composition. The solid content is a component for forming the reflective layer, and does not include a solvent.

By making 80% by mass or more of the total solid content in the composition into a compound having a plurality of polymerizable groups, in the case of forming the wave-like structure of the bright portion 14 and the dark portion 16 of the cholesteric liquid crystalline phase, or further, in the case of forming the reflective layer 30 having periodic roughness on the surface shown in FIG. 3 to be described later, it is preferable from the viewpoint that the wave-like structure of the reflective layer 30 (cholesteric liquid crystalline phase) or the roughness structure of the surface can be firmly fixed to impart durability and the like.

In addition, the compound having a plurality of polymerizable groups is a compound having two or more immobilizable groups in one molecule. In the present invention, the polyfunctional compound contained in the composition may have liquid crystallinity or may not have liquid crystallinity.

(Procedure of Step 1)

In Step 1, the above-described composition is first applied onto a substrate. The application method is not particularly limited, and examples thereof include a wire bar coating method, an extrusion coating method, a direct gravure coating method, a reverse gravure coating method, and a die coating method. Prior to application of the composition, a known rubbing treatment may be applied to the substrate.

If necessary, a treatment for drying the composition applied onto the substrate may be carried out after application. By carrying out the drying treatment, the solvent can be removed from the applied composition.

The film thickness of the composition (composition layer) applied onto the substrate is not particularly limited, but it is preferably 0.1 to 20 μm, more preferably 0.2 to 15 μm, and still more preferably 0.5 to 10 μm, from the viewpoint of superior diffuse reflectivity of the reflective layer.

Next, the composition (composition layer) applied onto the substrate is heated to align the liquid crystal compound in the composition into a cholesteric liquid crystalline phase state.

The liquid crystalline phase transition temperature of the composition is preferably in the range of 10° C. to 250° C. and more preferably in the range of 10° C. to 150° C. from the viewpoint of production suitability.

As preferable heating conditions, it is preferable to heat the composition at 40° C. to 100° C. (preferably 60° C. to 100° C.) for 0.5 to 5 minutes (preferably 0.5 to 2 minutes).

In the case of heating the composition, it is preferable not to heat the composition to a temperature at which the liquid crystal compound becomes an isotropic phase (Iso). In the case where the composition is heated above the temperature at which the liquid crystal compound becomes an isotropic phase, defects of the cholesteric liquid crystalline phase increase, which is not preferable.

<Step 2>

Step 2 is a step of cooling or heating the composition to form a reflective layer so that the helical twisting power of the chiral agent contained in the composition in the cholesteric liquid crystalline phase state obtained in Step 1 increases by 5% or more. In other words, Step 2 is a step of subjecting the coating layer to a cooling treatment or a heat treatment so that the helical twisting power of the chiral agent contained in the composition constituting the coating layer (composition layer) formed on the substrate increases by 5% or more. As described above, by carrying out the present step, the twist of the liquid crystal compound is further increased, and as a result, the alignment of the cholesteric liquid crystalline phase (inclination of the helical axis) is changed, whereby the bright portion 14 and the dark portion 16 parallel to the substrate 10 are changed to form a reflective layer (a layer 12*b* of a composition in a cholesteric liquid crystalline phase state) having a bright portion 14 and a dark portion 16 having a wave-like structure (uneven structure) as shown in FIG. 2.

Further, by selecting the conditions of the cooling treatment and the heat treatment in Step 2, it is also possible to form the reflective layer 30 having periodic roughness on the surface as shown in FIG. 3 by the change in the alignment of the cholesteric liquid crystalline phase.

The helical twisting power (HTP) of the chiral agent is a factor indicating the helical alignment ability expressed by Equation (1).

HTP=1/(length of helical pitch (unit: μm)×concentration of chiral agent) Equation (1)

The length of the helical pitch refers to the length of the pitch P (=period of the helix) of the helical structure of the cholesteric liquid crystalline phase in the composition and can be measured by the method described on page 196 of the Liquid Crystal Handbook (published by Maruzen Co., Ltd.). The concentration of the chiral agent is intended to refer to a concentration (% by mass) of the chiral agent with respect to the total solid content in the composition.

In addition, the value of HTP is influenced not only by the type of chiral agent but also by the type of liquid crystal compound contained in the composition. Therefore, for example, in the case where a composition containing a predetermined chiral agent X and a liquid crystal compound A and a composition containing a predetermined chiral agent X and a liquid crystal compound B different from the liquid crystal compound A are prepared, and the HTPs of both compositions are measured at the same temperature, the values may be different therebetween. Also, the value of HTP depends on the length of the helical pitch formed in the composition, and the length of the helical pitch can be appropriately adjusted depending on the temperature of the composition. That is, the length of the helical pitch can be adjusted by subjecting the composition to a cooling treatment or a heat treatment.

The fact that the helical twisting power of the chiral agent increases by 5% or more is intended to mean that an increase rate Z represented by Equation (2) is 5% or more in the case where the helical twisting power of the chiral agent in the composition before cooling or heating the composition (layer of the composition) is taken as X and the helical twisting power of the chiral agent in the composition after cooling or heating the composition (layer of the composition) is taken as Y.

$$\text{Increase rate } Z\ (\%)=\{(Y-X)/X\}\times 100 \qquad \text{Equation (2):}$$

The increase rate Z may be 5% or more and more preferably 10% or more. From the viewpoint of superior diffuse reflectivity of the reflective layer, the increase rate Z is more preferably 12% or more. The upper limit of the increase rate Z is not particularly limited, but it is often 30% or less.

In the present step, as described above, the composition is cooled or heated so that the helical twisting power of the chiral agent increases by 5% or more. In particular, it is preferable to cool the composition.

In the case where the composition is cooled, it is preferable to cool the composition so that the temperature of the composition drops by 30° C. or more, from the viewpoint of superior diffuse reflectivity of the reflective layer. Among them, from the viewpoint of superior effects, it is preferable to cool the composition so as to be lower by 40° C. or more, and it is more preferable to cool the composition so as to lower by 50° C. or more. The upper limit value of the reduction temperature width of the cooling treatment is not particularly limited, but it is usually about 70° C.

In other words, the cooling treatment is intended to cool the composition so that the temperature of the composition is T−30° C. or less in the case where the temperature of the composition in the cholesteric liquid crystalline phase state before cooling is T° C.

The method of cooling is not particularly limited and may be, for example, a method of leaving the substrate on which the composition is placed in an atmosphere at a predetermined temperature.

The cooling rate in the cooling treatment is not limited, but in order to suitably form the wave-like structure of the bright portion 14 and the dark portion 16 of the cholesteric liquid crystalline phase, or further the roughness on the surface of the reflective layer which will be described later, it is preferable to set the cooling rate to a certain degree of speed.

Specifically, the cooling rate in the cooling treatment is preferably such that the maximum value thereof is 1° C. per second or more, more preferably 2° C. per second or more, and still more preferably 3° C. per second or more. The upper limit of the cooling rate is not particularly limited, but it is often 10° C. per second or less.

In addition, the helical twisting power of the chiral agent after the helical twisting power increases by 5% or more is preferably 20 or more and more preferably 30 or more. The upper limit thereof is not particularly limited, but it is often 100 or less.

By setting the helical twisting power of the chiral agent to 20 or more, it is possible to suitably form the wave-like structure of the bright portion and the dark portion of the reflective layer.

Here, in the method for producing a reflective layer of the present invention, in the case where the composition layer (reflective layer) is exposed to wind, unevenness may occur in the surface state of the surface of the reflective layer to be formed. Considering this point, in the method for producing a reflective layer of the present invention, it is preferred that the wind speed of the environment in which the composition layer (liquid crystal layer) is exposed is low in all steps of applying, heating, and cooling the composition. Specifically, in the method for producing a reflective layer of the present invention, the wind speed of the environment in which the composition layer is exposed in all steps of applying, heating, and cooling the composition is preferably 1 m/s or less.

In the case where the liquid crystal compound has a polymerizable group, in Step 2, the composition on the substrate may be subjected to a curing treatment to fix the cholesteric liquid crystalline phase. That is, the curing treatment may be carried out simultaneously with the cooling treatment or the heat treatment.

The obtained reflective layer corresponds to a layer obtained by fixing a cholesteric liquid crystalline phase.

Here, as the state where the cholesteric liquid crystalline phase is "immobilized", the most typical and preferred aspect is a state in which the alignment of the liquid crystal compound brought into a cholesteric liquid crystalline phase is retained. The state where the liquid crystalline phase is "immobilized" is not limited thereto, and specifically, it refers to a state in which, in a temperature range of usually 0° C. to 50° C. and in a temperature range of −30° C. to 70° C. under more severe conditions, this layer has no fluidity and can keep an immobilized alignment state stably without causing changes in alignment state due to external field or external force. In the present invention, as will be described later, it is preferable to immobilize the alignment state of a cholesteric liquid crystalline phase by a curing reaction proceeding upon irradiation with ultraviolet rays.

In the layer obtained by fixing a cholesteric liquid crystalline phase, it is sufficient that the optical properties of the cholesteric liquid crystalline phase are retained in the layer, and finally the composition in the layer no longer needs to show liquid crystallinity.

In addition, it is preferred that the immobilization of the cholesteric liquid crystalline phase immobilizes the structure (alignment state) of the cholesteric liquid crystalline phase after the cooling treatment or the heat treatment.

The method of the curing treatment is not particularly limited, and examples thereof include a photo curing treatment and a thermal curing treatment. Among them, a light irradiation treatment is preferable, and an ultraviolet irradiation treatment is more preferable. Further, as described above, the liquid crystal compound is preferably a liquid crystal compound having a polymerizable group. In the case where the liquid crystal compound has a polymerizable group, the curing treatment is preferably a polymerization reaction by light irradiation (particularly ultraviolet irradiation), and more preferably a radical polymerization reaction by light irradiation (particularly ultraviolet irradiation).

For ultraviolet irradiation, a light source such as an ultraviolet lamp is used.

The irradiation energy amount of ultraviolet rays is not particularly limited, but it is generally preferably about 0.1 to 0.8 $J/cm^2$. The irradiation time of the ultraviolet rays is not particularly limited, but it may be determined as appropriate from the viewpoint of both sufficient strength and productivity of the obtained layer.

In the above description, the procedure of applying the curing treatment to the layer of the composition in Step 2 has been described, but Step 3 may be carried out in which the composition is subjected to a curing treatment to form a reflective layer obtained by fixing the cholesteric liquid crystalline phase, after carrying out Step 2.

The procedure of the curing treatment is as described above.

<Reflective Layer>

According to the production method described above, a reflective layer in which the bright portion and the dark portion take a wave-like structure, in the cross-sectional SEM observation diagram as shown in FIG. 2, is formed.

The reflective layer is a layer which has a cholesteric liquid crystal structure and a structure in which the angle formed between the helical axis and the surface of the reflective layer periodically changes. In other words, the reflective layer is a reflective layer which has a cholesteric liquid crystal structure, in which the cholesteric liquid crystal structure gives a stripe pattern of a bright portion and a dark portion in a cross-sectional view of a reflective layer observed by a scanning electron microscope, and therefore the angle formed between the normal of the line formed by at least one dark portion and the surface of the reflective layer periodically changes. Therefore, the reflective layer of the present invention is capable of diffusing and reflecting light in a substantially any direction, not in a limited direction.

JP2006-284862A discloses a method for producing an anisotropic optical element in which a composition containing a liquid crystal compound is applied, heated to a temperature equal to or higher than the temperature at which the liquid crystal compound is brought into an isotropic phase, and then a helical axis direction of a cholesteric liquid crystalline phase is inclined by lowering the temperature to a temperature at which a liquid crystal compound becomes a cholesteric liquid crystalline phase by blowing gas from a predetermined direction. The anisotropic optical element formed by this method manifests anisotropy in the reflection of light but can reflect light only in a direction corresponding to the inclined direction of the helical axis, and does not exhibit good diffuse reflectivity as in the reflective layer according to the present invention.

In addition, a plurality of the reflective layers may be formed on the substrate.

For example, after forming the reflective layer X having a predetermined selective reflection wavelength on the substrate by the above-described method, the reflective layer Y having a selective reflection wavelength different from that of the reflective layer X may be formed by the same procedure. In the case of forming a plurality of reflective layers as described above, it is preferable to laminate a plurality of layers in which a cholesteric liquid crystalline phase is immobilized using a liquid crystal compound having a polymerizable group.

Here, in the production method of the present invention, at least one of the selection of a chiral agent and/or an alignment control agent or the selection of the conditions of a heat treatment or a cooling treatment is carried out, whereby it is possible to produce the reflective layer 30 of the present invention having periodic roughness on the surface in addition to having the wave-like structure (roughness structure) of the bright portion 14 and the dark portion 16 in the cross section, as shown in FIG. 3 conceptually showing the cross section, instead of a reflective layer having a flat (substantially flat) surface (the surface on the side opposite to the substrate 10), as conceptually shown in FIG. 2.

For example, by selecting a chiral agent having a large wave-like structure inducing force inside the reflective layer 30, the wave-like structure in the reflective layer 30 can be enlarged to make the surface of the reflective layer 30 uneven. Further, by selecting an alignment control agent having a weak anchoring effect on the surface of the reflective layer 30, it is possible to make the surface of the reflective layer 30 uneven as well. Further, by increasing the difference between the heating temperature in Step 1 and the cooling temperature in Step 2, the surface of the reflective layer 30 can be made uneven as well. Further, by increasing the cooling rate in Step 2, the surface of the reflective layer 30 can be made uneven as well.

The reflective layer 30 of the present invention is a reflective layer obtained by fixing a cholesteric liquid crystalline phase, in which, similarly to the reflective layer shown in FIG. 2, a bright portion 14 and a dark portion 16 of a cross section of a cholesteric liquid crystalline phase formed by a helical structure of a cholesteric liquid crystalline phase have a wave-like structure, and the reflective layer 30 further has periodic roughness on the surface.

Figure 7:
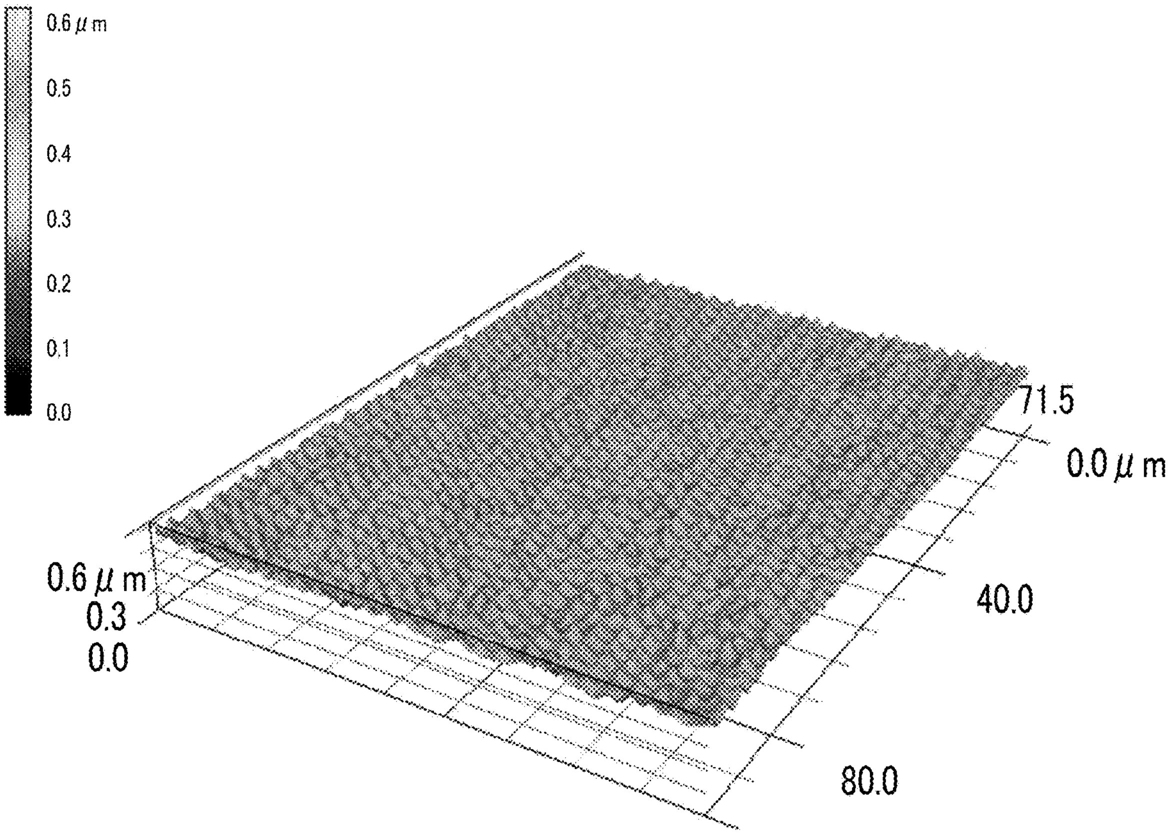
FIG. 7 is a surface analysis result of a shape measuring laser microscope of a reflective layer 13.

In the reflective layer 30 shown in FIG. 3, roughness (convexities) on the surface is two-dimensionally formed (see FIG. 7).

Accordingly, the wave-like structure of the bright portion 14 and the dark portion 16 of the cross section of the reflective layer 30 (cholesteric liquid crystalline phase) is formed not only in the lateral direction shown in FIG. 3, but also, a similar wave-like structure is formed, for example, in the cross section in the direction perpendicular to the paper surface of FIG. 3. That is, the wave-like structure of the bright portion 14 and the dark portion 16 is observed in the reflective layer 30 in the cross section in all directions. Regarding this point, the same is true for the reflective layer shown in FIG. 2.

However, the present invention is not limited thereto, and the reflective layer may have a wave-like structure in which a continuous wave is formed only in one direction on the cross section or further on the surface. However, from the viewpoint of the diffuse reflectivity, as described above, the reflective layer 30 is preferably a structure in which the wave-like structure of the bright portion 14 and the dark portion 16 is observed in the cross section in all directions, or further, as shown in FIG. 7, the roughness on the surface is two-dimensionally formed.

The roughness on the surface of the reflective layer 30 is periodic, but it is different from that of the wave-like structure of the cross section. Specifically, the phase of the roughness on the surface of the reflective layer 30 is shifted by half (approximately half) from the wave-like structure of the cross section. Therefore, in the planar direction of the substrate 10, the position of the convex portion of the wave-like structure of the cross section of the reflective layer 30 is the position of the concave portion of the roughness on the surface of the reflective layer 30, and the position of the concave portion of the wave-like structure of the cross section of the reflective layer 30 is the position of the convex portion of the roughness on the surface of the reflective layer 30.

Further, as conceptually shown in FIG. 3, in the reflective layer 30, the pitch p1 of the surface roughness is basically equal to the pitch p2 of the wave-like structure of the cross section. That is, in the reflective layer 30 of the present invention, the period of the surface roughness is equal to the period of the wave-like structure of the cross section.

As shown in FIG. 3, the pitch p1 is the interval between the peaks of the convex portions on the surface of the reflective layer 30, and the pitch p2 is the interval between the peaks of the wave of the dark portion 16 closest to the surface of the reflective layer 30.

In addition, in the present invention, the fact that the pitch p1 and the pitch p2 are equal to each other includes not only the case where the pitch p1 and the pitch p2 are completely identical, but also the case where the pitch difference calculated by "$[(p1-p2)/p1]\times100$" is ±30% or less.

In the reflective layer 30 shown in FIG. 3, the wave-like structure of the bright portion 14 and the dark portion 16 in the cross section of the reflective layer 30 (cholesteric liquid crystalline phase) is such that the pitch (period) of the wave is uniform, but the height of the wave is highest at the center (the central region) in the thickness direction of the reflective layer 30, and gradually decreases toward the surface side in the thickness direction and toward the substrate 10. That is, the amplitude of the wave-like structure of the cross section of the reflective layer 30 is the largest at the center in the thickness direction and gradually decreases toward the surface side and the substrate 10 side.

Regarding the height of the wave in this wave-like structure, the reflective layer (the layer 12*b* having a wave-like structure) having no roughness on the surface shown in FIG. 2 may also have the same structure where the height gradually decreases from the center in the thickness direction to the surface side in the thickness direction and the substrate 10. In addition, the wave-like structure of the reflective layer 30 having roughness on the surface thereof shown in FIG. 3 may have a structure having a wave with a uniform height over the entire region in the thickness direction like the wave-like structure of the reflective layer shown in FIG. 2.

The reflective layer 30 having roughness on the surface as described above has a wave height (wave amplitude) of the wave-like structure of the bright portion 14 and the dark portion 16 due to the helical structure of the cholesteric liquid crystalline phase in the cross section of the reflective layer 30 (cholesteric liquid crystalline phase) which is larger than that of the reflective layer with a flat surface shown in FIG. 2. That is, in the case where the reflective layer 30 has a large wave-like structure therein, the roughness thereof is also transferred to the surface, so that the surface of the reflective layer 30 becomes rough in shape.

Therefore, the reflective layer 30 having roughness on the surface as shown in FIG. 3 can obtain higher diffuse reflectivity.

In order to obtain satisfactory high diffuse reflectivity in the reflective layer 30, it is preferable to narrow the pitch p2 of the wave-like structure of the cross section and to make the wave of the wave-like structure of the cross section large (high). Here, the state of the roughness on the surface of the reflective layer 30 is greatly influenced by the wave-like structure of the cross section. Therefore, in order to obtain satisfactory diffuse reflectivity in the reflective layer 30, it is preferable to narrow the pitch p1 of the roughness on the surface and to increase (deepen) the height h of the roughness. In particular, as the height h of the roughness becomes higher, it tends to obtain higher diffuse reflectivity.

However, in the case where the pitch p1 of the roughness on the surface of the reflective layer 30 is narrowed, the height h of the roughness tends to decrease, and in the case where the height h of the roughness is increased, the pitch p1 of the roughness tends to narrow.

Considering this point, the pitch p1 of the roughness of the reflective layer 30 is preferably 0.5 to 10 μm and more preferably 1 to 6 μm.

The height h of the roughness of the reflective layer 30 is preferably 1 to 500 nm, more preferably 5 to 300 nm, still more preferably 50 to 300 nm, and particularly preferably 65 to 200 nm.

The thickness of the reflective layer 30 is also not particularly limited and the thickness that satisfies the diffuse reflectivity required for the reflective layer 30 may be appropriately set according to the size in the planar direction of the reflective layer 30, the material for forming the reflective layer 30, and the like.

The thickness of the reflective layer 30 is preferably 0.3 to 20 μm and more preferably 0.5 to 10 μm. By setting the thickness of the reflective layer 30 to 0.3 μm or more, satisfactory diffuse reflectivity can be obtained by the reflective layer 30 having a sufficient thickness. Further, by setting the thickness of the reflective layer 30 to 20 μm or less, unnecessary thickening of the reflective layer 30 can be prevented, for example, a projected image display member or the like which will be described later can be thinned As described above, in the case where a plurality of reflective layers are provided on the substrate 10, the thickness per layer is preferably within this range. Further, the thickness of the reflective layer having no roughness on the surface shown in FIG. 2 is also preferably in this range.

<Applications>

The reflective layer is a layer having a cholesteric liquid crystalline phase (cholesteric liquid crystal structure) having a predetermined wave-like structure (hereinafter, the reflective layer is also referred to as “cholesteric liquid crystal layer”), and is preferably a layer obtained by fixing this cholesteric liquid crystalline phase.

The cholesteric liquid crystal layer is a layer showing selective reflection characteristics with respect to light in a predetermined wavelength range. The cholesteric liquid crystal layer functions as a circularly polarized selective reflective layer that selectively reflects either the dextrorotatory circularly polarized light or the levorotatory circularly polarized light in the selective reflection wavelength range and transmits the other sense circularly polarized light. A film including one or two or more cholesteric liquid crystal layers can be used for various purposes. In a film including two or more layers of a cholesteric liquid crystal layer, the sense of circularly polarized light reflected by each cholesteric liquid crystal layer may be the same or opposite depending on the application. In addition, the center wavelength of selective reflection of each cholesteric liquid crystal layer, which will be described later, may be the same or different depending on the application.

In the present specification, the term “sense” for circularly polarized light means dextrorotatory circularly polarized light or levorotatory circularly polarized light. The sense of circularly polarized light is defined such that, in the case where light is viewed as it proceeds toward an observer and in the case where the tip of the electric field vector rotates clockwise as time increases, the sense is dextrorotatory circularly polarized light, and in the case where it rotates counterclockwise, the sense is levorotatory circularly polarized light. In the present specification, the term “sense” may be used for the twist direction of the helix of the cholesteric liquid crystal. Selective reflection by the cholesteric liquid crystal reflects dextrorotatory circularly polarized light and transmits levorotatory circularly polarized light in the case where the twist direction (sense) of the helix of the cholesteric liquid crystal is right, whereas it reflects levorotatory circularly polarized light and transmits dextrorotatory circularly polarized light in the case where the sense is left.

For example, a film including a cholesteric liquid crystal layer exhibiting selective reflection characteristics in the visible light wavelength range (wavelength of 400 to 750 nm) can be used as a screen for projected image display and a half mirror. Further, by controlling the reflection band, such a film can be used as a filter that improves the color purity of display light of a color filter or a display (for example, see JP2003-294948A).

In addition, the reflective layer can be used for various purposes such as a polarizing element, a reflective film, an antireflection film, a viewing angle compensating film, holography, and an alignment film, which are constituent elements of an optical element.

Hereinafter, the application as a projected image display member which is a particularly preferable application will be described.

By the above-mentioned function of the cholesteric liquid crystal layer, a projected image can be formed by reflecting circularly polarized light of either sense at the wavelength showing selective reflection among the projected light. The projected image may be visually recognized as such by being displayed on the surface of the projected image display member or may be a virtual image which appears to float above the projected image display member as viewed from an observer.

The central wavelength λ of the selective reflection depends on the pitch P of the helical structure (=the period of the helix) in the cholesteric liquid crystalline phase and follows the relationship of the average refractive index n of the cholesteric liquid crystal layer and $\lambda = n \times P$. Here, the center wavelength λ of the selective reflection of the cholesteric liquid crystal layer means a wavelength at the barycentric position of the reflection peak of the circularly polarized reflection spectrum measured from the normal direction of the cholesteric liquid crystal layer. As can be seen from the above equation, the center wavelength of the selective reflection can be adjusted by adjusting the pitch of the helical structure. That is, by adjusting the n value and the P value, for example, in order to selectively reflect either the dextrorotatory circularly polarized light or the levorotatory circularly polarized light with respect to the blue light, the center wavelength λ is adjusted so that an apparent center wavelength of the selective reflection can be set to a wavelength range of 450 to 495 nm. Incidentally, the apparent center wavelength of the selective reflection means a wavelength at the barycentric position of the reflection peak of the circularly polarized reflection spectrum of the cholesteric liquid crystal layer measured from the observation direction in practical use (in the case of being used as a projected image display member). Since the pitch of the cholesteric liquid crystalline phase depends on the type of the chiral agent to be used together with the liquid crystal compound or the added concentration thereof, a desired pitch can be obtained by adjusting these factors. As a method for measuring sense or pitch of helix, methods described in “Easy Steps in Liquid Crystal Chemistry Experiment” p 46, edited by The Japanese Liquid Crystal Society, Sigma Publishing, published in 2007, and “Liquid Crystal Handbook” p 196, Editorial Committee of Liquid Crystal Handbook, Maruzen can be used.

In addition, a projected image display member capable of displaying full color projected images can be produced by preparing and laminating cholesteric liquid crystal layers having an apparent center wavelength of the selective reflection in the red light wavelength range, the green light wavelength range, and the blue light wavelength range, respectively.

By adjusting the center wavelength of the selective reflection of each cholesteric liquid crystal layer according to the emission wavelength range of the light source used for projection and the mode of use of the projected image display member, a clear projected image can be displayed with high efficiency of light utilization. In particular, by adjusting the center wavelengths of the selective reflection of the cholesteric liquid crystal layer respectively according to the light emission wavelength range of the light source used for projection or the like, a clear color projected image can be displayed with high efficiency of light utilization.

In addition, for example, by configuring the projected image display member so as to have transmittivity to light in the visible light region, it is possible to provide a half mirror usable as a combiner of a head up display. The half mirror for projected image display is capable of displaying the image projected from the projector in a viewable manner, and in the case of observing the half mirror for projected image display from the same surface side on which the image is displayed, it is possible to simultaneously observe information or landscape on the opposite surface side.

EXAMPLES

Hereinafter, the features of the present invention will be described in more detail with reference to Examples and Comparative Examples. The materials, the used amount, the ratio, the contents of a treatment, and the procedures of a treatment described in Examples below may be suitably modified without departing from the spirit of the present invention. Accordingly, the scope of the present invention should not be limitatively interpreted by the specific examples described below.

Examples 1 to 3 and Comparative Examples 1 and 2

Example 1

(Preparation of Liquid Crystal Composition (1))

The following components were mixed to prepare a liquid crystal composition (1).

| | |
|---|---|
| Rod-like liquid crystal compound 101 | 55 parts by mass |
| Rod-like liquid crystal compound 102 | 30 parts by mass |
| Rod-like liquid crystal compound 201 | 13 parts by mass |
| Rod-like liquid crystal compound 202 | 2 parts by mass |
| Polymerization initiator Irg819 (manufactured by BASF Corporation) | 4 parts by mass |
| Chiral agent LC756 (manufactured by BASF Corporation) | 4.6 parts by mass |
| Alignment control agent (1) | 0.02 parts by mass |
| Alignment control agent (2) | 0.03 parts by mass |
| Methyl acetate | 260 parts by mass |
| Cyclohexanone | 65 parts by mass |

Rod-Like Liquid Crystal Compound 101

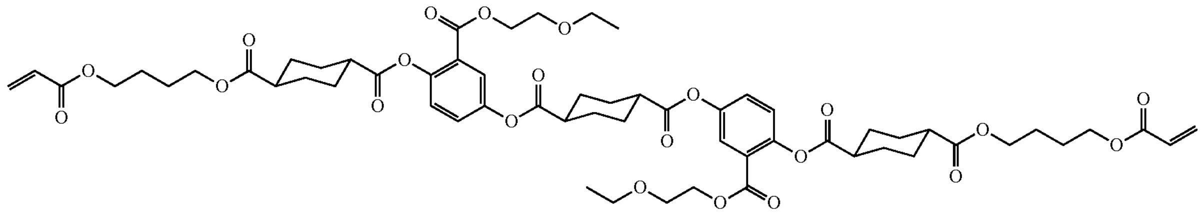 [SMILES: C=CC(=O)OCCCCOC(=O)C1CCC(C(=O)Oc2ccc(OC(=O)C3CCC(C(=O)Oc4ccc(OC(=O)C5CCC(C(=O)OCCCCOC(=O)C=C)CC5)c(C(=O)OCCOCC)c4)CC3)cc2C(=O)OCCOCC)CC1]

Rod-Like Liquid Crystal Compound 102

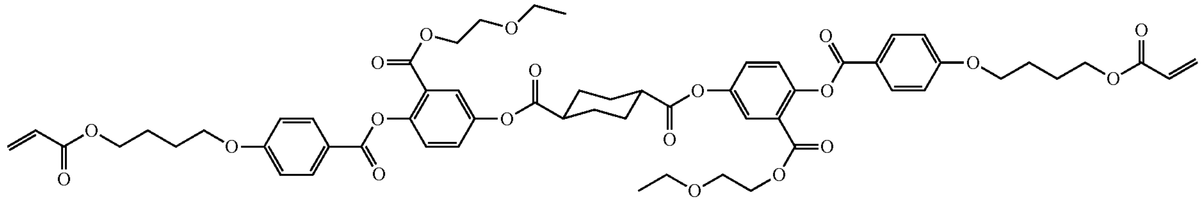 [SMILES: C=CC(=O)OCCCCOc1ccc(C(=O)Oc2ccc(OC(=O)C3CCC(C(=O)Oc4ccc(OC(=O)c5ccc(OCCCCOC(=O)C=C)cc5)c(C(=O)OCCOCC)c4)CC3)cc2C(=O)OCCOCC)cc1]

Rod-Like Liquid Crystal Compound 201

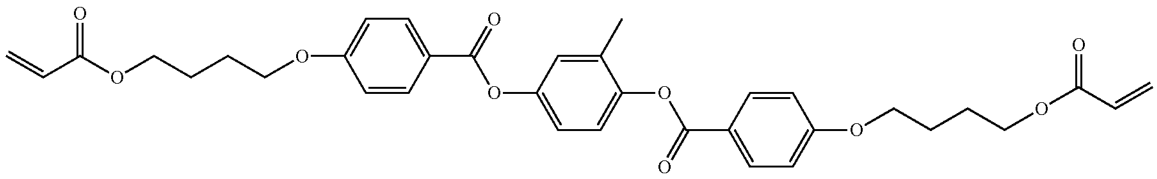 [SMILES: C=CC(=O)OCCCCOc1ccc(C(=O)Oc2ccc(OC(=O)c3ccc(OCCCCOC(=O)C=C)cc3)c(C)c2)cc1]

Rod-Like Liquid Crystal Compound 202

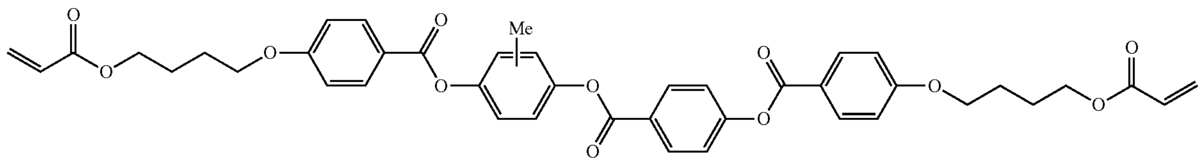

Alignment Control Agent (1)

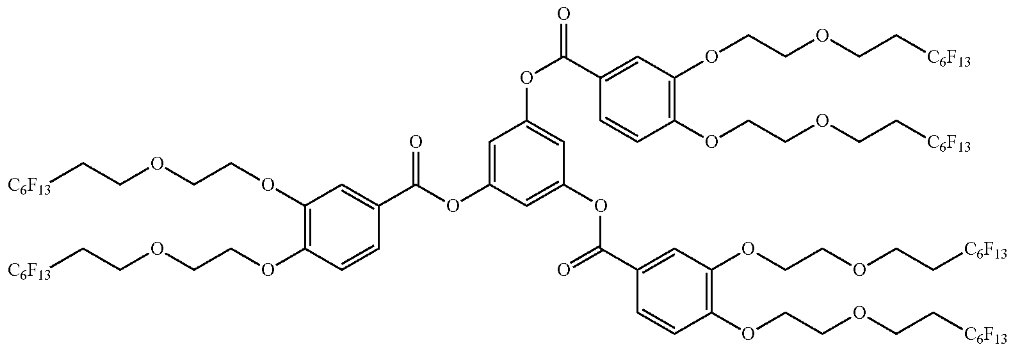

Alignment Control Agent (2)

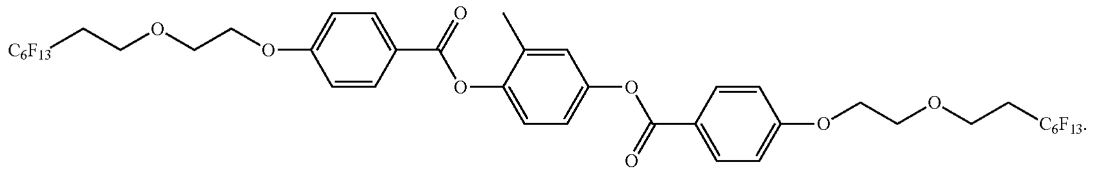

On the rubbed surface of a rubbed polyethylene terephthalate (PET) substrate (manufactured by FUJIFILM Corporation), the liquid crystal composition (1) was applied at room temperature using a wire bar so that the thickness of the coating layer (composition layer) after drying was 5.0 μm. The coating layer of the liquid crystal composition was dried at room temperature for 10 seconds and then heated in an atmosphere at 95° C. for 1 minute to align the liquid crystal compound. Thereafter, the coating layer was irradiated with ultraviolet (UV) rays using a D bulb (lamp, 90 $mW/cm^2$) manufactured by Fusion UV Systems, Inc. at an output of 80% at 30° C. for 8 seconds, whereby the reflective layer 1 (which corresponds to the film formed by immobilizing the cholesteric liquid crystalline phase) was formed on the PET substrate.

The transmission spectrum of the reflective layer 1 was measured using a spectrophotometer UV-3100PC (manufactured by Shimadzu Corporation), and the reflective layer 1 had a selective reflection peak having a center at a wavelength of 535 nm.

In the above procedure, after aligning the liquid crystal compound at 95° C., the liquid crystal composition was cooled to 30° C. The cooling rate was 4.2° C./second at the maximum. The variation between HTP at the alignment temperature (95° C.) of the chiral agent in the liquid crystal composition and HTP at the immobilization temperature (30° C.) of the chiral agent in the liquid crystal composition cooled during UV irradiation was 17%. The variation is obtained by the following Equation (3).

Figure 4:
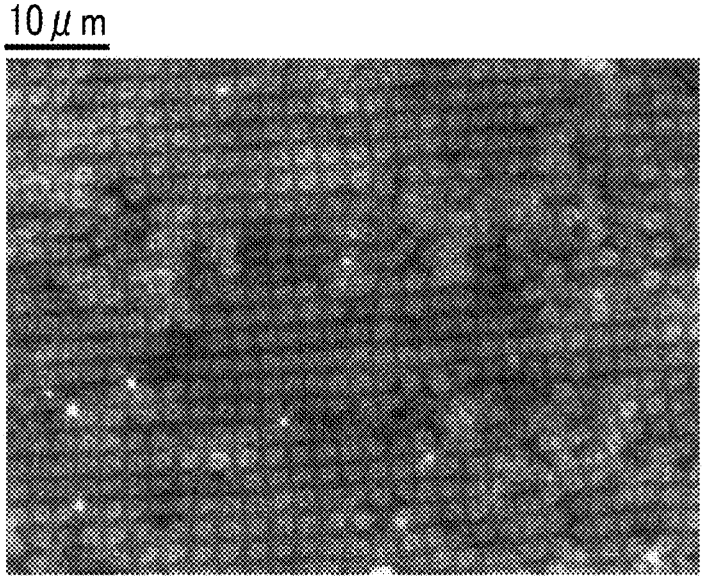
FIG. 4 is a polarization microscopic image of a reflective layer 1.

Variation={(HTP at immobilization temperature (30° C.) of chiral agent in liquid crystal composition)−(HTP at alignment temperature (95° C.) of chiral agent in liquid crystal composition)/(HTP at alignment temperature (95° C.) of chiral agent in liquid crystal composition)}×100   Equation (3):

Further, in the case where the PET substrate having the reflective layer 1 was set in a polarizing microscope so that the slow axis of the PET substrate coincided with the direction of the polarizer of the polarizing microscope, and then the reflective layer 1 was observed, the formation of a diffraction grating-like structure (=undulated structure) was clearly confirmed (see FIG. 4).

Figure 5:
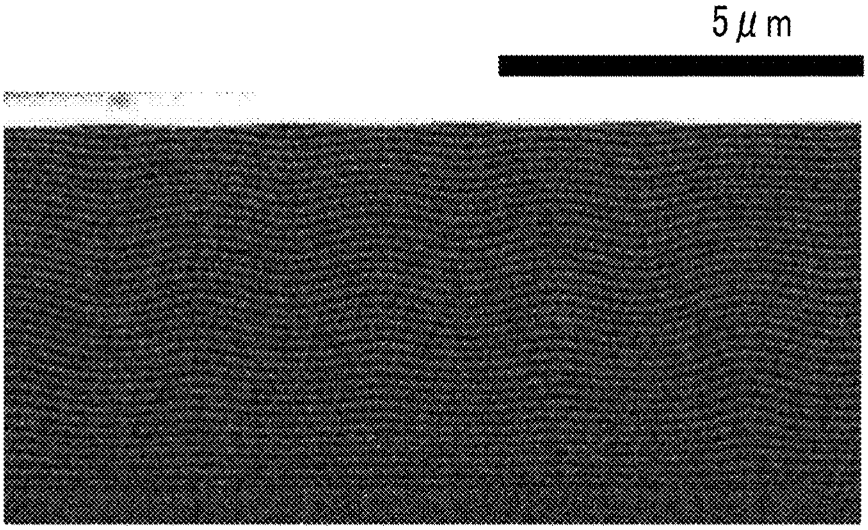
FIG. 5 is a cross-sectional SEM observation diagram of the reflective layer 1.

In addition, it was confirmed that the layered structure of the cholesteric liquid crystalline phase was wave-like by cross-sectional SEM observation (cross-sectional SEM photograph) of the reflective layer 1 (see FIG. 5).

In each of the Examples, the helical twisting power of the chiral agent at the immobilization temperature was 20 or more.

Example 2

Reflective layer 2 was obtained in the same manner as in Example 1, except that the conditions of a heat treatment in an atmosphere at 95° C. (alignment temperature) for 1 minute were changed to a heat treatment in an atmosphere at 85° C. (alignment temperature) for 1 minute.

It was confirmed that an undulated structure was formed also in the reflective layer 2, as in the case of the reflective layer 1. Further, the selective reflection peak of the reflective layer 2 was 533 nm.

Example 3

Reflective layer 3 was obtained in the same manner as in Example 2, except that the temperature at the time of UV irradiation (immobilization temperature) was changed from 30° C. to 40° C.

It was confirmed that an undulated structure was formed also in the reflective layer 3, as in the case of the reflective layer 1. Further, the selective reflection peak of the reflective layer 3 was 540 nm.

Comparative Example 1

The following components were mixed to prepare a liquid crystal composition (2).

| | |
|---|---|
| Rod-like liquid crystal compound 201 | 80 parts by mass |
| Rod-like liquid crystal compound 301 | 20 parts by mass |
| Polymerization initiator Irg819 (manufactured by BASF Corporation) | 3 parts by mass |
| Chiral agent LC756 (manufactured by BASF Corporation) | 5.5 parts by mass |
| Alignment control agent (2) | 0.05 parts by mass |
| Methyl ethyl ketone | 230 parts by mass |

Rod-Like Liquid Crystal Compound 301

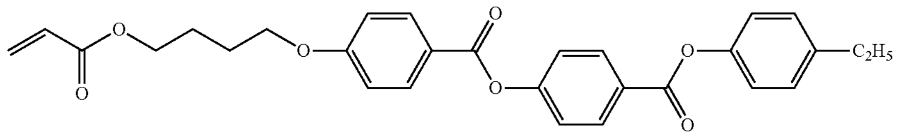 [SMILES: C=CC(=O)OCCCCOc1ccc(C(=O)Oc2ccc(C(=O)Oc3ccc(CC)cc3)cc2)cc1]

On the rubbed surface of a rubbed polyethylene terephthalate (PET) substrate (manufactured by FUJIFILM Corporation), the liquid crystal composition (2) was applied at room temperature using a wire bar so that the thickness of the coating layer after drying was 4.5 μm. The coating layer of the liquid crystal composition was dried at room temperature for 10 seconds and then heated in an atmosphere at 90° C. for 1 minute to align the liquid crystal compound. Thereafter, the coating layer was UV-irradiated using a D bulb (lamp, 90 $mW/cm^2$) manufactured by Fusion UV Systems, Inc. at an output of 80% at 35° C. for 8 seconds, whereby the reflective layer 4 was formed on the PET substrate.

The transmission spectrum of the reflective layer 4 was measured using a spectrophotometer UV-3100PC (manufactured by Shimadzu Corporation), and the reflective layer 4 had a selective reflection peak having a center at a wavelength of 540 nm. In addition, the variation between HTP at 90° C. (alignment temperature) of the chiral agent in the liquid crystal composition and HTP at 35° C. (immobilization temperature) of the chiral agent in the liquid crystal composition cooled during UV irradiation was 1%.

Further, in the case where the PET substrate having the reflective layer 4 was set in a polarizing microscope so that the slow axis of the PET substrate coincided with the direction of the polarizer of the polarizing microscope, and then the reflective layer 4 was observed, the formation of a diffraction grating-like structure (=undulated structure) could not be confirmed.

The above results are summarized in Table 1 below.

The following evaluation of microscopic observation was carried out according to the following standards.

"A": Undulated structure is clearly visible

"B": Undulated structure is visible

"C": There is no undulated structure

In addition, in Table 1, the "Alignment temperature" is a temperature at which the liquid crystal compound is aligned and corresponds to the heating temperature in Step 1 above. The "Immobilization temperature" is intended to refer to a temperature at the time of UV irradiation and corresponds to the cooling temperature in Step 2 above.

In addition, the "HTP variation (%)" in Table 1 is a value obtained by the following Equation (4).

HTP variation (%)={(HTP at immobilization temperature of chiral agent in liquid crystal composition)−(HTP at alignment temperature of chiral agent in liquid crystal composition)/(HTP at alignment temperature of chiral agent in liquid crystal composition)}×100 Equation (4):

TABLE 1

| | Alignment temperature (° C.) | Immobilization temperature (° C.) | HTP variation (%) | Microscopic observation results |
|---|---|---|---|---|
| Example 1 | 95 | 30 | 17% | A |
| Example 2 | 85 | 30 | 15% | A |
| Example 3 | 85 | 40 | 11% | B |
| Comparative Example 1 | 90 | 35 | 1% | C |

Comparative Example 2

According to Example 1 of JP2005-49866A, a glass substrate with an alignment film, in which the surface of the alignment film was not subjected to a rubbing treatment, was produced. The liquid crystal composition (2) was applied by spin coating onto the alignment film so that the thickness after drying was 4.5 μm. After heating the coating layer of the liquid crystal composition in an atmosphere at 90° C. for 1 minute to align the liquid crystal compound, the coating layer was UV-irradiated using a D bulb (lamp, 90 $mW/cm^2$) manufactured by Fusion UV Systems, Inc. at an output of 80% at 35° C. for 8 seconds to obtain a reflective layer 5 on a glass substrate with an alignment film. The HTP variation (%) was calculated in the same manner as described above and was found to be less than 5%.

<Evaluation of Diffuse Reflectivity>

Figure 6:
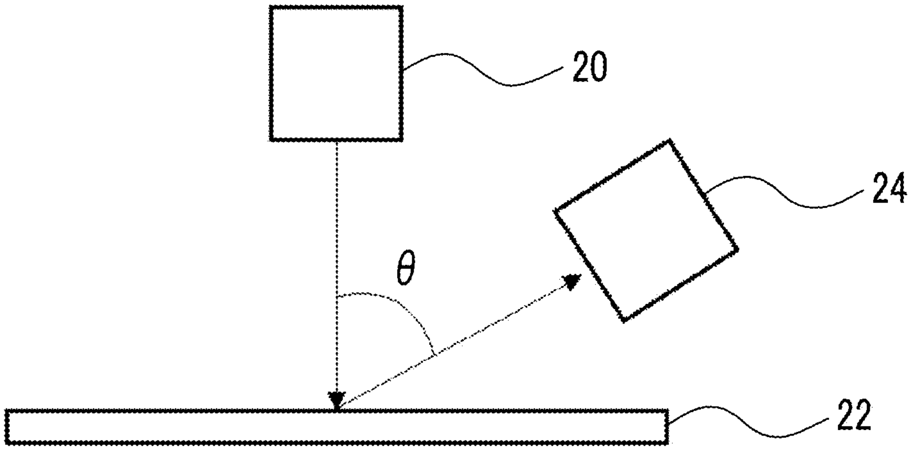
FIG. 6 is a schematic diagram of an apparatus used for diffuse reflectivity evaluation.

Using the double beam measurement mode of GCMS-3B manufactured by Murakami Color Research Laboratory Co., Ltd., the relative reflectance of each reflective layer with respect to the reference (white plate) was measured. Specifically, as shown in FIG. 6, incident light is irradiated from the light source 20 from the normal direction of the surface of the sample (reflective layers 1 to 5) 22, and the relative reflectance was measured by a detector 24 arranged at a polar angle θ of 40° or 60° with respect to the normal direction of the surface of the sample 22.

The results are summarized in Table 2.

TABLE 2

| | 40° direction | 60° direction |
|---|---|---|
| Example 1 | 45% | 17% |
| Comparative Example 1 | 0% | 0% |
| Comparative Example 2 | 13% | 4% |

As shown in Table 2, it was confirmed that, in the case of the reflective layer having an undulated structure, the relative reflectance in the 40° direction and the 60° direction was high and the diffuse reflectivity was excellent.

Although not shown in Table 2, it was confirmed that the reflective layers 2 and 3 described in Examples 2 and 3 exhibited better diffuse reflectivity than the reflective layers 4 and 5 described in Comparative Examples 1 and 2.

Examples 4 to 6, and Comparative Example 3

<Preparation of Liquid Crystal Composition>

The components shown in Table 3 below were mixed to prepare liquid crystal compositions (3) to (5). The amounts of the respective components are all parts by mass.

TABLE 3

| | Liquid crystal composition | | |
|---|---|---|---|
| | (3) | (4) | (5) |
| Rod-like liquid crystal compound 201 | 85 | 90 | 80 |
| Rod-like liquid crystal compound 202 | 15 | | |
| Rod-like liquid crystal compound 203 | | 10 | 20 |
| Polymerization initiator Irg819 (manufactured by BASF Corporation) | 4 | 4 | 4 |
| Chiral agent (1) | 5 | 5 | 5 |
| Alignment control agent (3) | 0.06 | 0.06 | 0.06 |
| Methyl ethyl ketone | 200 | 200 | 200 |
| Cyclohexanone | 200 | 200 | 200 |

Rod-Like Liquid Crystal Compound 203

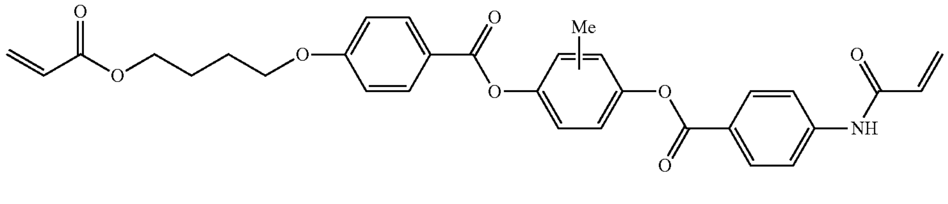

Chiral Agent (1)

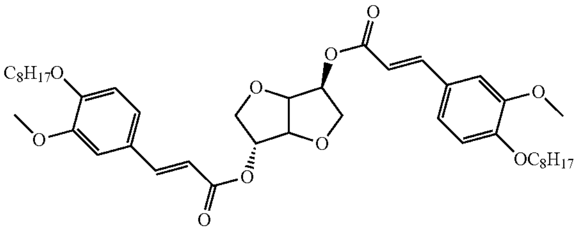

Alignment Control Agent (3)

33

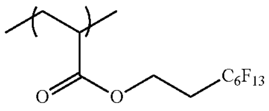

67

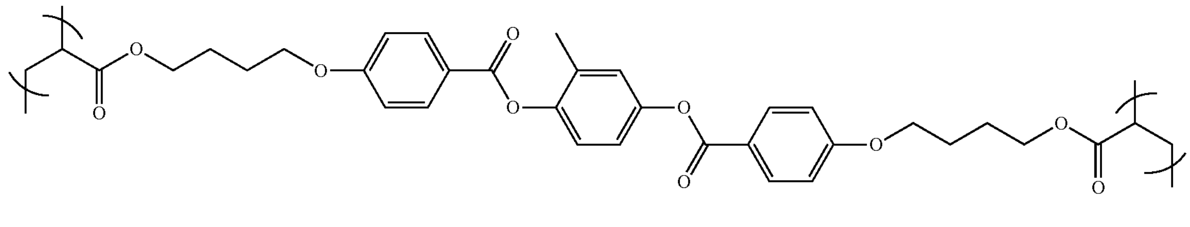

Example 4

Reflective layer 6 was obtained in the same manner as in Example 1, except that the liquid crystal composition (3) was used in place of the liquid crystal composition (1), and the conditions of the heat treatment for 1 minute in an atmosphere of 95° C. (alignment temperature) were changed to a heat treatment for 1 minute in an atmosphere at 100° C. (alignment temperature).

It was confirmed that an undulated structure was formed also in the reflective layer 6, as in the case of the reflective layer 1. Further, the reflective layer 6 had a peak of reflection in the range of 450 to 650 nm.

Example 5

Reflective layer 7 was obtained in the same manner as in Example 1, except that the liquid crystal composition (4) was used in place of the liquid crystal composition (1), and the conditions of the heat treatment for 1 minute in an atmosphere of 95° C. (alignment temperature) were changed to a heat treatment for 1 minute in an atmosphere at 100° C. (alignment temperature).

It was confirmed that an undulated structure was formed also in the reflective layer 7, as in the case of the reflective layer 1. Further, the reflective layer 7 had a peak of reflection in the range of 450 to 650 nm.

Example 6

Reflective layer 8 was obtained in the same manner as in Example 1, except that the liquid crystal composition (5) was used in place of the liquid crystal composition (1), the conditions of the heat treatment for 1 minute in an atmosphere of 95° C. (alignment temperature) were changed to a heat treatment for 1 minute in an atmosphere at 80° C. (alignment temperature), and the temperature at the time of UV irradiation (immobilization temperature) was changed from 30° C. to 40° C.

It was confirmed that an undulated structure was formed also in the reflective layer 8, as in the case of the reflective layer 1. Further, the reflective layer 8 had a peak of reflection in the range of 450 to 650 nm.

Comparative Example 3

Reflective layer 9 was obtained in the same manner as in Example 1, except that the conditions of the heat treatment for 1 minute in an atmosphere of 95° C. (alignment temperature) were changed to a heat treatment for 1 minute in an atmosphere at 85° C. (alignment temperature), and the temperature at the time of UV irradiation (immobilization temperature) was changed from 30° C. to 70° C.

In the reflective layer 9, no undulated structure was formed.

<Evaluation>

For each of the produced reflective layers of Examples 4 to 6 and Comparative Example 3, the HTP variation was calculated in the same manner as in Example 1 and the microscopic observation results were evaluated (evaluation of the wave-like structure (layered structure) of the cross section of the reflective layer).

Also, a reflective layer was set on a spectrophotometer V-670 (manufactured by JASCO Corporation) equipped with an absolute reflectance measuring system with the produced reflective layer facing the light source side, and the height of the reflection performance at 45° was evaluated under 0° incident and 45° detection conditions. The reflection performance at 45° was evaluated by preparing a graph of the wavelength on the horizontal axis and the reflectance on the vertical axis, removing the reflectance originating from the substrate, calculating the area of the reflection peak in the region of 500 to 650 nm corresponding to the selective reflection wavelength of the reflective layer (cholesteric liquid crystalline phase), and then taking the size of this area as the amount of reflection at 45°.

The results are shown in Table 4 below.

TABLE 4

| | Composition | Alignment temperature [° C.] | Immobilization temperature [° C.] | HTP variation [%] | Microscopic observation results | Amount of reflection at 45° |
|---|---|---|---|---|---|---|
| Example 4 | (3) | 100 | 30 | 19 | A | 3.5 |
| Example 5 | (4) | 100 | 30 | 20 | A | 7.5 |
| Example 6 | (5) | 80 | 40 | 8.6 | B | 1.1 |
| Comparative Example 3 | (1) | 85 | 70 | 3.7 | C | 0 |

As shown in Table 4, as compared with Comparative Example 3 having no undulated structure, it was found that the reflective layers of Examples 4 to 6 having an undulated structure had a large amount of reflection at 45° and excellent diffuse reflectivity.

Examples 7 to 13, and Comparative Example 4

<Preparation of Liquid Crystal Composition>

The components shown in Table 5 below were mixed to prepare liquid crystal compositions (A) to (G). The amounts of the respective components are all parts by mass.

TABLE 5

| | Liquid crystal composition | | | | | | |
|---|---|---|---|---|---|---|---|
| | (A) | (B) | (C) | (D) | (E) | (F) | (G) |
| Rod-like liquid crystal compound 101 | 55 | 55 | 55 | 55 | 55 | 55 | |
| Rod-like liquid crystal compound 102 | 30 | 30 | 30 | 30 | 30 | 30 | |
| Rod-like liquid crystal compound 201 | 13 | 13 | 13 | 13 | 13 | 13 | 85 |
| Rod-like liquid crystal compound 202 | 2 | 2 | 2 | 2 | 2 | 2 | 15 |
| Polymerization initiator Irg819 (manufactured by BASF Corporation) | 4 | 4 | 4 | 4 | 4 | 4 | 4 |
| Chiral agent LC756 (manufactured by BASF Corporation) | | | 4.5 | | 4.5 | | 4.5 |
| Chiral agent (2) | 4.5 | 3.4 | | | | | |
| Chiral agent (3) | | | | 5.3 | | 4.0 | |
| Alignment control agent (2) | 0.02 | 0.02 | | 0.02 | | | 0.02 |
| Alignment control agent (3) | | | | | | 0.06 | |
| Alignment control agent (4) | 0.04 | 0.04 | | 0.04 | | | 0.04 |
| Alignment control agent (5) | | | 0.06 | | | | |
| Alignment control agent (6) | | | | | 0.06 | | |
| Methyl acetate | 285 | 285 | 285 | 285 | 285 | 285 | 285 |
| Cyclohexanone | 50 | 50 | 50 | 50 | 50 | 50 | 50 |

Chiral Agent (2)

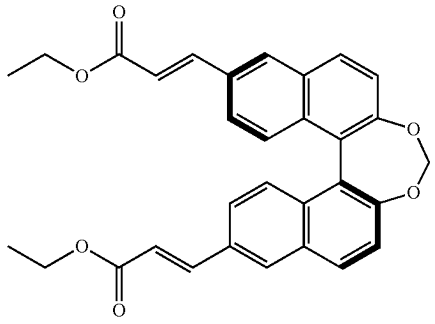

Chiral Agent (3)

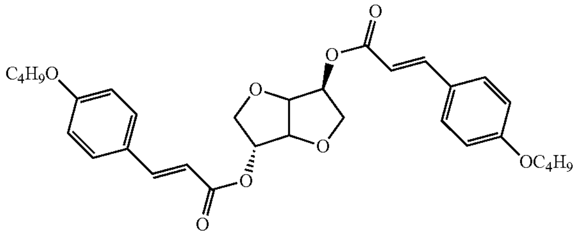

Alignment Control Agent (4)

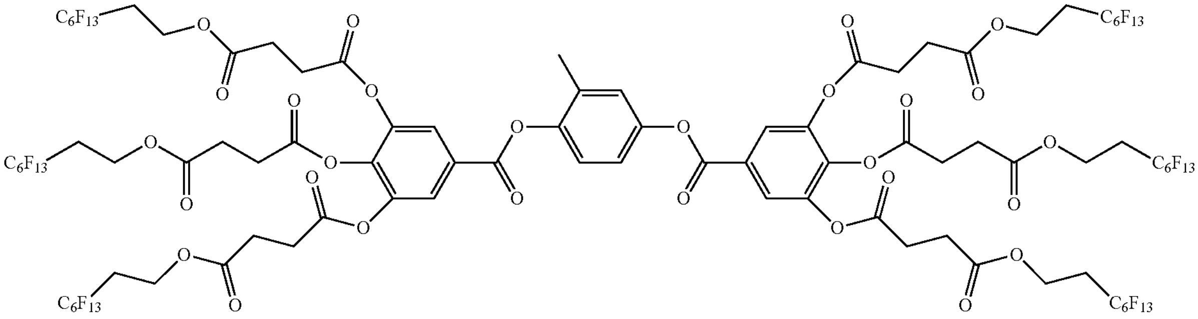

Alignment Control Agent (5)

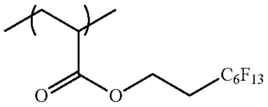

86

-continued

13

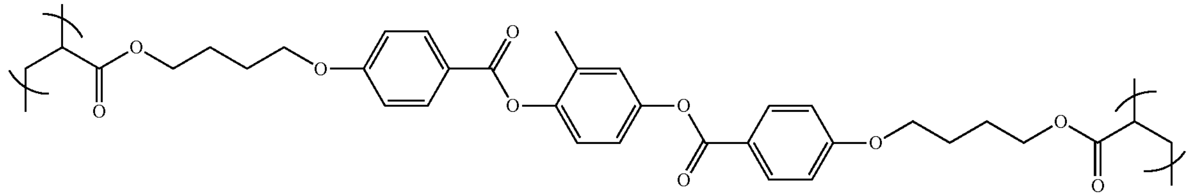

Alignment Control Agent (6)

47

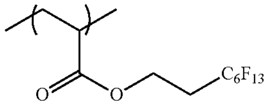

55

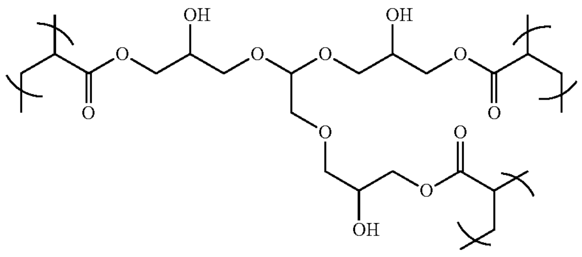

Example 7

On the rubbed surface of a rubbed polyethylene terephthalate (PET) substrate (manufactured by Toyobo Co., Ltd.), the liquid crystal composition (A) was applied at room temperature using a wire bar so that the thickness of the coating layer (composition layer) after drying was 3.4 μm. The coating layer of the liquid crystal composition was dried at room temperature for 50 seconds and then heated in an atmosphere at 95° C. for 1 minute to align the liquid crystal compound.

Thereafter, the coating layer was irradiated with ultraviolet (UV) rays using a D bulb (lamp, 90 mW/$cm^2$) manufactured by Fusion UV Systems, Inc. at an output of 80% at 30° C. for 8 seconds, whereby the reflective layer 10 (which corresponds to the film formed by immobilizing the cholesteric liquid crystalline phase) was formed on the PET substrate. Also in the above procedure, after aligning the liquid crystal compound at 95° C., the liquid crystal composition was cooled to 30° C. The cooling rate was 4.3° C./second at the maximum.

The variation between HTP at 95° C. (alignment temperature) of the chiral agent in this liquid crystal composition (A) and HTP at 30° C. of the chiral agent in the liquid crystal composition (A) cooled at the time of UV irradiation was 17%. The HTP variation was calculated in the same manner as in Example 1.

Examples 8 to 13 and Comparative Example 4

Reflective layers 11 to 17 were produced in the same manner as in Example 7, except that the liquid crystal composition to be used and the application amount of the liquid crystal composition were changed.

Further, the HTP variation was calculated in the same manner as in Example 1.

<Evaluation>

The following evaluations were made on the reflective layers 10 to 16 produced in Examples 7 to 13 and the reflective layer 17 produced in Comparative Example 4.

<<Film Thickness>>

A part of the reflective layer was peeled off, and the film thickness of the reflective layer was measured with a shape measuring laser microscope VK-X200 (manufactured by Keyence Corporation) using a 10×objective lens.

<<Roughness of Surface>>

The surface of the reflective layer was measured with a shape measuring laser microscope VK-X200 (manufactured by Keyence Corporation) using a 150×objective lens.

The measurement results were analyzed to measure the pitch p1 (cycle length) of the roughness on the surface of the reflective layer and the height h of the roughness on the surface.

FIG. 7 shows the surface analysis results of the shape measuring laser microscope in Example 11 (reflective layer 14). In addition, two-dimensional roughness was similarly formed on the surfaces of the reflective layers 10 to 13, 15, and 16 produced in Examples 7 to 10, 12, and 13 as well.

<<Internal Wave-Like Structure>>

The cross section of the reflective layer was cut with an ultramicrotome, an appropriate pretreatment was carried out, and the measurement was carried out using a SU8030 SEM manufactured by Hitachi High-Technologies Corporation. The measurement results were analyzed to measure the maximum height (the inner roughness height) of the roughness of the internal wave-like structure and the pitch p2 of the wave-like structure.

The reflective layers 10 to 16 formed in Examples 7 to 13 exhibited significant formation of a wave-like structure in the central portion in the thickness direction. In each of the reflective layers, the pitch p2 (length of period) of the wave-like structure was equal to the pitch p1 (length of period) of the surface roughness.

Figure 8:
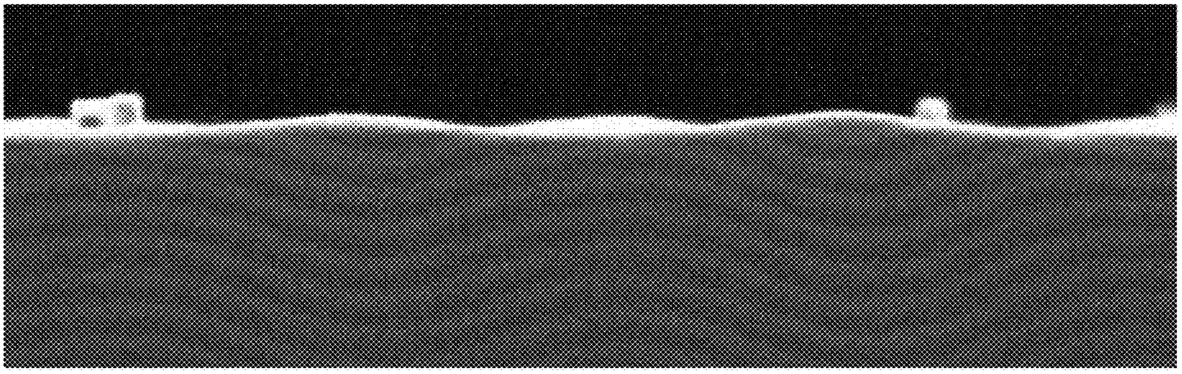
FIG. 8 is a cross-sectional SEM observation diagram of a reflective layer 15.

FIG. 8 shows a cross-sectional SEM observation diagram of Example 13 (reflective layer 16). In FIG. 8, the reflective layer 16 is a gray striped region at the bottom of the figure, and the white region thereover is due to the convexity of the surface positioned on the far side in the figure with respect to the cross section. Similar wave-like structures were observed in the reflective layers 10 to 15 produced in Examples 7 to 12.

<<Evaluation of Microscopic Observation>>

The evaluation of microscopic observation was carried out in the same manner as in Example 1.

<<Reflective Performance>>

A reflective layer was set on a spectrophotometer V-670 (manufactured by JASCO Corporation) equipped with an absolute reflectance measuring system with the produced reflective layer facing the light source side, and the height of the reflection performance at 45° was evaluated under 0° incident and 45° detection conditions.

The reflection performance at 45° was evaluated by preparing a graph of the wavelength on the horizontal axis and the reflectance on the vertical axis, removing the reflectance originating from the substrate, calculating the area of the reflection peak in the region of 500 to 650 nm corresponding to the selective reflection wavelength of the reflective layer (cholesteric liquid crystalline phase), and then taking the size of this area as the amount of reflection at 45°. The results are shown in Table 6 below.

TABLE 6

| | Example 7 | Example 8 | Example 9 | Example 10 | Example 11 | Example 12 | Example 13 | Comparative Example 4 |
|---|---|---|---|---|---|---|---|---|
| Liquid crystal composition | (A) | (A) | (B) | (C) | (D) | (E) | (F) | (G) |
| Film thickness [μm] | 3.4 | 3.9 | 4.6 | 4.1 | 3.9 | 4.6 | 3.5 | 3.9 |
| Height of surface roughness [nm] | 25 | 41 | 47 | 55 | 69 | 87 | 117 | 1 |
| Pitch of surface roughness [μm] | 1.9 | 2.5 | 2.5 | 2.9 | 2.9 | 2.9 | 3.0 | 0.3 |
| Height of internal roughness [nm] | 102 | 139 | 176 | 153 | 202 | 280 | 331 | — |
| Alignment temperature [° C.] | 95 | 95 | 95 | 95 | 95 | 95 | 95 | 95 |
| Immobilization temperature [° C.] | 30 | 30 | 30 | 30 | 30 | 30 | 30 | 30 |
| HTP variation [%] | 17 | 17 | 17 | 17 | 19 | 17 | 19 | 1 |
| Evaluation of microscopic observation | A | A | A | A | A | A | A | C |
| Amount of reflection at 45° | 2.3 | 4.6 | 5.8 | 7.2 | 11.2 | 15.7 | 16.5 | 0 |

As shown in Table 6, the reflective layer of the present invention having a wave-like structure therein and having surface roughness has high diffuse reflectivity, as compared with the reflective layer of Comparative Example 4 having no internal wave-like structure and no surface roughness.

Further, the diffuse reflectivity is superior as the height of the surface roughness is higher. That is, the reflection by the cholesteric liquid crystalline phase becomes more dominant in the internal reflection than the surface. As described above, in the case where the reflective layer 30 has a large wave-like structure therein, the roughness thereof is also transferred to the surface, so that the surface of the reflective layer 30 becomes rough in shape. In other words, in the case where roughness is formed on the surface, the internal wave-like structure also becomes larger. As a result, the reflective layer having larger roughness on the surface has better diffuse reflectivity.

From the above results, the effects of the present invention are obvious.

EXPLANATION OF REFERENCES

10: substrate
**12*a***: layer of composition in cholesteric liquid crystalline phase state
**12*b***: layer having wave-like structure
14: bright portion
16: dark portion
20: light source
22: sample
24: detector
30: reflective layer

What is claimed is:

1. A reflective layer obtained by immobilizing a cholesteric liquid crystalline phase, wherein, in a cross section of the reflective layer, a bright portion and a dark portion derived from the cholesteric liquid crystalline phase are wave-like, and a surface of the reflective layer has periodic roughness which is different in phase from the wave of the bright portion and the dark portion of the cross section of the reflective layer.

2. The reflective layer according to claim 1, wherein the roughness on the surface is formed by changing the alignment of the cholesteric liquid crystalline phase.

3. The reflective layer according to claim 1, wherein a pitch of the roughness on the surface is 0.5 to 10 μm.

4. The reflective layer according to claim 1, wherein a height of roughness on the surface is 1 to 500 nm.

* * * * *